US012715136B2

(12) United States Patent
Enti et al.

(10) Patent No.: US 12,715,136 B2
(45) Date of Patent: Aug. 25, 2026

(54) SYSTEMS AND METHODS OF MATRIX MANUFACTURING WITH WORK CELLS

(71) Applicant: Reframe Systems, Inc., Andover, MA (US)

(72) Inventors: Vikas Reddy Enti, Somerville, MA (US); Aaron Alexander Small, South Royalton, VT (US); Felipe De Arruda Camargo Polido, North Reading, MA (US); Patrick Ryan Dingle, Winchester, MA (US); Adam Philippe Couture, Smithfield, RI (US)

(73) Assignee: Reframe Systems, Inc., Andover, MA (US)

( * ) Notice: Subject to any disclaimer, the term of this patent is extended or adjusted under 35 U.S.C. 154(b) by 0 days.

(21) Appl. No.: 19/286,949

(22) Filed: Jul. 31, 2025

(65) Prior Publication Data

US 2025/0353181 A1 Nov. 20, 2025

Related U.S. Application Data

(63) Continuation of application No. PCT/US2024/054921, filed on Nov. 7, 2024.

(60) Provisional application No. 63/597,375, filed on Nov. 9, 2023.

(51) Int. Cl.

| | |
|---|---|
| ***B25J 9/16*** | (2006.01) |
| ***B25J 15/00*** | (2006.01) |
| ***B25J 15/06*** | (2006.01) |

(52) U.S. Cl.

CPC .......... *B25J 9/1682* (2013.01); *B25J 9/1687* (2013.01); *B25J 15/0019* (2013.01); *B25J 15/0608* (2013.01); *B25J 15/0616* (2013.01)

(58) Field of Classification Search

None

See application file for complete search history.

(56) References Cited

U.S. PATENT DOCUMENTS

| | | | |
|---|---|---|---|
| 10,526,799 B2 * | 1/2020 | Telleria | B05B 13/0431 |
| 12,233,559 B2 | 2/2025 | Ames et al. | |
| 12,454,019 B2 | 10/2025 | Levy et al. | |

(Continued)

OTHER PUBLICATIONS

Bertram et al., "Modular construction: From projects to products", Jun. 2019, McKinsey & Co, pp. 1-25 (Year: 2019).*

(Continued)

*Primary Examiner* — David Earl Ogg

(74) *Attorney, Agent, or Firm* — Foley & Lardner LLP

(57) ABSTRACT

A manufacturing matrix can include a plurality of work cells. The manufacturing matrix can include a plurality of robotic arms disposed in the plurality of work cells to produce a construction product. The manufacturing matrix can include a storage location to store inventory including at least one of the material, the tool, the subassembly of the construction product, or a completed construction product. The manufacturing matrix can include a transportation system to move the inventory within the manufacturing matrix. The manufacturing matrix can include a data processing system communicably coupled with the plurality of robotic arms and the transportation system. The data processing system can provide a first instruction to a first robotic arm cell and a second instruction to a second robotic arm of the second work cell.

23 Claims, 43 Drawing Sheets

(56) References Cited

U.S. PATENT DOCUMENTS

| | | | | |
|---|---|---|---|---|
| 12,480,933 | B2 | 11/2025 | Ames et al. | |
| 2008/0022641 | A1 | 1/2008 | Engelland et al. | |
| 2013/0200561 | A1 * | 8/2013 | Sun | B23Q 1/25 269/59 |
| 2018/0050824 | A1 * | 2/2018 | Regnault | B64F 5/10 |
| 2020/0061840 | A1 * | 2/2020 | Yin | B25J 9/0084 |
| 2022/0156424 | A1 * | 5/2022 | Poostchi | G05B 19/41865 |
| 2024/0017408 | A1 * | 1/2024 | Attar | B25J 9/1687 |

OTHER PUBLICATIONS

Beth, “Automated Wall Production for Prefabricated Houses”, 2021, Beth Sondermaschinen, pp. 1-4 (Year: 2021).*

Loop Technology, “Case Study: Robotic Cell for Construction Scotland Innovation Centre”, 2022, Loop Technology, pp. 1-7 (Year: 2022).*

Hof, “Slab transport rack”, Jun. 2021, Hof Equipment Co, pp. 1 (Year: 2021).*

Enti, Vikas, Hello World, Reframe Systems, Mar. 14, 2023; https://www.reframe.systems/blog/hello-world.

Foreign Search Report on PCT Dtd Apr. 16, 2025.

Suffolk Technologies Hosts Robotics in Construction Event in Partnership With MassRobotics, Bringing Construction Innovation to Massachusetts, Jun. 22, 2023; https://www.businesswire.com/news/home/20230622351972/en/Suffolk-Technologies-Hosts-Robotics-in-Construction-Event-in-Partnership-With-MassRobotics-Bringing-Construction-Innovation-to-Massachusetts.

Examination Report on EP Application No. 21788458.4 dated Jun. 16, 2026.

International Preliminary Report on Patentability on PCT Application No. PCT/US2024/054921 mailed on May 21, 2026.

* cited by examiner

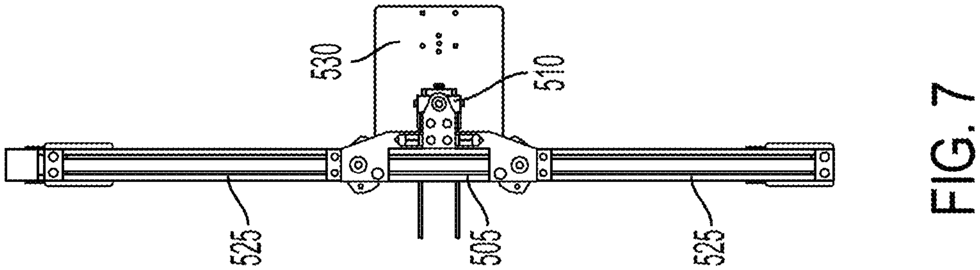
FIG. 7

170

610

610

610

Transport Mode 810

170
525
525
510
530
535
1005

3110
3105
3125
3165
3120
3115
3135
3130
3132
3155
3145
3160
3150
3140
3140
196
3145
3100

SYSTEMS AND METHODS OF MATRIX MANUFACTURING WITH WORK CELLS

CROSS-REFERENCE TO RELATED APPLICATIONS

This application claims priority to International Patent Cooperation Treaty Application No. PCT/US2024/054921, filed on Nov. 7, 2024 and titled "SYSTEMS AND METHODS OF MATRIX MANUFACTURING WITH WORK CELLS", which claims priority to U.S. Provisional Application No. 63/597,375, titled "SYSTEMS AND METHODS OF MATRIX MANUFACTURING WITH WORK CELLS" and filed on Nov. 9, 2023, each of which are incorporated herein by reference in their entirety.

BACKGROUND

Construction projects can include assembling a final product by combining various components and subassemblies. The specifics of the final product can be dictated by various codes, regulations, and customer preferences.

SUMMARY

At least one aspect is directed to a system such as a manufacturing matrix for modular construction. The manufacturing matrix can include a plurality of work cells to facilitate production of a modular construction product. The manufacturing matrix can include a plurality of robotic arms. A robotic arm of the plurality of robotic arms can be disposed in each of the plurality of work cells. The plurality of robotic arms can manipulate a material, a tool, or a subassembly to produce the modular construction product. The manufacturing matrix can include a storage location to store inventory. The inventory can include at least one of the material, the tool, the subassembly of the modular construction product, or a completed modular construction product. The manufacturing matrix can include a transportation system to move the inventory within the manufacturing matrix between at least one of the storage location and a work cell of the plurality of work cells or between a first work cell and a second work cell of the plurality of work cells. The manufacturing matrix can include a data processing system communicably coupled with the plurality of robotic arms and the transportation system. The data processing system can provide a first instruction to a first robotic arm of a first work cell and a second instruction to a second robotic arm of the second work cell. The first instruction can be indicative of a first task and the second instruction can be indicative of a second task.

At least one aspect is directed to a robotic work cell of a manufacturing matrix for modular construction. The robotic work cell can include a robotic arm comprising an interface for a tool. The robotic arm can facilitate assembly of a modular construction product. The modular construction project can include a panel. The robotic work cell can include a work surface comprising a vertical orientation. The panel can lean up against the work surface during assembly of the panel.

At least one aspect is directed to an arm tool to couple with a robotic arm of a work cell. The arm tool can include a main body. The arm tool can include a tool interface coupled with the main body. The tool interface can couple the arm tool with the robotic arm. The arm tool can include a gripper coupled with the main body. The gripper can move between an open and closed position to selectively engage at least a portion of a component. The arm tool can include a suction device coupled with the main body. The suction device can temporarily couple the component with the arm tool via suction. The arm tool can include a magnet holder coupled with the main body. The magnet holder can be disposed between the gripper and the suction device. The magnet holder can selectively engage and disengage a magnetic assembly to couple the component with a work surface.

At least one aspect is directed to a manufacturing matrix for construction. The manufacturing matrix can include a plurality of work cells to facilitate production of a construction product. The manufacturing matrix can include a plurality of digital support systems. A digital support system of the plurality of digital support systems can be disposed in each of the plurality of work cells. The plurality of digital support systems can direct a person to manipulate a material, a tool, or a subassembly based on digital assembly instructions for the construction product. The plurality of digital support systems can each include a sensor to detect a project characteristic. The plurality of digital support systems can each include an indicator to provide an indication to guide an action of the person to facilitate production of the construction product. The manufacturing matrix can include a data processing system communicably coupled with the plurality of digital support systems. The data processing system can cause the indicator of a first digital support system of a first work cell to generate a first indication based on a first digital assembly instruction and a first project characteristic, and cause the indicator of a second digital support system of a second work cell to generate a second indication based on a second digital assembly instruction and a second project characteristic.

At least one aspect is directed to a method of assembling a panel. The method can include identifying, by a robotic arm, a member for the panel. The method can include engaging, by the robotic arm, a magnetic assembly. The method can include positioning, by the robotic arm, the member at a desired position against a work surface. The method can include disengaging from, by the robotic arm, the magnetic assembly. The magnetic assembly can hold the member against the work surface. The method can include coupling, by the robotic arm, the member with another member of the panel.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 7 depicts a top view of an example panel transport device.

DETAILED DESCRIPTION

Figure 1A:
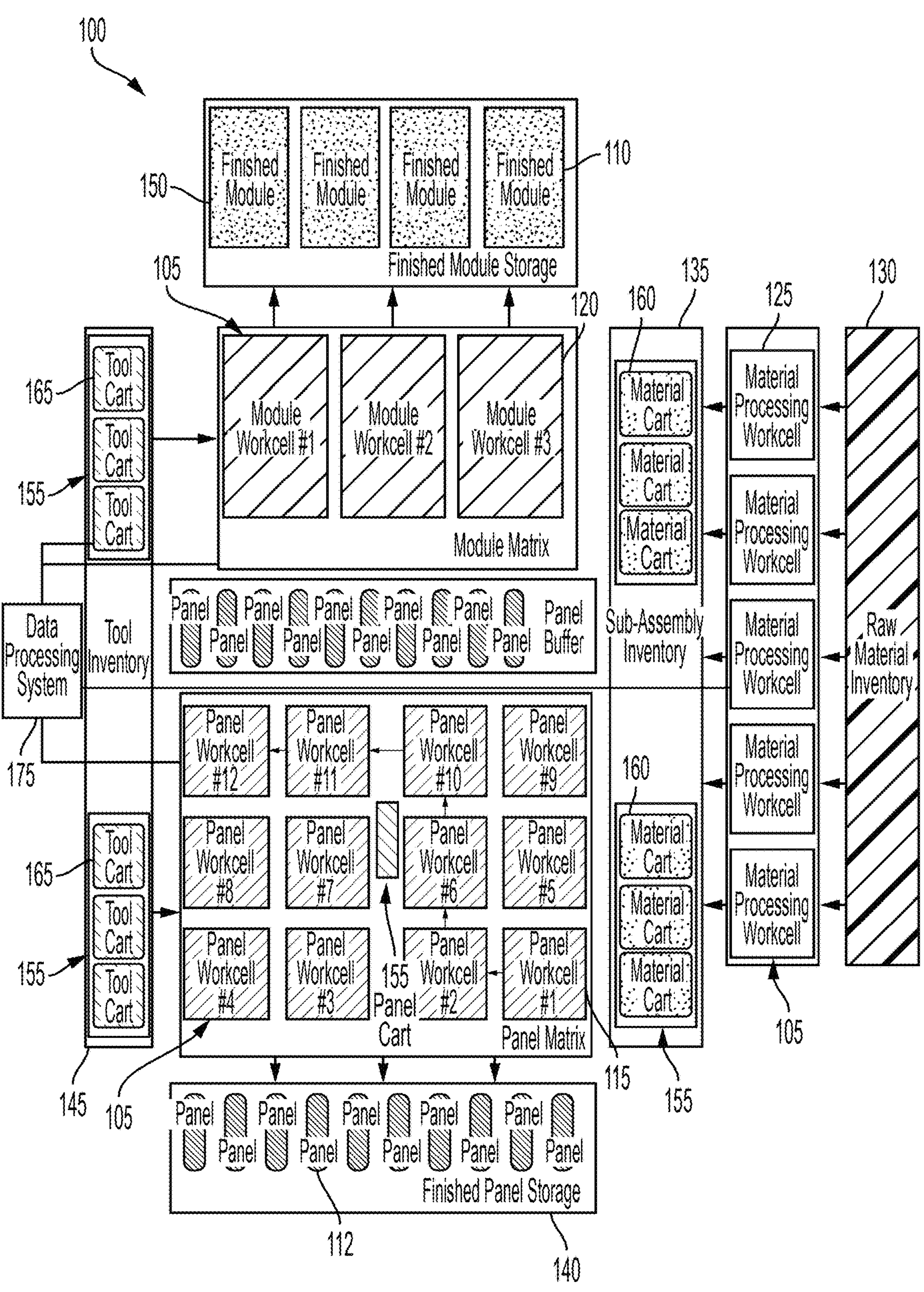
FIG. 1A depicts a schematic diagram of an example manufacturing matrix.

Following below are more detailed descriptions of various concepts related to, and implementations of, methods, apparatuses, and systems of storage rack protection. The various concepts introduced above and discussed in greater detail below may be implemented in any of numerous ways.

The construction industry can require a wide variety of products to be built in order to accommodate various rules and expectations. For example, products have to meet local codes, zoning requirements, and customer expectations, which can vary based on location or personal preference. It can be difficult for manufacturers to accommodate such a wide variety of products, which can often result in product specialization and/or regionalization of the manufactures. For example, a manufacturer can focus all or a majority of its products to a designated region to establish an understanding of the local rules and create a manufacturing facility that can build products that conform to such rules. With conventional technology, largely manual processes can be used to produce the various, or customized, products to meet each rule or expectation, but such manual processes, even with the limited conventional automated means, can limit the ability of the manufacturer to produce such a product at scale.

The present disclosure is directed to systems and methods for producing a wide variety of products that meet various design requirements, while maintaining the ability to produce such products at scale. More specifically, the present disclosure is directed to systems that facilitate manufacturing of various products that meet different codes, regulations, and expectations without having to completely reconfigure the systems. For example, the disclosed systems can have a plurality of work cells configured to produce a first product. The components of the work cells can be easily adjusted to produce a second product without requiring reconfiguration of the work cell. For example, the same machine (e.g., robot) can be reprogrammed to perform functions necessary to produce the second product or an order of operations can be automatically updated to produce the second product. The work cells, the configuration of the work cells, and the components of the work cells, can allow a single manufacturing system to produce a wide variety of products that conform to various, and constantly evolving, rules, and still maintain the ability to produce such "custom-like" products at a large scale. Such variability of manufacturing capabilities becomes more beneficial every day due to the ever-evolving rules and regulations that are applied to modular construction. For example, the trend of increasing net zero buildings (e.g., zero, near zero, or reduced emissions buildings) can require a manufacturer to adjust the manufacturing processes to conform to the rules to meet the net zero standards.

The present disclosure generally relates to a system that can be or include at least one manufacturing matrix for modular (e.g., segmented or piecemeal) construction. The systems and methods of the present disclosure can be applied to any form of modular construction. For example, the systems and methods can apply to modular manufacturing of residential buildings (e.g., single family homes, multi-family homes, etc.), other buildings or rooms (e.g., hotels, hospitals, office buildings, laboratories, clean rooms, etc.), or any structure that uses horizontal construction, among others. The manufacturing matrix can include work cells. The work cells can perform different tasks to produce a modular construction project. For example, a first work cell can be a panel work cell to produce a panel of the modular construction project. A second work cell can be a module work cell to combine a plurality of panels to create the completed modular construction project. Each work cell can include at least one robotic arm. The robotic arms can be reprogrammed (e.g., receive digital assembly instructions) in real time to accommodate different projects. For example, a robotic arm can be programmed initially to perform a first task (e.g., framing), and then reprogrammed to perform a second task (e.g., painting). Each work cell can include at least one digital support system. The digital support system can facilitate manual construction of the modular construction project by providing indications for proper assembly. For example, the digital support system can include at least one sensor (e.g., a camera) to detect a position of a component. The digital support system can include at least one indicator (e.g., a light or a sound maker) to provide an indication (e.g., a light or a sound) to indicate whether the component is in the proper position. The instruction system can be reprogrammed (e.g., receive digital assembly instructions) to accommodate different projects. For example, the digital support system can be programmed to facilitate a first task (e.g., framing), and then reprogrammed to facilitate a second task (e.g., painting). The indications can be observed by a person working in the work cell and adjust their actions based on the indications. The indications can be proactive (e.g., tell the person where to place a component) or reactive (e.g., tell the person when a component is out of place).

The manufacturing matrix can include a data processing system to provide instructions to the robotic arms to perform designated tasks. The data processing system can determine a workflow for a modular construction project. For example, the data processing system can receive a design for the project, determine the number of work cells to utilize for the construction of the project, designate certain work cells and robotic arms for certain tasks, and provide instructions to the robotic arms based on the designated tasks.

The manufacturing matrix can include storage locations to store inventory such as tools, materials, a subassembly of the project (e.g., a panel), or the fully constructed project. The manufacturing matrix can include a transportation system to transport materials, tools, or panels, among others, to different areas of the manufacturing matrix.

FIG. 1A depicts an example system that can be or include at least one manufacturing matrix 100. The manufacturing matrix 100 can facilitate modular construction of various modular construction projects. For example, the manufacturing matrix 100 can facilitate modular construction of residential buildings (e.g., single family homes, multi-family buildings, etc.), other buildings or spaces (e.g., hotels, offices, clean rooms, etc.), or other modular products (e.g., products that use horizontal manufacturing). Modular construction can be or include component or panelized construction. For example, modular construction can include constructing individual components or panels before combining the components or panels to form the final product.

The manufacturing matrix 100 can include at least one work cell 105. The work cell can facilitate production of a modular construction product 110. For example, production of the modular construction product 110 can include production of a plurality of subassemblies and formation of a module comprising the plurality of subassemblies. For example, a modular construction product 110 (also referred to as a module 110) can be a modular residential home. The modular residential home can be a module 110 that includes a plurality of subassemblies, such as a panel 112, coupled together. The work cell 105 can assemble or work on the subassemblies or the work cell 105 can assemble or work on the module.

The manufacturing matrix 100 can include a plurality of work cells 105. Each work cell 105 can be capable of performing the same tasks. Different work cells 105 can be programmed to perform different tasks based on the design of a modular construction product 110. For example, for a first modular construction product 110, a first work cell 105 can be programmed to perform a first task (e.g., framing) and a second work cell 105 can be programmed to perform a second task (e.g., insulating). For a second modular construction product 110, the first work cell 105 can be programmed to perform a third task (e.g., painting) and the second work cell 105 can be programmed to perform a fourth task (e.g., electrical work). Any work cell 105 can be programmed to perform any task.

The work cells 105 can be designated as different types of work cells 105 based on the task assigned to the work cell 105. For example, a work cell 105 can be a subassembly work cell, shown as panel work cell 115. The panel work cell 115 can work on or produce a subassembly (e.g., a panel) of the modular construction product 110. For example, the panel work cell 115 can perform a task to facilitate construction of the panel. For example, the panel work cell 115 can perform electrical work, framing, painting, insulating, sheathing, or routing, among other panel-related tasks.

The work cell 105 can be a module work cell 120. The module work cell 120 can assemble the modular construction product 110, or at least a portion thereof. For example, the module work cell 120 can couple together a plurality of subassemblies (e.g., panels) to form the modular construction product 110.

The work cell 105 can be a material processing work cell 125. The material processing work cell 125 can process material (e.g., raw materials) that are to be used to produce the modular construction product 110. For example, the material processing work cell 125 can receive and analyze raw materials to be used to produce the modular construction product 110. Processing the material can include determining the type of material, identifying any deformities or negative characteristics of the material, forming the material into a desired shape or size, adding markings to the material, or creating an inventory of the material, among others.

The manufacturing matrix 100 can include a plurality of work cells 105. The plurality work cells 105 can be disposed at different locations. For example, the plurality of work cells 105 can include a first subset of work cells 105 and a second subset of work cells 105. The first subset of work cells 105 can be disposed in a first facility. The second subset of work cells 105 can be disposed in a second facility. The plurality of work cells 105 can still operate as a single manufacturing matrix 100 even if disposed at different physical locations.

The manufacturing matrix 100 can include at least one storage location. The storage location can store inventory. Inventory can include at least one of material, tools, a subassembly of the modular construction product 110, or a completed modular construction product 110, among others. The manufacturing matrix 100 can include a plurality of storage locations. The storage locations can be at least partially organized by the inventory stored in the storage location. For example, the manufacturing matrix 100 can include at least one first storage location, shown as material storage 130. The material storage 130 can store materials (e.g., raw materials). The manufacturing matrix 100 can include at least one second storage location, shown as subassembly storage 135. The subassembly storage 135 can store subassemblies of the modular construction product 110 (e.g., processed material available to be incorporated into a panel 112). The manufacturing matrix 100 can include at least one third storage location, shown as panel storage 140. The panel storage 140 can store constructed panels 112. The manufacturing matric 100 can include at least one fourth storage location, shown as tool storage 145. The tool storage 145 can store tools used to produce the modular construction product 110. The manufacturing matrix 100 can include at least one fifth storage location, shown as module storage 150. The module storage 150 can store completed modular construction products 110, or portions thereof comprising a plurality of subassemblies.

The manufacturing matrix 100 can include at least one transportation system 155. The transportation system 155 can move inventory within the manufacturing matrix 100. For example, the transportation system 155 can move inventory between work cells 105 and storage locations. The transportation system 155 can move inventory between a first work cell 105 and a second work cell 105.

The transportation system 155 can include at least one transport device to move the inventory within the manufacturing matrix 100. The transport device can transport any inventory, or can be tailored for specific inventory. For example, the transportation system 155 can include at least one material transport device 160 to transport material. The transportation system 155 can include at least one tool transport device 165 to transport tools. The transportation system 155 can include at least one panel transport device 170 to transport a panel 112.

As an illustrative example, the manufacturing matrix 100 can include at least one material storage 130. The material storage 130 can store raw materials. The transportation system 155 can move material from the material storage 130 to a material processing work cell 125. For example, a material transport device 160 can move the material from the material storage 130 to the material processing work cell 125. The manufacturing matrix 100 can include at least one subassembly storage 135. This subassembly storage 135 can store processed materials. The transportation system 155 can move the processed material from the subassembly storage 135 to a work cell 105. For example, a material transport device 160 can move the material from the subassembly storage 135 to a panel work cell 115. The transportation system 155 can transport one or more tools from the tool storage 145 to the panel work cell 115. The panel work cell 115 can use the tool and the material to create a panel 112. The transportation system 155 can transport the panel 112 from a first panel work cell 115 to a second panel work cell 115. For example, a panel transport device 170 can move the panel 112 from the first panel work cell 115 to the second panel work cell 115. The transportation system 155 can transport the panel 112 from the second panel work cell 115 to a module work cell 120. For example, a panel transport device 170 can move the panel 112 from the second panel work cell 115 to the module work cell 120. The transportation system 155 can transport a plurality of panels 112 from a plurality of work cells 105 to the module work cell 120. The transport system 155 can transport one or more tools from the tool storage 145 to the module work cell 120. The module work cell 120 can use the tools to couple the plurality of panels 112 together to form the modular construction product 110. The manufacturing matrix 100 can include a module storage 150. The transportation system 155 can transport the modular construction product 110 from the module work cell 120 to the module storage 150.

The manufacturing matrix 100 can include at least one data processing system 175. The data processing system 175 can be communicably coupled with the plurality of work cells 105 and the transportation system 155. The data processing system 175 can provide instructions to the work cells 105 based on a task or tasks the work cell 105 is to perform. The instructions can be based on a design of the modular construction product 110. The data processing system 175 can provide instructions to the work cells 105 in real time to facilitate production of a variety of modular construction products 110. For example, a first product can require a first work cell 105 to perform a first task and a second product can require the first work cell 105 to perform a second task. The data processing system 175 can provide instructions to the work cell 105 to accommodate both the first product and the second product.

The transportation system 155 can be autonomous. For example, the transportation system 155 can receive instructions from the data processing system 175 indicative of materials and tools to be used in a location. Based on the instructions, the transportation system 155 can deploy the desired transport devices to obtain the materials and tools from a storage location or a work cell 105. For example, the transportation system 155 can activate a material transport device 160 to obtain the materials the material storage 130 or the subassembly storage 135 and a tool transport device 165 to obtain the tools from the tool storage 145. The material transport device 160 and the tool transport device 165 can transport the materials and the tools to the desired work cell 105.

Figure 1B:
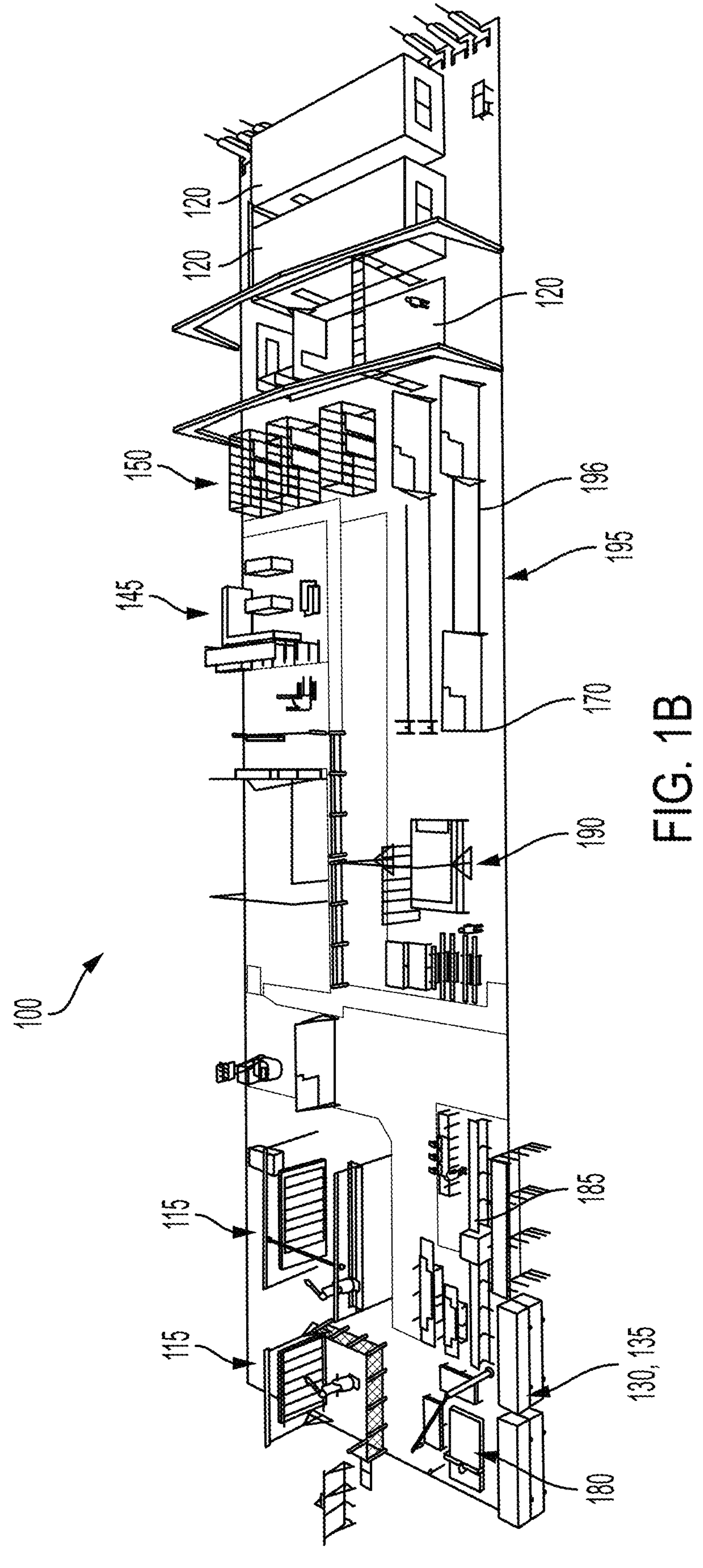
FIG. 1B depicts a perspective view of an example model of a manufacturing matrix.

FIG. 1B depicts an example manufacturing matrix 100. The manufacturing matrix 100 can include at least one automated machining device (e.g., a computer numerical control (CNC) machine. For example, the manufacturing matrix 100 can include at least one CNC router 180. The manufacturing matrix 100 can include at least one CNC saw 185. The manufacturing matrix 100 can include any number of automated machining devices and any type of automated machining devices.

The manufacturing matrix 100 can include at least one construction station, shown as framing station 190. The framing station 190 can be at least partially manually operated. For example, a person can form at least part of a panel in the framing station 190.

The manufacturing matrix 100 can include at least one panel matrix 195. The panel matrix 195 can arrange a plurality of panels 112 vertically in rows. The panels 112 can be on a panel transport device 170. The panel matrix 195 can have at least one track 196 on the floor to engage with the panel transport device 170 such that the panel transport device 170 can move in a desired direction along the track. The panel matrix 195 can have a plurality of tracks 196. The tracks 196 can be arranged in rows such that a plurality of panels 112 can be arranged in a plurality of rows. Being vertical and in rows, the panels 112 can be worked on from either side of the panel 112.

Figure 1C:
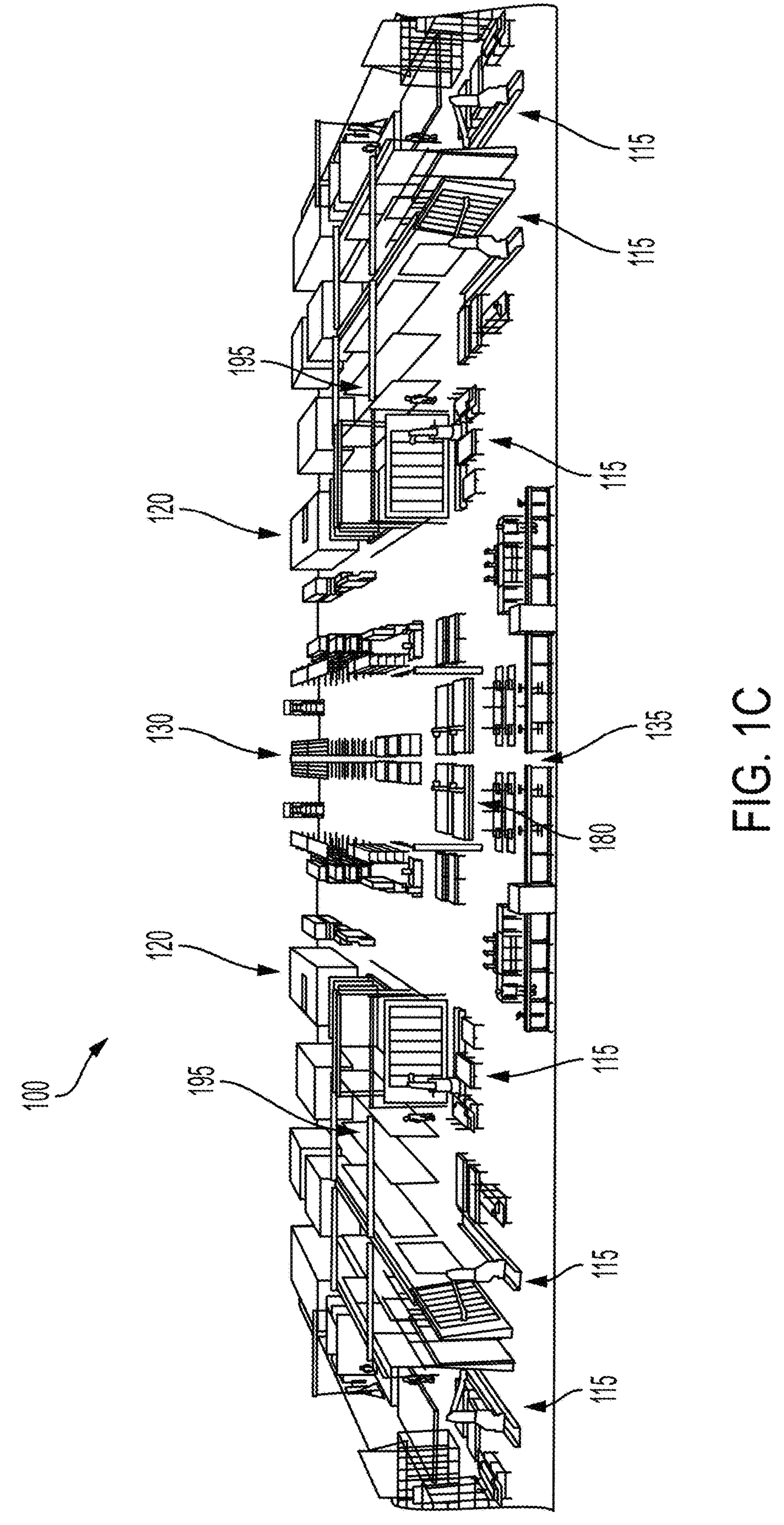
FIG. 1C depicts a perspective view of an example model of a manufacturing matrix.

FIG. 1C depicts an example manufacturing matrix 100. The manufacturing matrix 100 can have any number of stations. For example, the manufacturing matrix 100 can have a plurality of panel work cells 115, a plurality of panel matrixs 195, and a plurality of module work cells 120, among other stations.

Figure 2A:
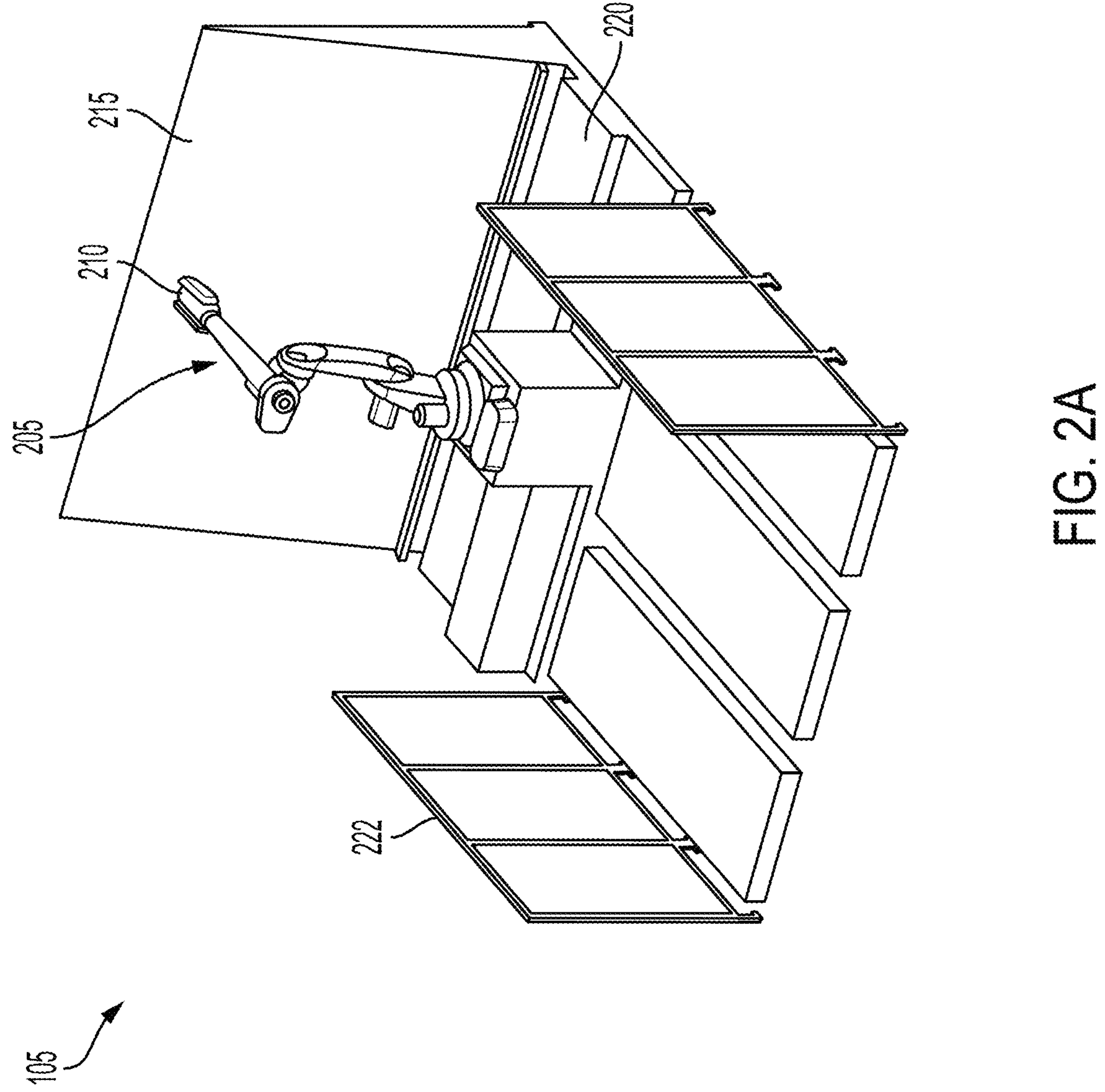
FIG. 2A depicts a perspective view of an example work cell.
Figure 2B:
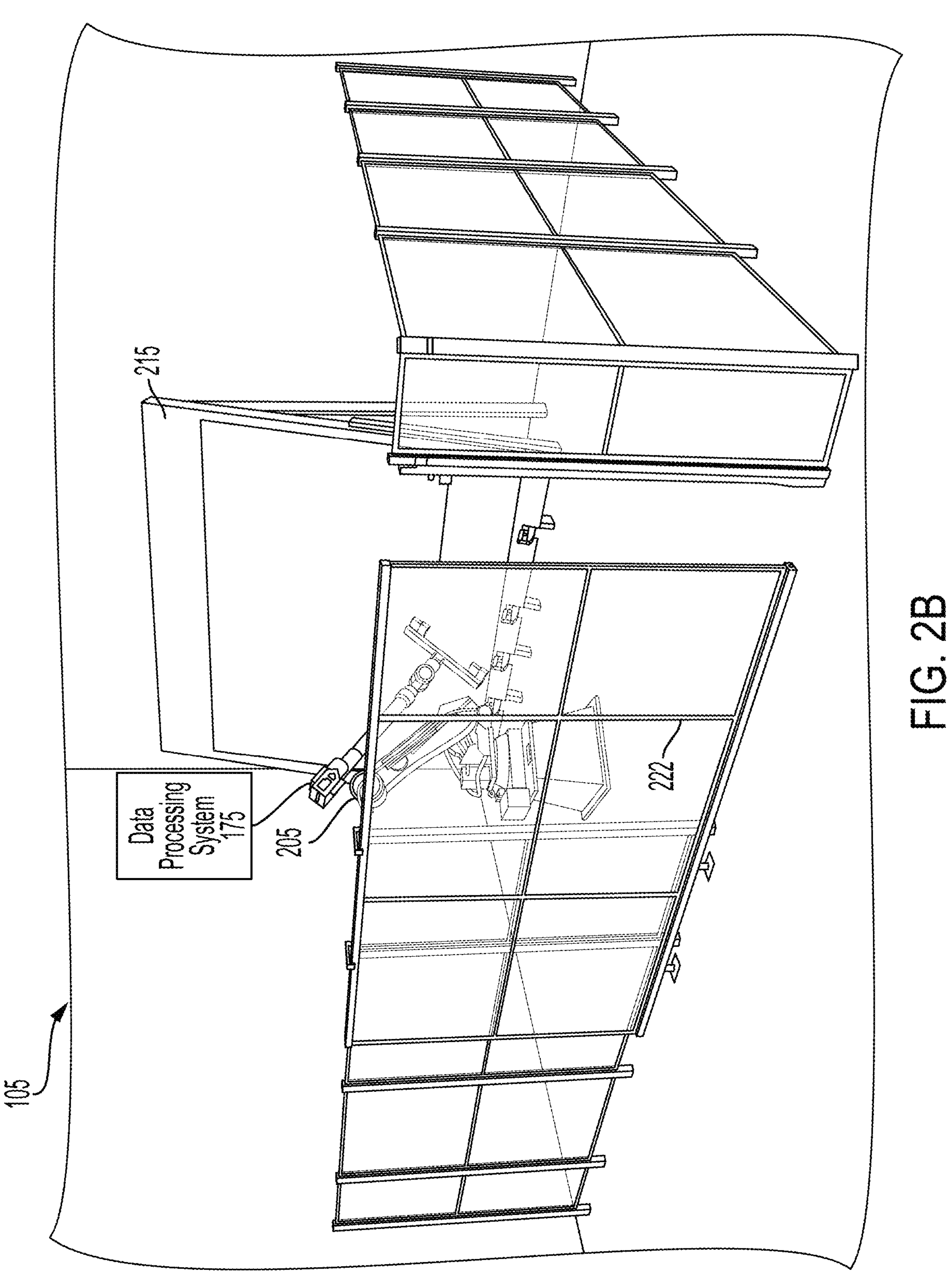
FIG. 2B depicts a perspective view of an example work cell.

FIGS. 2A-2B depict an example work cells 105 of the manufacturing matrix 100. The work cell 105 can be any type of work cell 105. For example, the work cell 105 can be a material processing work cell 125, a panel work cell 115, or a module work cell 120. The work cell 105 can include at least one automated machine, shown as robotic arm 205. The robotic arm 205 can facilitate assembly of a modular construction product 110. For example, the robotic arm 205 can manipulate a material, a tool, or a subassembly to produce a modular construction product 110. The robotic arm 205 can include an interface 210 for a tool. For example, a tool can couple with the robotic arm 205 via the interface 210. The interface 210 can couple with a plurality of tools. The tool can be based on a designated task for the robotic arm 205. For example, a designated task can be at least one of electrical work, framing, painting, insulating, sheathing, or routing, among others. The tool coupled with the robotic arm 205 via the interface 210 can be based on the task to be performed.

A manufacturing matrix 100 can include a plurality of robotic arms 205. A work cell 105 can include a plurality of robotic arms 205. A work cell 105 can include other automated machines other than a robotic arm 205. For example, a work cell 105 can include a computer numerical control (CNC) machine (e.g., a CNC milling machine, a CNC lathe, a CNC router, a CNC saw, a CNC cutter, a CNC printer). Like the robotic arm 205, the other automated machines can be communicably coupled with a data processing system 175 to receive instructions to accommodate various tasks. The work cell 105 can include any combination of automated machines. The manufacturing matrix 100 can include any combination of automated machines.

The work cell 105 can include at least one work surface 215. The work surface 215 can have a vertical orientation. For example, the work surface 215 can be configured such that a panel 112 can lean up against the work surface 215 during assembly of the panel 112. The work surface 215 can be coupled with the robotic arm 205 to form a unitary work cell 105 unit. For example, a base 220 can extend from the work surface 215. The robotic arm 205 can be disposed on the base 220 and coupled with the base 220. The robotic arm 205, the base 220, and the work surface 215 can form a single unit such that the works cell 105 can be transported as a single unit.

The work surface 215 can be any material. For example, the work surface 215 can be metallic or be or include some other magnetic material such that components or tools can couple with the work surface 215. For example, a component of the robotic arm 205, or a tool thereof, can magnetically couple with the work surface 215. The component can couple with the work surface 215 to hold a panel 112 or a component thereof (e.g., a post of the panel 112) against the work surface 215.

The work cell 105 can include at least one barrier 222. The barrier 222 can enclose at least a portion of the work cell 105. The barrier 222 can define an area that is included as part of the work cell 105. The barrier 222 can help keep material and tools inside the work cell 105 during operation.

The robotic arm 205 can be communicably coupled with the data processing system 175. Data processing system 175 can be disposed at a remote location relative to the work cell 105. The robotic arm 205 can receive updated programming from the data processing system 175 in real time to switch between tasks to produce various modular construction products 110. For example, the robotic arm 205 can perform a first task at a first time based on a first design of a modular construction product 110. The robotic arm 205 can perform a second task at a second time based on a second design of a second modular construction product 110. For example, the robotic arm 205 can receive a first instruction from the data processing system 175. The first instruction can indicate a first task for the robotic arm 205 to perform to facilitate assembly of a first modular construction product 110. The robotic arm 205 can receive a second instruction from a data processing system 175. The second instruction can indicate a second task for the robotic arm 205 to perform to facilitate assembly of a second modular construction product 110. The robotic arm 205 can automatically change the tool coupled with the interface based on the task to be performed.

Figure 2C:
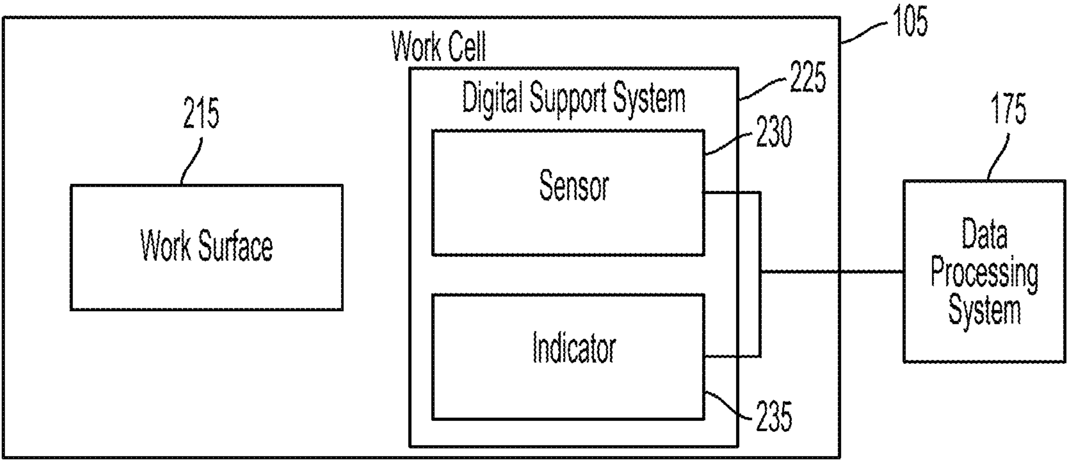
FIG. 2C depicts a schematic diagram of an example work cell.

FIG. 2C depicts a schematic diagram of an example work cell 105 of the manufacturing matrix 100. The work cell 105 can be any type of work cell 105. For example, the work cell 105 can be a material processing work cell 125, a panel work cell 115, or a module work cell 120. The work cell 120 can be a manual or augmented work cell 120. For example, a person can manipulate material, a tool, or a subassembly to produce a modular construction project 110. The manual process of the work cell 120 can be digitally aided or augmented by a digital support system 225. For example, the work cell 105 can include at least one digital support system 225. The digital support system 225 can direct a person to manipulate the material, tool, or subassembly based on digital assembly instructions. The digital support system 225 can include at least one sensor 230. The sensor 230 can detect at least one project characteristic. For example, the project characteristic can be a location or orientation of a component of a subassembly of the modular construction project 110, a location or orientation of a tool being used by the person, or an accuracy or efficacy of a coupling between two components, among others. The sensor 225 can be communicably coupled with the data processing system 175. The data processing system 175 can be communicably coupled with or a part of the digital support system 225. The sensor 225 can transmit a signal to the data processing system 175 indicating the project characteristic.

The data processing system 175 can analyze the project characteristic. For example, data processing system 175 can have or receive digital assembly instructions. The digital assembly instructions can be specific to a task assigned to the work cell 105. The data processing system 175 can compare the project characteristic with the digital assembly instructions. The data processing system 175 can determine whether the project characteristic matches the digital assembly instructions (e.g., within a threshold range) or does not match the digital assembly instructions.

The data processing system 175 can cause an indication to be generated. The indication can be based on the digital assembly instructions. The indication can be based on whether the project characteristic matches the digital assembly instructions. For example, the digital support system 225 can include at least one indicator 235. The indicator 235 can be any device or system capable of providing an indication (e.g., a light or a sound) that is understandable by the person of the work cell 105 to guide actions of the person. For example, the indicator 235 can be a light or a sound maker. The indicator 235 can facilitate proper assembly of the modular construction project 110, or a subassembly thereof. For example, the indication provided by the indicator 235 can indicate a proper location or orientation for a component of a panel 112 (e.g., a vertical line of light on a work surface 215 or a work bench or table indicating a placement position for an edge of a post of the panel 112, a sound indicating when the post is rotated to a desired orientation, a sound indicating when a wrong component is being used). The indicator 235 can generate an indication as a target for the person based on the digital assembly instructions (e.g., a line of light indicating a target position for a component). The indicator 235 can generate an indication as a response to determining the project characteristic matches or does not match the digital assembly instructions (e.g., generate a sound if the person is about to incorrectly couple two components or if the wrong material is being used). The indication can be proactive (e.g., the target indication) or reactive (e.g., a monitoring indication). The person in the work cell 105 can adjust or correct their work based on the indications.

Figure 3:
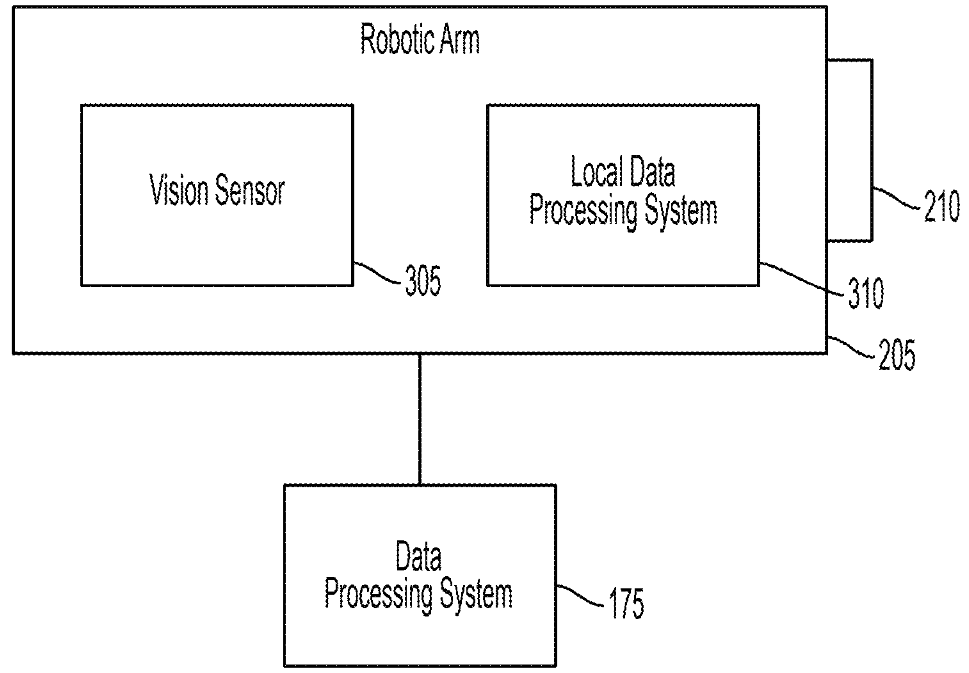
FIG. 3 depicts a schematic diagram of an example robotic arm.

FIG. 3 depicts a schematic diagram of an example robotic arm 205. The robotic arm 205 can include a vision sensor 305. The vision sensor 305 can identify data indicative of a material or subassembly of the modular construction product 110. The robotic arm 205 can include a local data processing system 310. The local data processing system 310 can facilitate machine vision. For example, the local data processing system 310 can allow the robotic arm 205 to identify certain materials, subassemblies, or tools. The local data processing system 310 can receive the data from the vision sensor 305. The local data processing system 310 can determine the characteristic of the component based on the data. The local data processing system 310 can compare the characteristic with that designated task of the robotic arm 205. The local data processing system 310 can generate a control command based on the comparison of the characteristic and a designated task. For example, a task can dictate a specific material be used. The characteristic of the component can be a type of material. If the type of material does not coincide with the task, the control command can cause the robotic arm 205 to analyze or select a different material. The control command can control a movement of the robotic arm to 205. The movement can align with the designated task of the robotic arm 205.

Referring back to FIGS. 1-3, the data processing system 175 can be communicably coupled with the transportation system 155, or components thereof, and with the work cells, or components thereof. For example, the data processing system 175 can provide instructions to a robotic arm 205. The instructions can be based on a product design. For example, the instructions can cause the robotic arm 205 to perform a task to assemble the modular construction product 110, or at least a component thereof. For example, the manufacturing matrix 100 can include a first work cell 105 with a first robotic arm 205 and a second work cell 105 with a second robotic arm 205. The data processing system 175 can designate the first work cell 105 as a panel work cell 115. The data processing system 175 can designate the second work cell 105 as a module work cell 120. The data processing system 175 can provide a first instruction to the first robotic arm 205. The first instruction can indicate a first task. For example, the first instruction can correspond to production of a panel 112. The data processing system 175 can provide a second instruction to the second robotic arm 205. The second instruction can indicate a second task. For example, the second instruction can correspond to production of a module comprising the panel 112.

The first work cell 105 and the second work cell 105 can be capable of performing the same functions or tasks. For example, the first robotic arm 205 of the first work cell 105 can perform a plurality of tasks including a first task and a second task. The second robotic arm 205 of the second work cell 105 can perform the same plurality of tasks. The data processing system 175 can provide instructions to the first robotic arm 205 and the second robotic arm 205 in real time to change a task of the first robotic arm 205 and the second robotic arm 205 to accommodate a new modular construction product 110. For example, to produce a first modular construction product 110, the first robotic arm 205 can perform a first task and the second robotic arm 205 can perform a second task. To produce a second modular construction product 110, the first robotic arm 205 can perform a third task and the second robotic arm 205 can perform a fourth task.

The data processing system 175 can generate a construction plan to produce a modular construction product 110. The construction plan can dictate at least one of material to be used for the product 110, number of work cells 105 for producing the subassemblies and the final product 110, types of work cells 105, arrangement of work cells 105, tasks for each work cell 105, or when and where to transport materials or subassemblies, among others. The data processing system 175 can generate different construction plans for different designs of modular construction products 110. The construction plans can include the specifics for how to produce the modular construction product 110. For example, the data processing system 175 can receive a design of the modular construction product 110. Based on the product design, the data processing system 175 can determine at least one of: a number and type of the plurality of work cells, an arrangement for the plurality of work cells, a number of the plurality of robotic arms to disperse between the plurality of work cells, a type tool to couple with each of the plurality of robotic arms, or a material to be used. The data processing system 175 can determine a plurality of tasks for the plurality of work cells 105. The plurality of tasks can include at least one of panel construction or module construction. The data processing system 175 can designate each of the work cells 105 as one of a panel work cell 115 or a module work cell 120. The data processing system 175 can determine a sequence for the plurality of task. For example, the data processing system 175 can determine a workflow for the plurality of work cells 105 based on the product design. The sequence (e.g., workflow) can reduce a lead time and a cycle time to produce the modular construction product 110. The data processing system 175 can provide instructions to the plurality of robotic arms 205 to perform the designated plurality of tasks. The data processing system 175 can provide instructions to the transportation system 155 to supply the plurality of work cells 105 with the tools and materials to be used to produce the modular construction product 110.

Similarly, the work cells 105 with a digital support system 225 can receive instructions from the data processing system 175 based on a task to be performed. For example, a first work cell 105 with a first digital support system 225 can receive a first instruction to facilitate a first task and a second work cell 105 with a second digital support system 225 can receive a second instruction to facilitate a second task. The first digital support system 225 can guide a first person to perform the first task. The second digital support system 225 can guide a second person to perform the second task. The data processing system 175 can provide instructions to the first and second digital support systems 225 in near real time to accommodate various modular construction products 110.

The manufacturing matrix 100 can produce a variety of modular construction products 110. For example, the arrangement of the work cells 105 and the tasks performed by each of the work cells 105 can change in near real time in order to produce different modular construction products 110. For example, the data processing system 175 can generate different instructions in real time and provide such instructions to the robotic arms 205, the transportation system 155, and the digital support systems 225 based on different project designs. For example, data processing system 175 can receive a first product design for a first modular construction product to 110. The data processing system can provide a first instruction to a first robotic arm 205 or a first digital support system 225 to perform or facilitate a first task and a second instruction to a second robotic arm 205 or a second digital support system 225 to perform or facilitate a second task based on the first product design. The data processing system 175 can receive a second product design for a second modular construction product 110. Second product design can be different than a first product design. The data processing system 175 can provide a third instruction to the first robotic arm 205 or the first digital support system 225 to perform or facilitate a third task and a fourth instruction to the second robotic arm 205 or the second digital support system 225 to perform or facilitate a fourth task based on the second product design.

The same coordination can be done for a manufacturing matrix 100 that has work cells 105 distributed between different physical locations. For example, the manufacturing matrix 100 can include a first subset of work cells 105 and a second subset of work cells 105. The first subset of work cells 105 can be disposed at a first facility and a second subset of work cells 105 can be disposed at a second facility. The data processing system 175 can be communicably coupled with both the first subset of work cells 105 and the second subset of work cells 105. The data processing system 175 can determine a workflow for the plurality of work cells 105 based on product design. The data processing system 175 can distribute tasks between the first subset of work cells 105 and the second subset of work cells.

Figure 4:
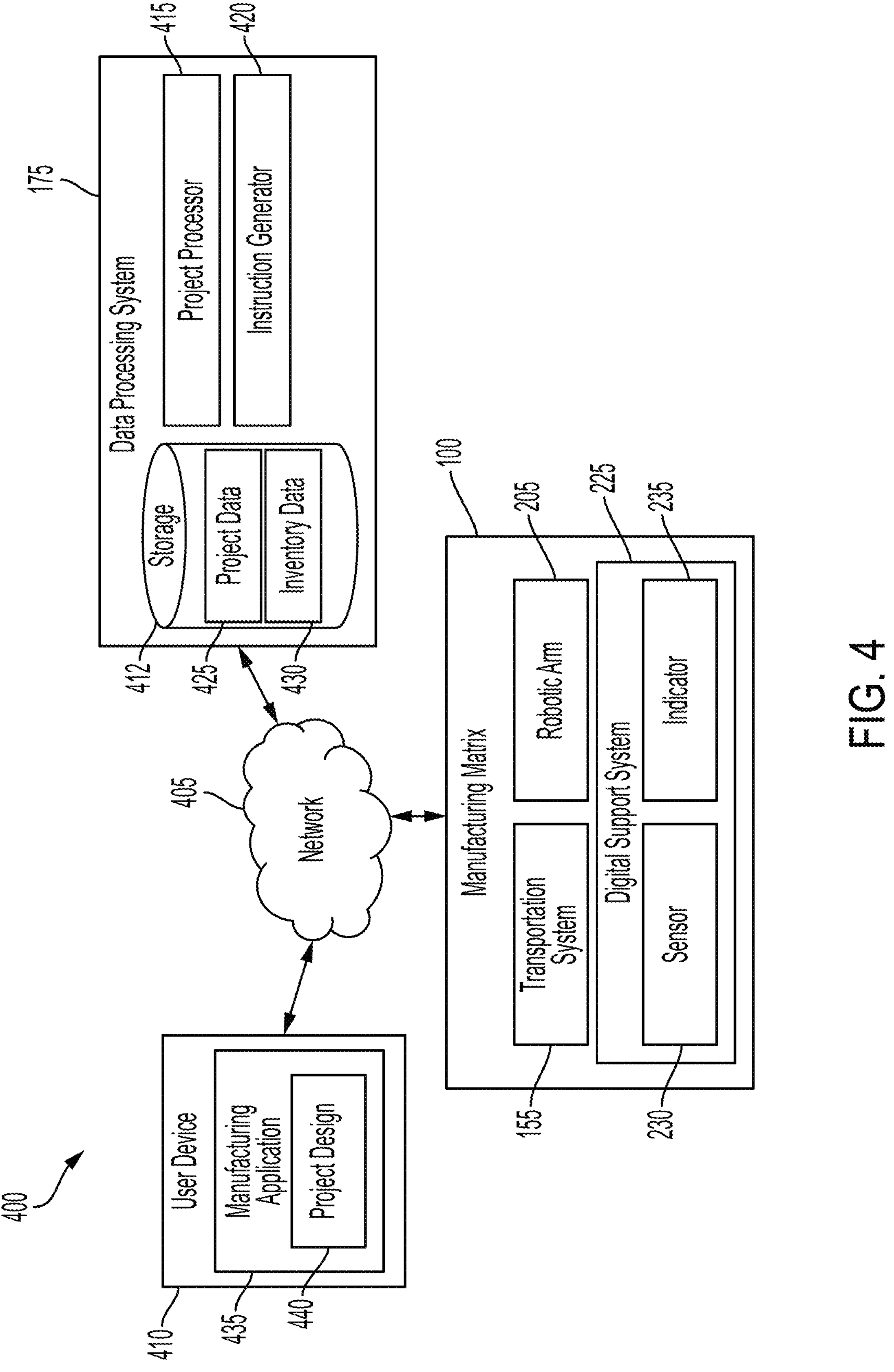
FIG. 4 depicts a schematic diagram of an example system for producing a modular construction product.
Figure 5:
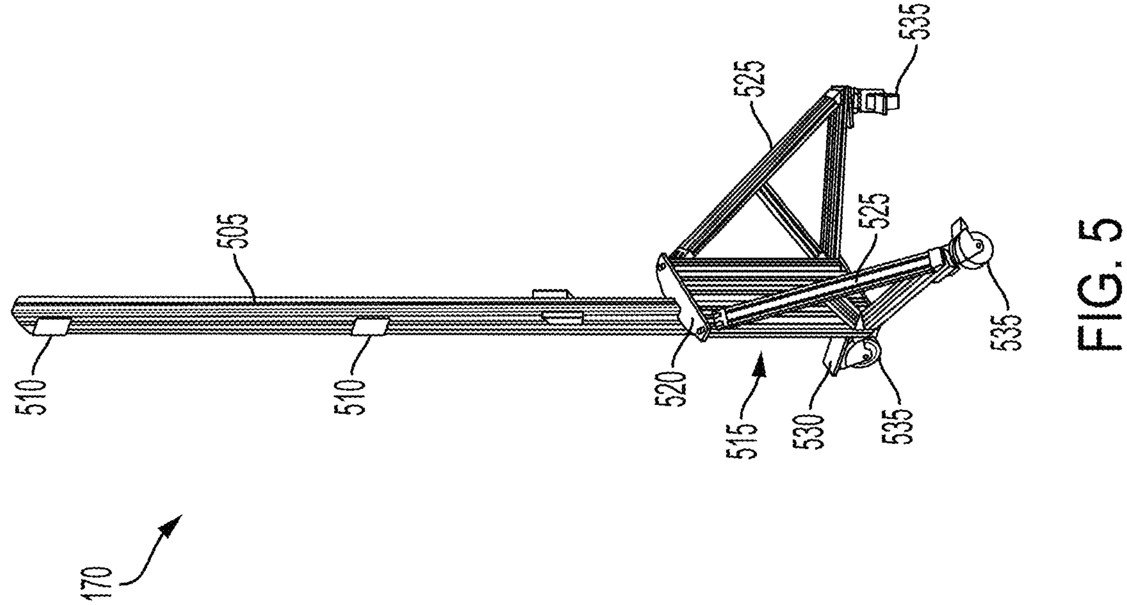
FIG. 5 depicts a perspective view of an example panel transport device.
Figure 6:
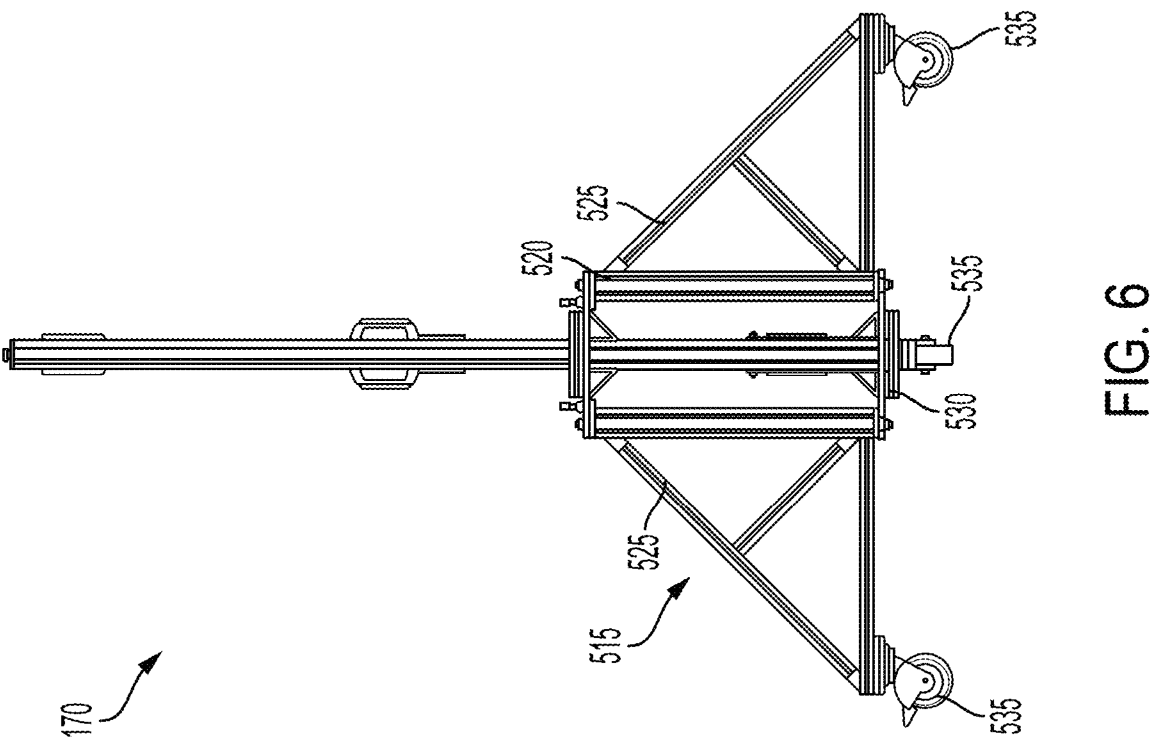
FIG. 6 depicts a front view of an example panel transport device.

FIG. 4 depicts a schematic diagram of an example system 400 for producing a modular construction product 110. The system 400 can include, utilize, interface with, or otherwise access at least one data processing system 175. The system 400 can include, utilize, interface with, or otherwise access at least one network 405. The system 400 can include, utilize, interface with, or otherwise access at least one user device 410. The system 400 can include, utilize, interface with, or otherwise access at least one manufacturing matrix 100. The manufacturing matrix 100 can include at least one transportation system 155. The manufacturing matrix 100 can include at least one robotic arm 205. The manufacturing matrix 100 can include at least one digital support system 225. The digital support system 225 can include at least one sensor 230 and at least one indicator 235. The data processing system 175 can include a storage 412. The data processing system 175 can include at least one project processor 415. The data processing system 175 can include at least one instruction generator 420. The storage 412 can include project data 425 associated with one or more modular construction projects. The storage 412 can include inventory data 430 of one or more manufacturing matrices 100.

Figure 19:
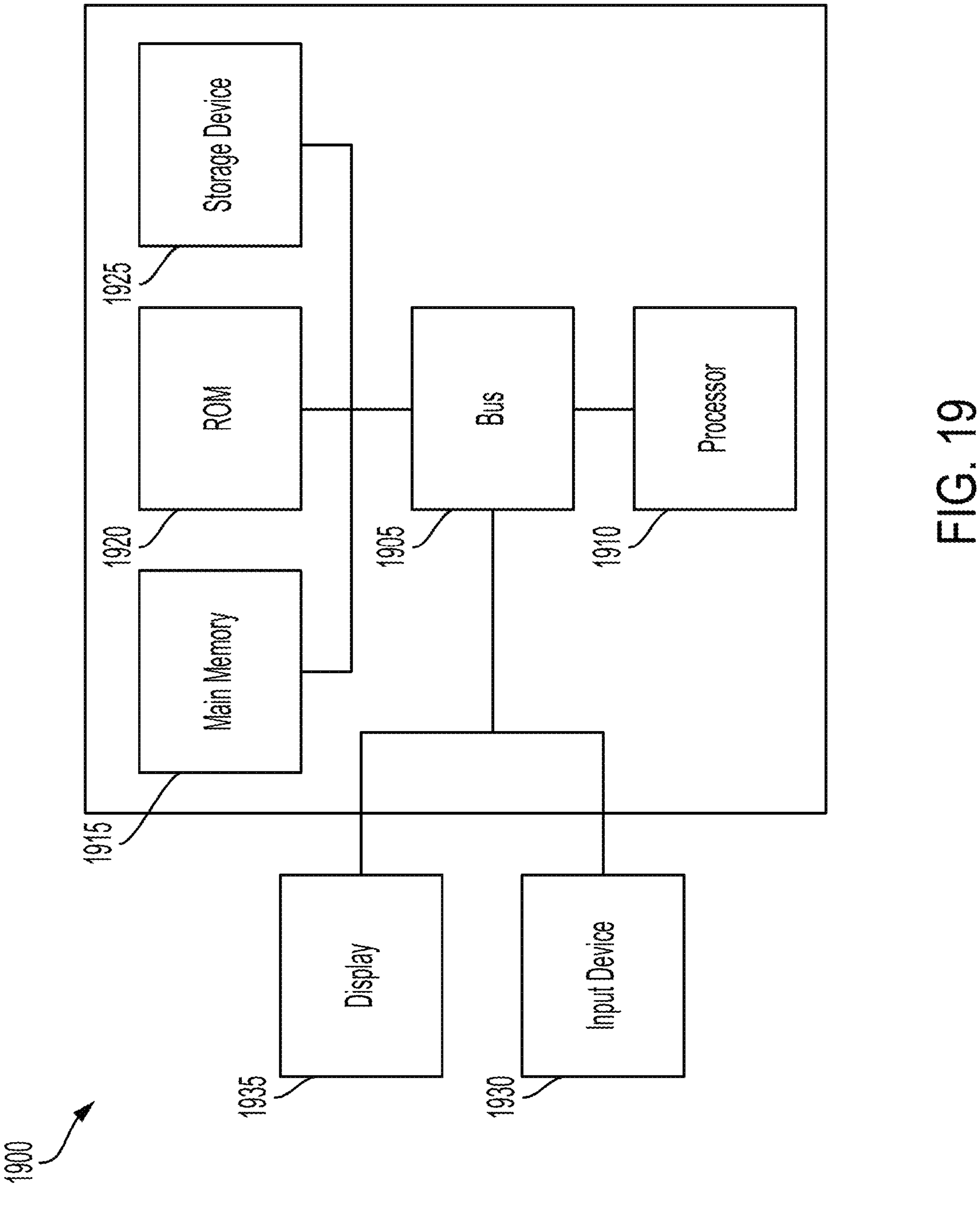
FIG. 19 depicts a schematic diagram of an example computer system.

Each of the components (e.g., the data processing system 175, the user device 410, the storage 412, the project data 425, inventory data 430, the project processor 415, the instruction generator 420, the manufacturing matrix 100, the transportation system 155, the robotic arm 205, the digital support system 225, the sensor 230, or the indicator 235) of the system 400 can be implemented using the hardware components or a combination of software with the hardware components of a computing system (e.g., computing system 1900) depicted in connection with FIG. 19. Each of the components of the data processing system 175, the user device 410, the transportation system 155, the robotic arm 205, or the digital support system 225 can perform the functionalities detailed herein. Although certain operations or techniques may be described herein from the perspective of the data processing system 175, the user device 410, the transportation system 155, the robotic arm 205, or the digital support system 225 can perform one or more of those operations or techniques in conjunction or in communication with the data processing system 175 or instead of the data processing system 175. For example, the user device 410, the transportation system 155, the robotic arm 205, or the digital support system 225 may include the data processing system 175 or one or more components of the data processing system 175.

The data processing system 175 can include at least one processor and a memory (e.g., a processing circuit). The memory (which can include the storage 412) can store processor-executable instructions that, when executed by processor, cause the processor to perform one or more of the operations described herein. The processor can include a microprocessor, an application-specific integrated circuit (ASIC), a field-programmable gate array (FPGA), a system-on-chip (SoC), or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The data processing system 175 can include any or all of the components and perform any or all of the functions of the computing system 1900 described herein in connection with FIG. 19. In some implementations, the data processing system 175 can be part of a cloud computing system, and can include one or more computing devices or servers that can perform various functions as described herein.

The user device 410 can include at least one processor and a memory (e.g., a processing circuit). The memory can store processor-executable instructions that, when executed by processor, cause the processor to perform one or more of the operations described herein. The processor can include a microprocessor, an ASIC, an FPGA, an SoC, or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The user device 410 can include any or all of the components and perform any or all of the functions of the computing system 1900 described herein in connection with FIG. 19.

The transportation system 155 can include at least one processor and a memory (e.g., a processing circuit). The memory can store processor-executable instructions that, when executed by processor, cause the processor to perform one or more of the operations described herein. The processor can include a microprocessor, a microcontroller, an ASIC, an FPGA, an SoC, or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The transportation system 155 can include any or all of the components and perform any or all of the functions of the computing system 1900 described herein in connection with FIG. 19.

The robotic arm 205 can include at least one processor and a memory (e.g., a processing circuit). The memory can store processor-executable instructions that, when executed by processor, cause the processor to perform one or more of the operations described herein. The processor can include a microprocessor, a microcontroller, an ASIC, an FPGA, an SoC, or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The robotic arm 205 can include any or all of the components and perform any or all of the functions of the computing system 1900 described herein in connection with FIG. 19.

The digital support system 225 can include at least one processor and a memory (e.g., a processing circuit). The memory can store processor-executable instructions that, when executed by processor, cause the processor to perform one or more of the operations described herein. The processor can include a microprocessor, a microcontroller, an ASIC, an FPGA, an SoC, or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The digital support system 225 can include any or all of the components and perform any or all of the functions of the computing system 1900 described herein in connection with FIG. 19.

The network 405 can include computer networks such as the Internet, local, wide, metro or other area networks, intranets, satellite networks, other computer networks such as voice or data mobile phone communication networks, and combinations thereof. The data processing system 175 of the system 400 can communicate via the network 405, for instance with at least one user device 410. The network 405 can be any form of computer network that can relay information between any of the computing devices described herein. In some implementations, the network 405 can include the Internet and/or other types of data networks, such as a local area network (LAN), a wide area network (WAN), a cellular network, a satellite network, or other types of data networks. The network 405 can include any number of computing devices (e.g., computers, servers, routers, network switches, etc.) that are configured to receive and/or transmit data within the network 405. The network 405 can further include any number of hardwired and/or wireless connections. Any or all of the computing devices described herein (e.g., the data processing system 175, the user device 410, the transportation system 155, the robotic arm 205, the computing system 1900, etc.) can communicate wirelessly (e.g., via Wifi, Bluetooth, cellular, radio, etc.) with a transceiver that is hardwired (e.g., via a fiber optic cable, a CAT5 cable, etc.) to other computing devices in the network 405. Any or all of the computing devices described herein (e.g., the data processing system 175, the user device 410, the transportation system 155, the robotic arm 205, the computing system 1900, etc.) can communicate wirelessly with the computing devices of the network 405 via a proxy device (e.g., a router, network switch, or gateway).

The user device 410 can include, but is not limited to, a personal computer, a laptop computer, a smart phone device, a mobile device, or another type of computing device. Each user device 410 can be implemented using hardware or a combination of software and hardware. Each user device 410 can include a display device, such as a liquid crystal display (LCD), a light-emitting diode (LED) display, or an organic light-emitting diode (OLED) display, among others. The display can be an interactive display such as a touchscreen. The user device 410 can include one or more input devices (e.g., a mouse, a keyboard, digital keypad, touchscreen, etc.) that can be used to receive user input.

The user device 410 can execute a manufacturing application 435. The manufacturing application 435 can display information relating to sensor data captured by the transportation system 155, the robotic arm 205, or the digital support system 225, or data determined or instructions generated by the data processing system 175. The manufacturing application 435 can present one or more user interfaces to a user, which can include various interactive user interface elements that allow a user to connect to a data processing system 175, a transportation system 155, a robotic arm 205, or a digital support system 225, provide instructions or input to such components, or otherwise communicate with or configure the data processing system 175, transportation system 155, robotic arm 205, or the digital support system 225. The manufacturing application 435 can receive, analyze, generate, or provide a product design 440 for a modular construction project 110. The product design 440 can be include data specific to the modular construction project 110. For example, the product design 440 can include at least one of the type of project, the materials needed for the project, the rules, regulations, or expectations for the project, the budget for the project, the estimated time for the project, or the number of products to be produced for the project, among others. The information displayed by the manufacturing application 435 can include any of the data associated with the product design, the project data 425, inventory data 430, information regarding the transportation system 155, the robotic arm 205, or the digital support system 225, graphs of sensor data, or other information relating to the information described herein. In some implementations, the manufacturing application 435 can perform any or all of the functionality of the data processing system 175.

The user device 410 can include one or more communications interfaces, with which the user device 410 (or the manufacturing application 435) can communicate information with other computing devices, such as the data processing system 175, the transportation system 155, the robotic arm 205, or the digital support system 225. The communications interfaces can include one or more wireless communications interfaces (e.g., a wireless- fidelity (Wi-Fi) communication interface, a Bluetooth communications interface, a Zigbee communications interface, a near-field communications (NFC) interface, etc.) or one or more wired communications interfaces (e.g., an Ethernet interface, a serial interface such as a universal serial bus (USB), a parallel interface, a discrete signal interface, etc.).

The storage 412 can be a computer memory configured to store or maintain any of the information described herein.

The storage 412 can store one or more data structures, which can contain, index, or otherwise store each of the values, pluralities, sets, variables, vectors, or thresholds described herein. The storage 412 can be accessed using one or more memory addresses, index values, or identifiers of any item, structure, or region maintained in the storage 412. The storage 412 can be accessed by the components of the data processing system 175, or any other computing device described herein via the network 405. The storage 412 can be internal to the data processing system 175. In some implementations, the storage 412 can exist external to the data processing system 175, and can be accessed via the network 405. The storage 412 can be distributed across many different computer systems or storage elements, and can be accessed via the network 405 or a suitable computer bus interface. The data processing system 175 can store, in one or more regions of the memory of the data processing system 175, or in the storage 412, the results of any or all computations, determinations, selections, identifications, generations, constructions, or calculations in one or more data structures indexed or identified with appropriate values. Any or all values stored in the storage 412 can be accessed by any computing device described herein, such as the data processing system 175, to perform any of the functionalities or functions described herein.

The storage 412 can store project data 425, for example, in one or more data structures. The project data 425 can include individual or aggregate readings from sensors of one or more transportation systems 155, robotic arms 205, or digital support systems 225. The project data 425 can include data points that the data processing system 175 extracts and generates based on a received modular product design 440. For example, the project data 425 can include the product design 440, an estimated time of completion for the project, a sequence of tasks to complete the project, a number of work cells to be used for the project and types of work cells, or instructions generated for the transportation system 155, the robotic arm 205, or the digital support system 225 based on the product design 440, among others.

The storage 412 can store inventory data 430, for example, in one or more data structures. The inventory data 430 can include the materials and subassemblies present in the manufacturing matrix. The inventory data 430 can include any additional material that may be needed for the project. The inventory data 430 can be determined by the data processing system 175 based on information received from the transportation system 155 or the robotic arm 205 of the manufacturing matrix 100.

As an illustrative example, the digital support system 225 of a work cell 105 can include or be communicably coupled with a user device 410 and a data processing system 175. The data processing system 175 can receive or store project data 425 for a modular construction product 110. The work cell 105 can be configured to facilitate construction of a subassembly of the modular construction project 110 (e.g., a panel 112, or a portion thereof) according to the project data 425. For example, the data processing system 175 can transmit digital assembly instructions to the digital support system 225. The digital assembly instructions can be, or be based on, the project data 425 for the subassembly of the modular construction project 110.

The data processing system 175 can transmit the digital assembly instructions to the user device 410 of the work cell 105. The user device 410 can display instructions to a user of the user device 410 via the manufacturing application 435 via a display. For example, the user device 410 can display instructions for the user to follow to assemble the subassembly. The digital assembly instructions can provide step by step instructions. For example, the user can interact with the user device 410 and indicate when a step is complete. Upon receipt of such indication, the user device 410 can display a subsequent step.

The user device 410 can be communicably coupled with the digital support system 225. For example, an indicator 235 of the digital support system 225 can generate and indication based on which step the user is on in the assembly process. For example, the user device 410 can display a first step. The indicator 235 can receive a signal from the user device 410 indicative of the first step or can detect the first step. The indicator 235 can generate a first indication for the user based on the first step. For example, the first step can indicate to cut a piece of material at a target length. The indicator 235 can detect the step and emit a light based on the target length. For example, the target length can be a length and the emitted light can be the length of the target length. A user can align the piece of material adjacent to the emitted light to determine where to cut the piece of material to obtain the target length.

The indicator 235 can generate a second indication for the user based on a second step. For example, once the first step is complete, the user can indicate via the user device that the first step is complete. Once the first step is complete, the sensor 230 of the digital support system 225 can detect completion of the first step and transmit a signal to the user device 410 that the first step is complete. The user device 410 can display the second step upon receipt of the indication from the user or receipt of the signal from the sensor 230. An indicator 235 (either the same indicator from the first step or a different indicator of the work cell 105) can detect the second step and generate a second indication based on the second step. For example, the second step can indicate a component is needed. The component can be stored in a receptacle associated with the indicator 235. The indicator 235 associated with the receptacle containing the component can generate the second indication such that the user obtains the correct component. The indicators 235 of the work cell 105 can automatically generate different indications based on the active step of assembly.

The sensor 230 of the digital support system 225 can monitor the movements of the user or the assembly of the subassembly and detect a project characteristic. For example, the sensor 230 can detect if a piece of material is the wrong size or if a wrong component is being used, among others. The sensor 230 can generate a signal to transmit to at least one of an indicator 235 or the user device 410 to alert the user of the detected issue or when a task is successfully completed.

FIGS. 5-8 depict an example panel transport device 170. The panel transport device 170 can transport a panel 112 of the modular construction product 110. The panel transport device 170 can include a post 505. The post 505 can include at least one connector 510. The connector 510 can couple the panel 112 with the post 505.

The panel transport device 170 can include at least one base 515. The base 515 can be coupled with the post 505. The base 515 can stabilize the panel transport device 170. The base 515 include a base body 520. The base body 520 can couple with the post 505. The base 515 can include at least one support arm 525. For example, a first support arm 525 can extend from a first side of the base body 520 and a second support arm 525 can extend from a second side of the base body 520.

The panel transport device 170 can include at least one plate 530. The plate 530 can couple with the base 515. The plate 530 can be disposed at a bottom of the post 505. The plate 530 can support the panel 112.

The panel transport device 170 can include at least one traction element, shown as wheel 535. The wheel 535 can facilitate movement of the panel transport device 170 to move a panel 112 from our first location to a second location. The panel transport device 170 can include a plurality of wheels 535. For example, a first wheel 535 can be coupled with a first support arm 525. A second wheel 535 can be coupled with a second support arm 525. The third wheel 535 can be coupled with the plate 530.

Figure 8:
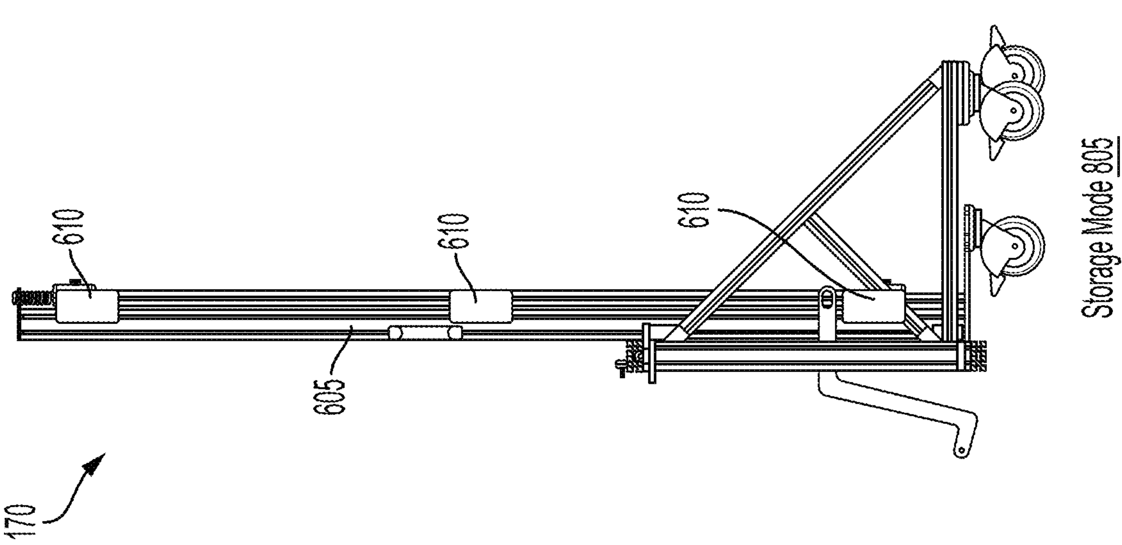
FIG. 8 depicts side views of an example panel transport device.

As depicted in FIG. 8, among others, the panel transport device 170 can transition between a storage mode 805 and a transport mode 810. For example, the plate 530 can extend in a first direction from the post 505. In the storage mode 805, these support arms 525 can extend from the base body 520 in the first direction. For example, the support arms 525 can extend in the same direction as the plate 530 with the panel transport device 170 in the storage mode 805. In the transport mode 810, the support arms 525 can extend from the base body 520 in a second direction. The second direction can be different than the first direction of the plate 530. For example, in the transport mode 810 the support arms 525 can extend from a side of the base body 520. The second direction can be perpendicular to the first direction.

Figure 9:
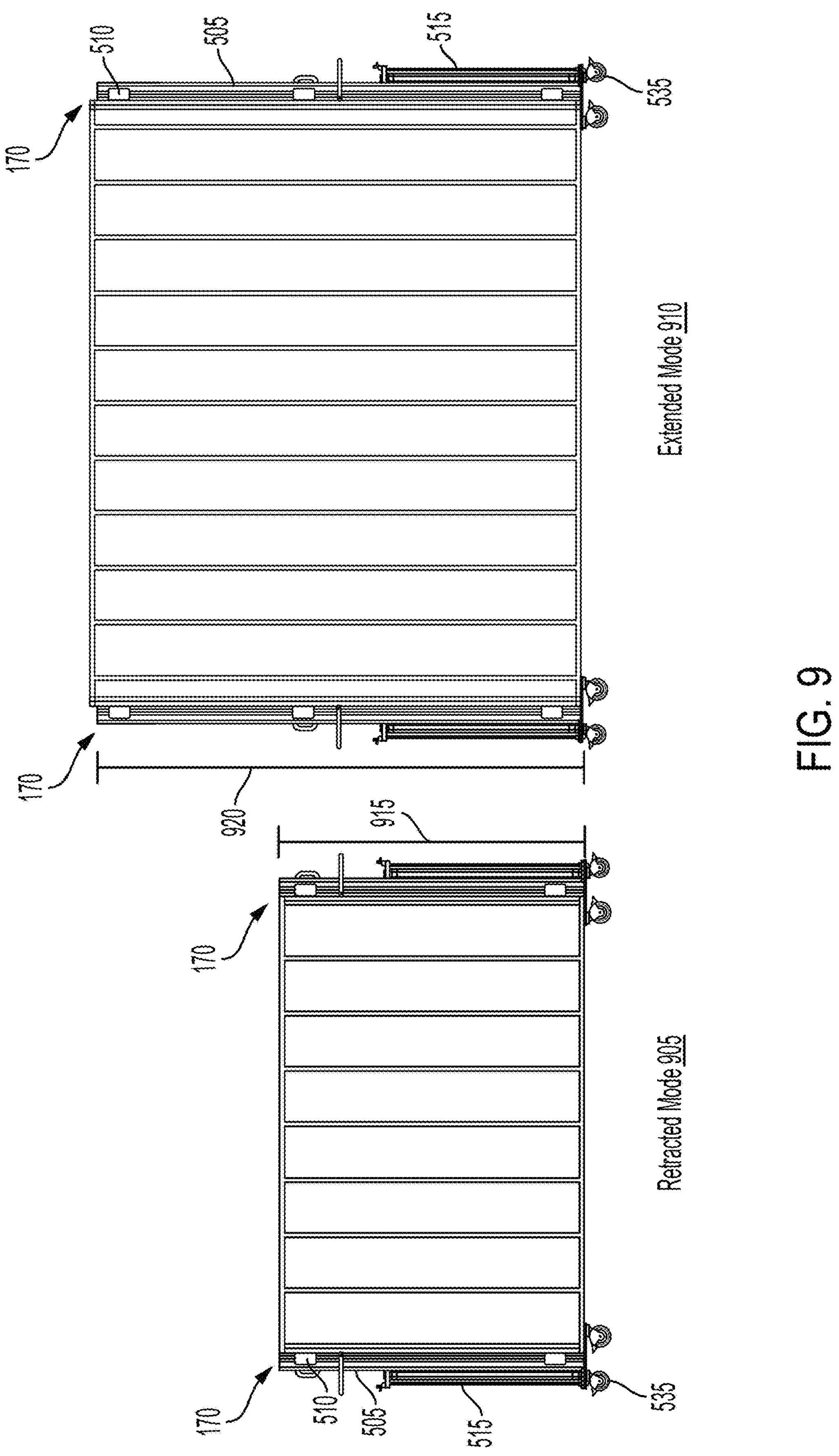
FIG. 9 depicts a plurality of panel transport devices supporting a plurality of panels.

FIG. 9 depicts a plurality of example panel transport devices 170 supporting example panels 112. A plurality of panel transport devices 170 can be used to transport a panel 112. For example, a first panel transport device 170 can couple with a first side of a panel 112 and a second panel transport device 170 can couple with a second side of the panel 112. The panel transport device 170 can accommodate panels 112 of various heights. For example, the panel transport device 170 can transition between a retracted mode 905 and an extended mode 910. In the retracted mode 905, the panel transport device 170 can have a first height 915. In the extended mode 910, the panel transport device 170 can have a second height 920. The second height 920 can be greater than the first height 915. The post 505 can have any form of extension means (e.g., a telescoping function, folding function, etc.) to transition between the retracted mode 905 and the extended mode 910.

Figure 10:
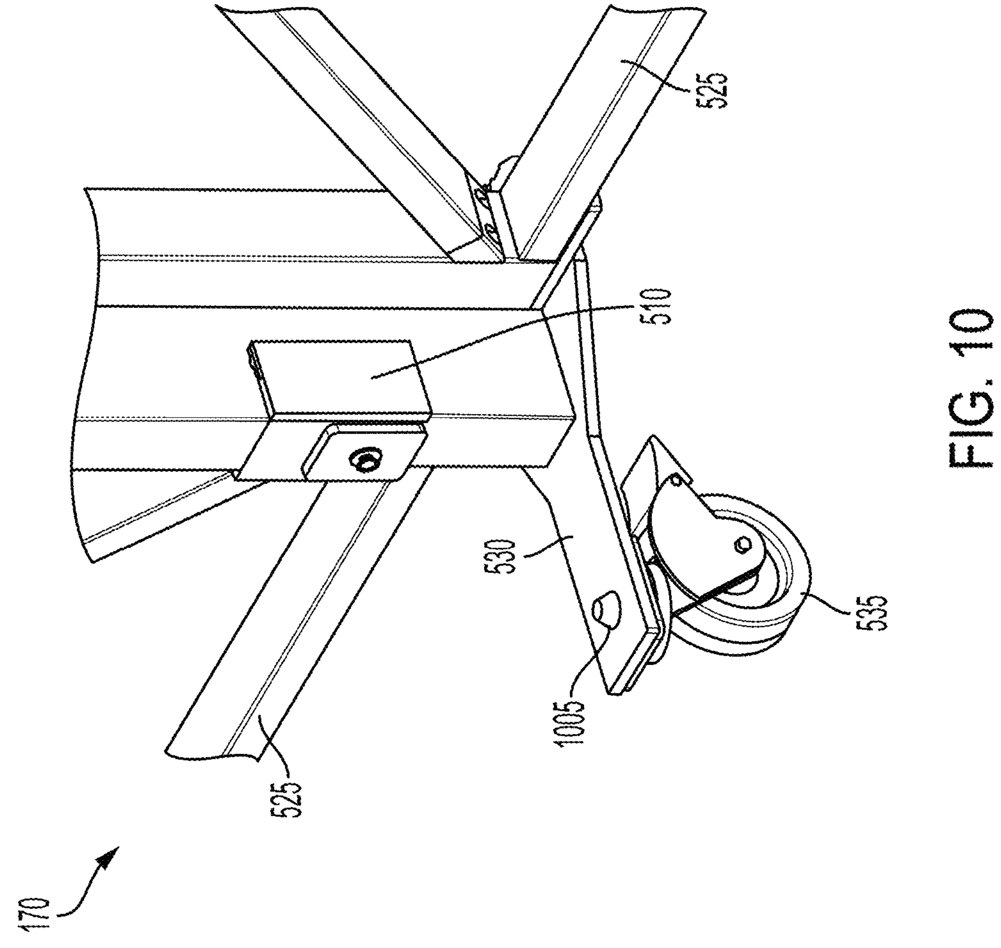
FIG. 10 depicts a perspective view of a portion of a panel transport device.

FIG. 10 depicts a bottom portion of an example panel transport device 170. The plate 530 can include at least one engagement feature 1005. The engagement feature 1005 can engage with the panel 112 to maintain a position of the panel 112 on the plate 530. For example, the engagement feature 1005 can facilitate proper alignment of the panel 112 with the panel transport device 170. The engagement feature 1005 can be a protrusion that extends from the plate 530. For example, the engagement feature 1005 can be a pin. Engagement feature 1005 can have a tapered shape. For example, the engagement feature 1005 can be a truncated cone. The engagement feature 1005 can extend from a top surface of the plate 530. The engagement feature 1005 can prevent the panel 112 from sliding off plate 530. For example, the engagement feature 1005 can interface with a corresponding feature of the panel 112.

The engagement feature 1005 can be actuatable. For example, the engagement feature 1005 can move between a first position and a second position. The first position can include the engagement feature 1005 being in a loading position. The loading position can facilitate or allow placement of the panel 112 on the panel transport device 170. In the loading position, the engagement feature 1005 can be retracted. For example, the engagement feature 1005 can be flattened, be flat with the plate 530, or extend into the plate 520. The second position can include the engagement feature 1005 in a holding position. The holding position can facilitate or enable the panel transport device 170 to maintain a position of the panel 112. In the holding position, the engagement feature 1005 can be extended. For example, the engagement feature 1005 can extend from the surface of the plate 530.

The engagement feature 1005 can be automatically or manually actuated. For example, the engagement feature 1005 can be or include a biasing element to bias the engagement feature to either the first position or the second position. For example, the biasing element can bias the engagement feature 1005 to the holding (e.g., extended) position. The panel 112 or a user can apply a force to the engagement feature 1005 to cause the engagement feature 1005 to move to the first (e.g., retracted) position when setting the panel 112 on, or inserting the panel 112 in, the panel transport device 170. The engagement feature 1005 can automatically bias back to the second position with the panel 112 in the proper position. For example, a corresponding locating feature of the panel 112 can align with the engagement feature 1005 to allow movement of the engagement feature 1005 from the retracted position to the extended position. The engagement feature 1005 can have no biasing element such that a user can move the engagement feature 1005 between the first and second positions. The engagement feature 1005 can be electrically controlled such that a controller or computing system (e.g., user device 410 or data processing system 175) can transmit a signal to cause the engagement feature 1005 to move between the first position and the second position.

Figure 11:
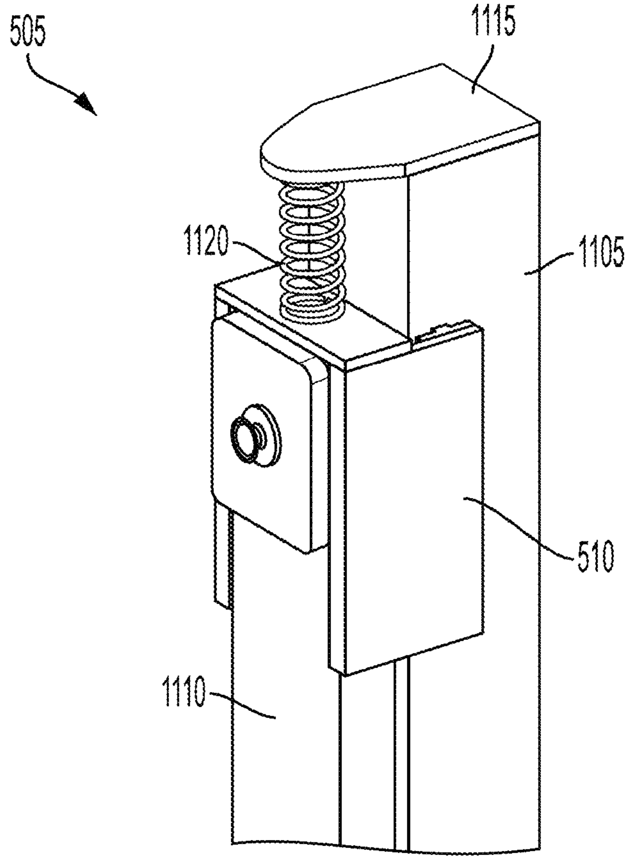
FIG. 11 depicts a perspective view of a portion of a panel transport device.

FIG. 11 depicts a portion of an example post 505. The post 505 can include a plurality of members. For example, the post 505 can include a first member, shown as support member 1105. The post 505 can include a second member, showing it as connector member 1110. The support member 1105 can be coupled with the connector member 1110. The connector member 1110 can move relative to the support member 1105. For example, the support member 1105 can have at least one end plate 1115. The post 505 can include at least one compliant member, shown as spring 1120. The spring 1120 can be disposed between an end of the connector member 1110 and the end plate 1115. This spring 1120 can facilitate translational movement of the connector member 1110 relative to the support member 1105. The movement of the connector member 1110 can help maintain a connection between the panel 112 and the connectors 510.

Figure 12:
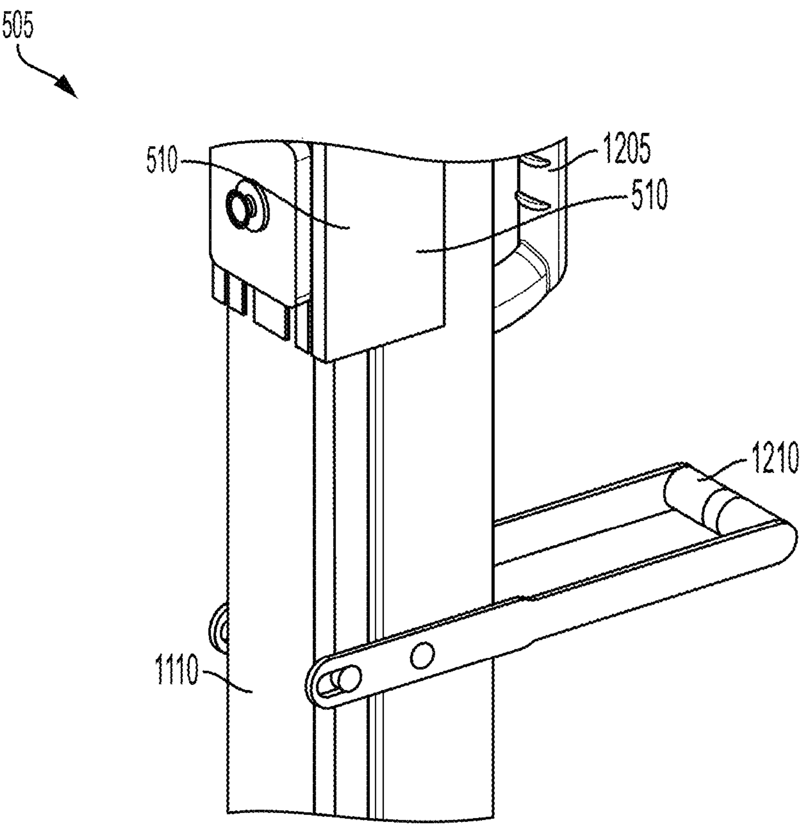
FIG. 12 depicts a perspective view of a portion of a panel transport device.

FIG. 12 depicts a portion of an example post 505. Post 505 can include at least one handle. For example, the post 505 can include a first handle, shown as transport handle 1205. An operator of the panel transport device 170 can grip the transport handle 1205 to facilitate movement of the panel transport device 170. The post 505 can include a second handle, shown as engagement handle 1210. The engagement handle 1210 can be actuated to selectively engage or disengage the panel 112. For example, activation of the engagement handle 1210 can cause the connector 510 to couple with the panel 112. Deactivation of the engagement handle 1210 can cause the connector 510 to decouple from the panel 112.

Figure 13:
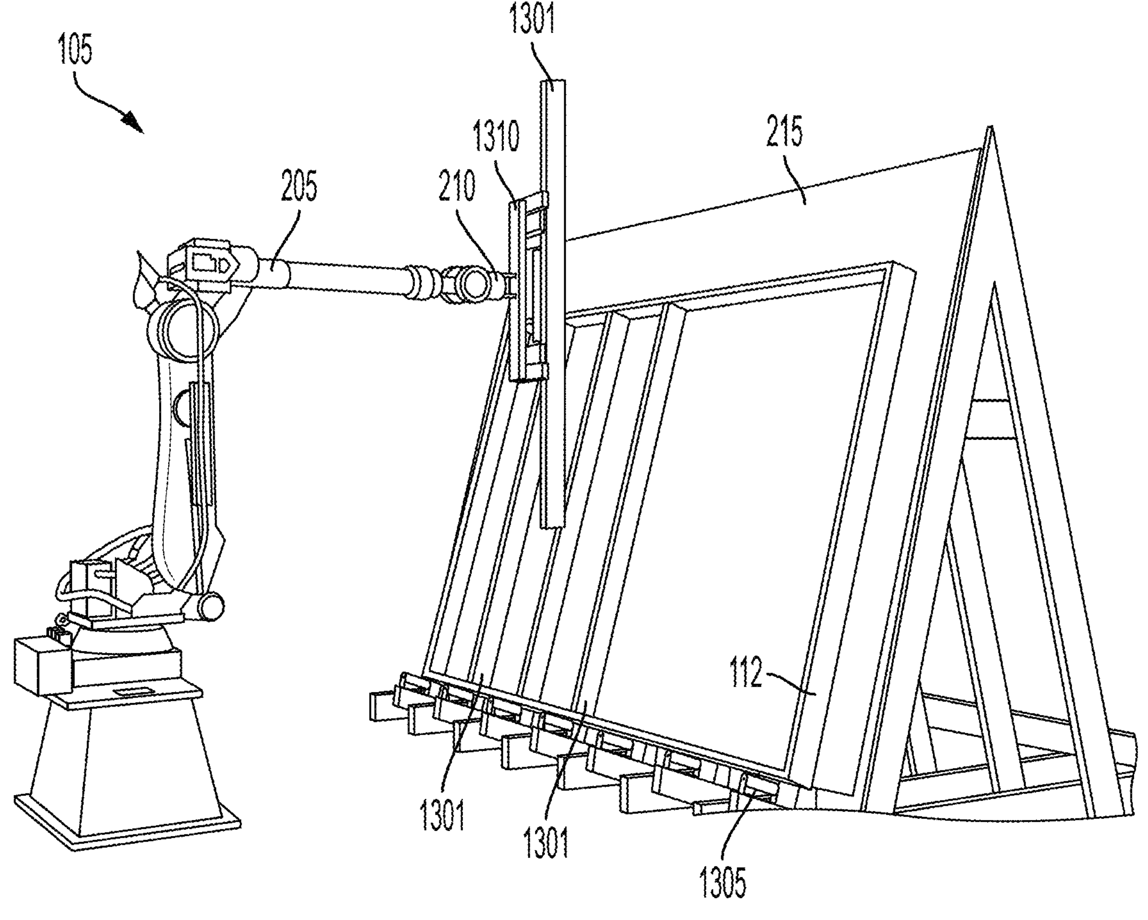
FIG. 13 depicts a perspective view of an example work cell.

FIG. 13 depicts an example work cell 105. A work cell 105 can include at least one work surface 215. The work surface 215 can facilitate assembly of a modular construction product 110. For example, the work surface 215 can facilitate a subassembly of the modular construction product 110. The subassembly can be a panel 112, for example. The panel 112 can include a plurality of members 1301. The members 1301 can be any material, shape, or size. For example, a member 1301 can be an elongated rectangular wood board (e.g., a 2×4). The plurality of members 1301 can be coupled together to form the panel 112. The work surface 215 can have a vertical orientation. For example, the work surface 215 can be angled relative to a flat surface (e.g., a floor). The work surface 215 can be oriented such that the panel 112 can lean up against the work surface 215.

The work surface 215 can include a panel movement system, shown as roller system 1305. The roller system 1305 can facilitate lateral movement of the panel 112 along the work surface 215. For example, the roller system 1305 can allow the panel 112 to slide along the work surface 215.

The robotic arm 205 can utilize a tool, shown as arm tool 1310 to assemble the modular construction product 110. For example, the robotic arm 205 can use an arm tool 1310 to assemble a panel 112 of the modular construction product 110. The arm tool 1310 can couple with the robotic arm 205 via the interface 210. The arm tool 1310 can be any type of tool. The arm tool 1310 can be interchangeable. For example, the robotic arm 205 can use a first arm tool 1310 for a first task and a second arm tool 1310 for a second task.

Figure 14A:
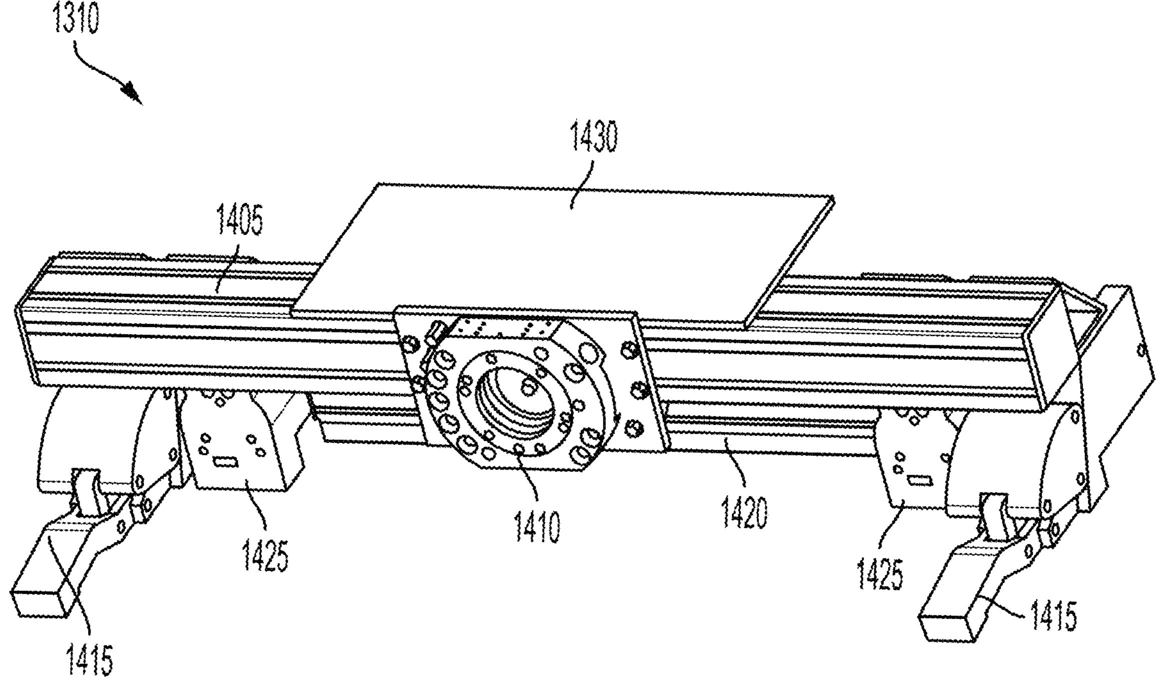
FIG. 14A depicts a rear perspective view of an example arm tool.
Figure 14B:
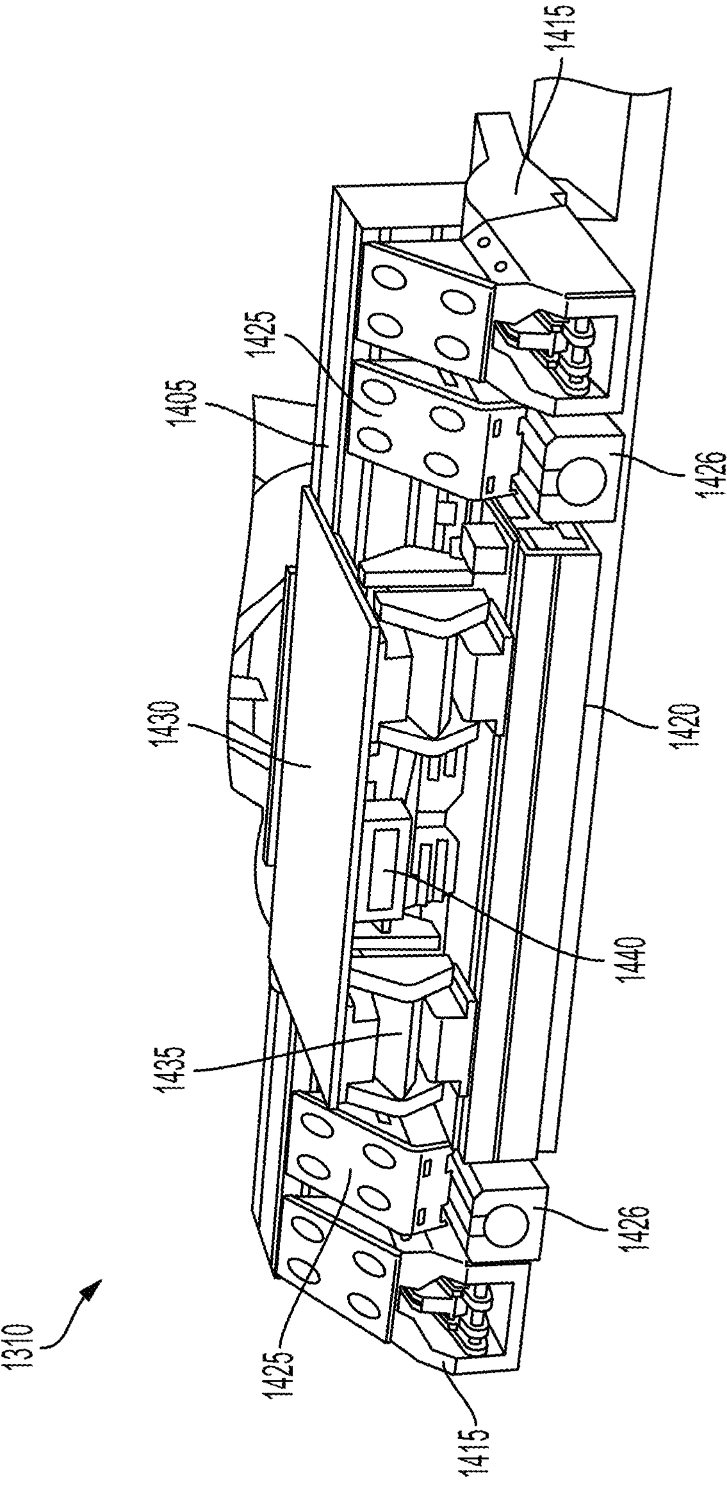
FIG. 14B depicts a front perspective view of an example arm tool.
Figure 15:
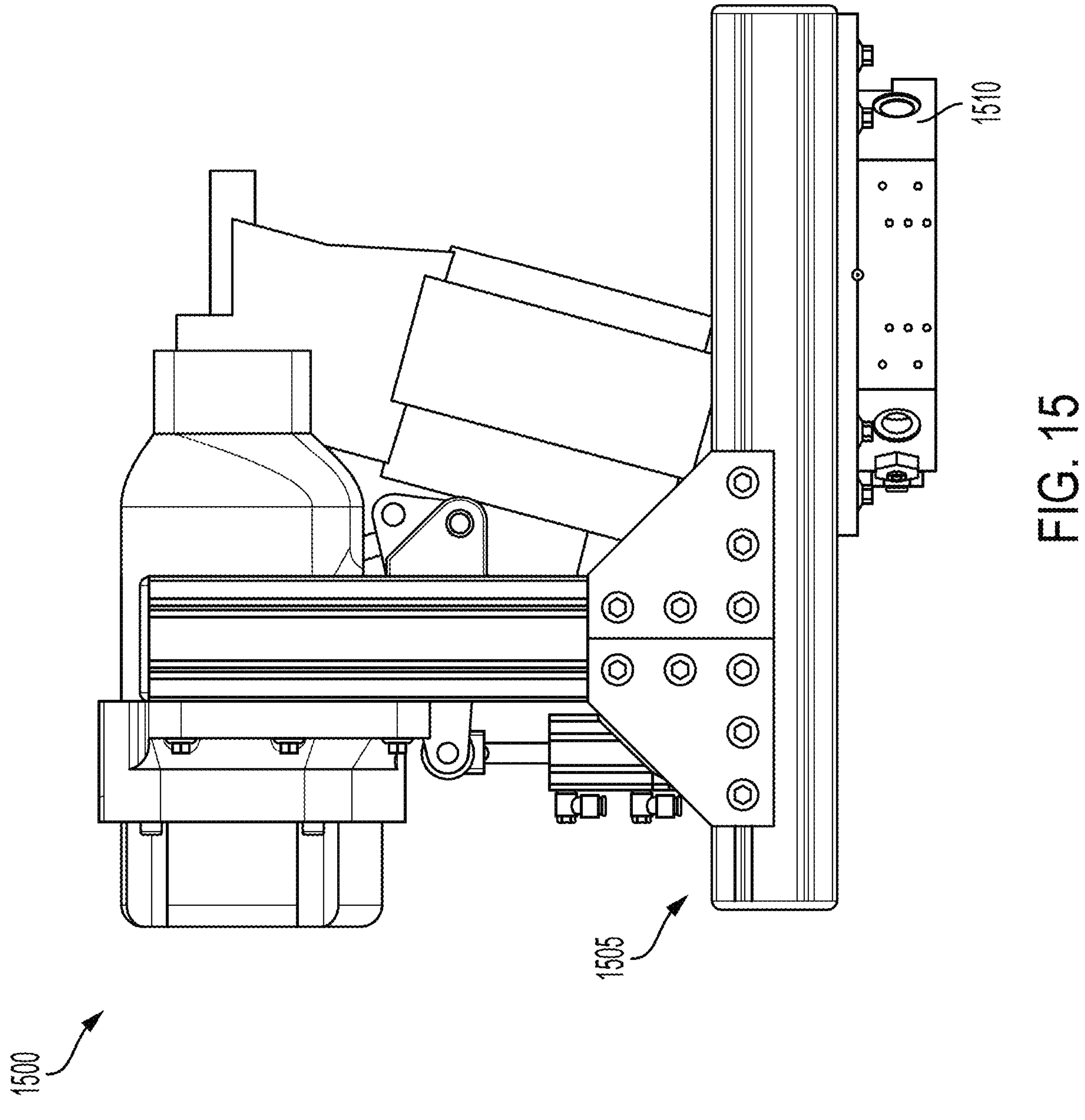
FIG. 15 depicts a side view of an example nailer.
Figure 16:
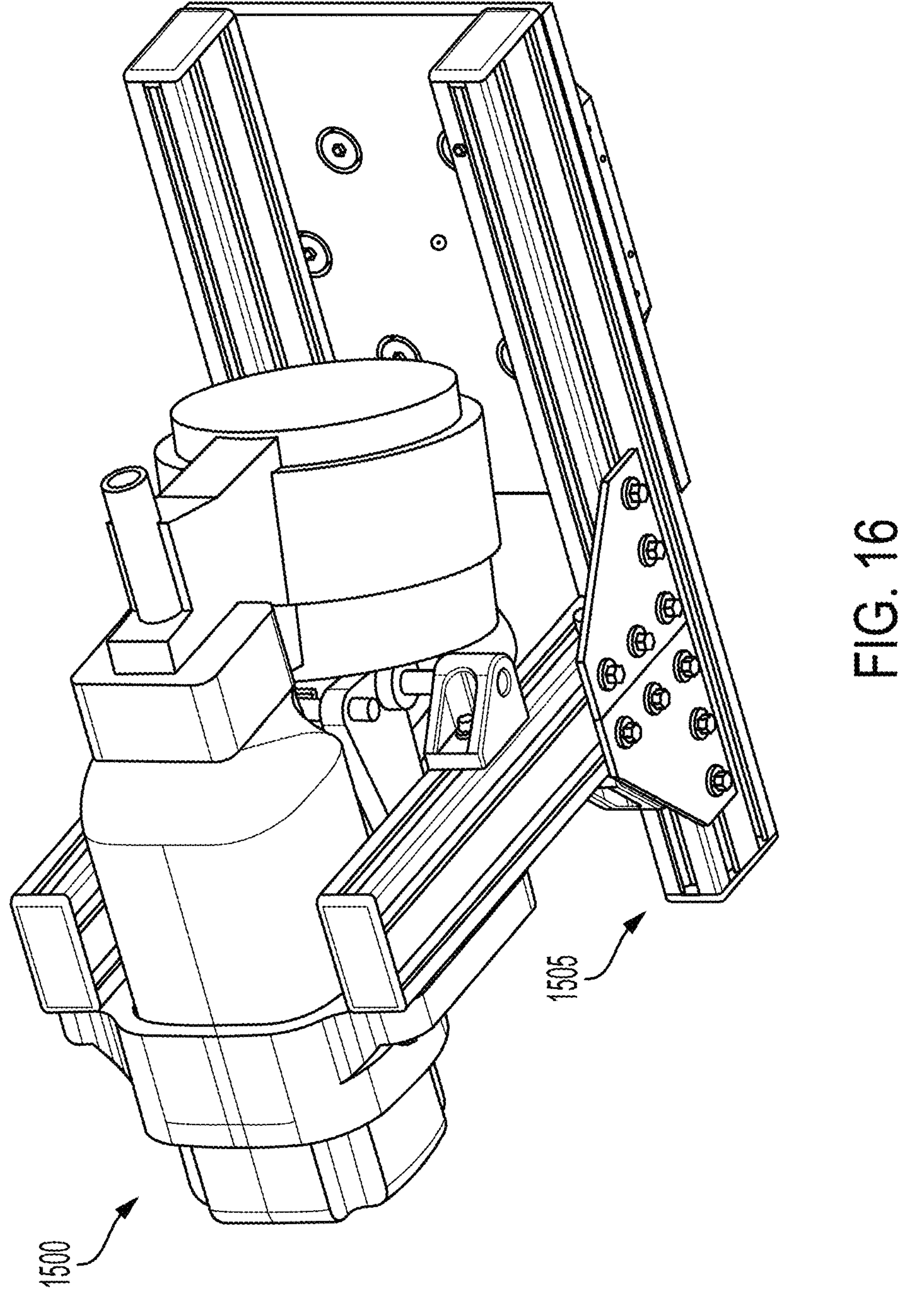
FIG. 16 depicts a front perspective view of an example nailer.
Figure 17:
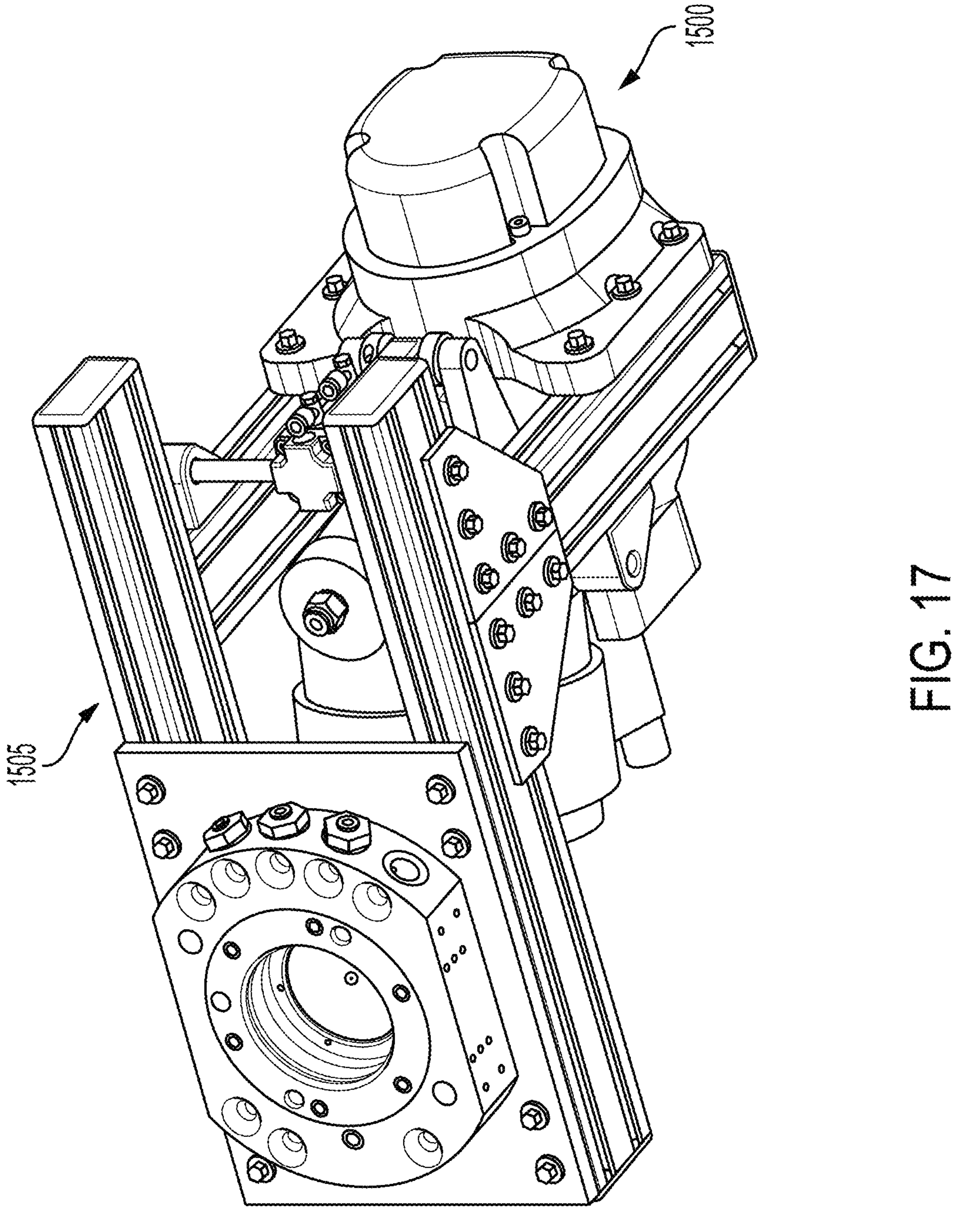
FIG. 17 depicts a rear perspective view of an example nailer.
Figure 18:
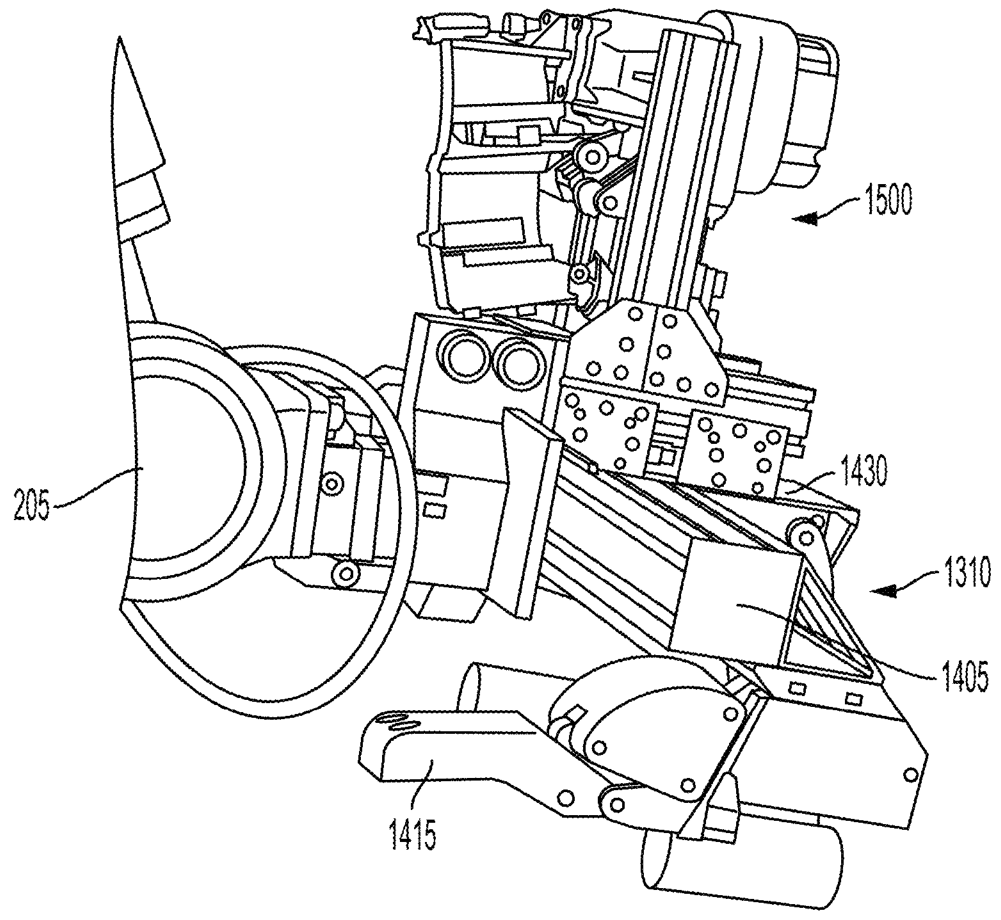
FIG. 18 depicts a side perspective view of an example nailer coupled with an example arm tool.

FIGS. 14A AND 14B depict an example arm tool 1310. The arm tool 1310 can include at least one modular chassis, shown as main body 1405. The arm tool 1310 can include at least one tool interface 1410. The tool interface 1410 can be coupled with the main body 1405. The tool interface 1410 can couple the arm tool 1310 with the robotic arm 205 via the interface 210.

The arm tool 1310 can include at least one retention mechanism, shown as gripper 1415. The gripper 1415 can hold a component (e.g., a member 1301 for a panel 112) in place relative to the arm tool 1310. For example, the gripper 1415 can temporarily couple the component with the arm tool 1310. The gripper 1415 can be coupled with the main body 1405. The gripper 1415 can move between a first (e.g., open) position and a second (e.g., closed) position to selectively engage at least a portion of the component. For example, the gripper 1415 can at least partially wrap around the component to secure the component to the arm tool 1310. The arm tool 1310 can include a plurality of grippers 1415. For example, a first gripper 1415 can be disposed at or proximate to a first end of the main body 1405 and a second gripper 1415 can be disposed at or proximate to a second end of the main body 1405. The plurality of grippers 1415 can be controlled individually or together.

The arm tool 1310 can include at least one retention mechanism, shown as suction device 1420. The suction device 1420 can hold a component in place relative to the arm tool 1310. For example, the suction device 1420 can temporarily couple the component with the arm tool 1310 via suction. The suction device 1420 can be coupled with the main body 1405. The suction device 1420 can be disposed between the grippers 1415.

The arm tool 1310 can include at least one retention mechanism, shown as magnet holder 1425. The magnet holder 1425 can selectively engage a magnetic assembly 1426. For example, the robotic arm 205 can position the arm tool 2200 such that the magnetic assembly 1426 is disposed in the magnet holder 1425. The magnet holder 1425 can actuate to temporarily couple with the magnetic assembly 1426. The actuation can also deactivate the magnetic assembly 1426 (e.g., turn off the magnetic force) such that the magnetic assembly 1426 decouples from a surface to which the magnetic assembly was previously magnetically coupled with. The magnet holder 1425 can be coupled with the main body 1405. The magnet holder 1425 can be disposed between a gripper 1415 and a suction device 1420.

The magnetic assembly 1426 can be removably coupled with the magnet holder 1425. For example, the magnetic assembly 1426 can detach from the magnet holder 1425 to couple with the work surface 215. The magnetic assembly 1426 can magnetically couple with the work surface 215 and hold a component at a desired position and orientation against the work surface 215. For example, the magnetic assembly 1426 can switch between a first and second state (e.g., on/off, magnetic/non-magnetic). In the magnetic state, the magnetic assembly 1426 can couple with the work surface 215 and hold a component against the work surface 215.

Figure 20:
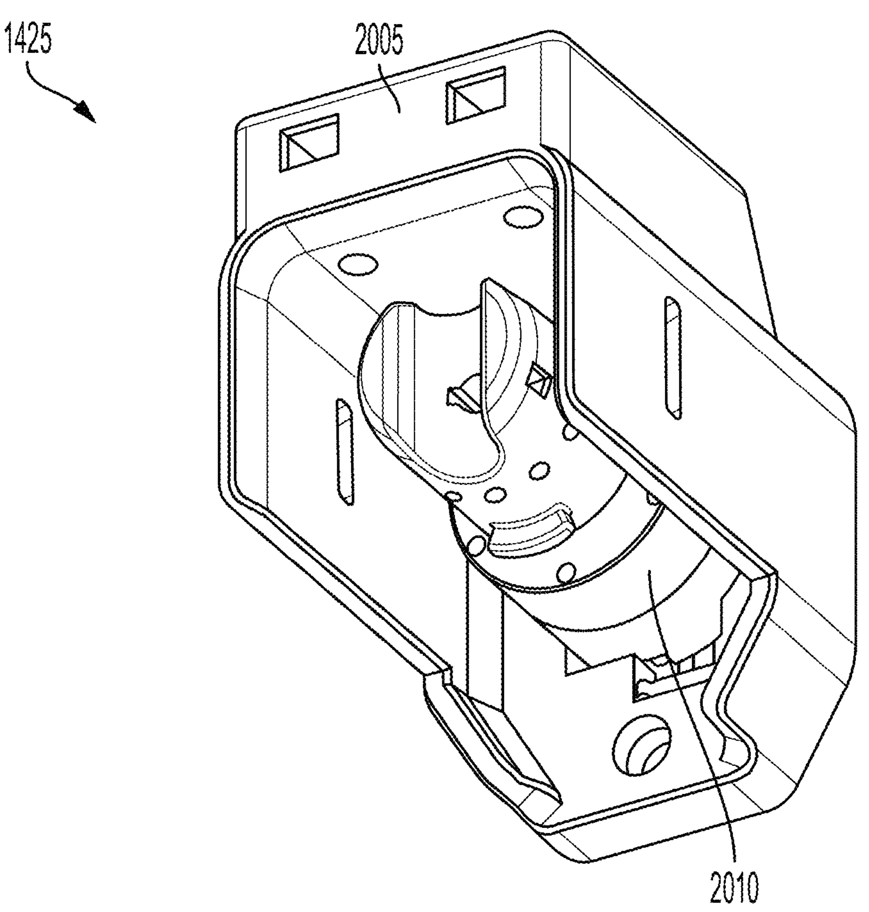
FIG. 20 depicts a perspective view of an example magnet holder.
Figure 21:
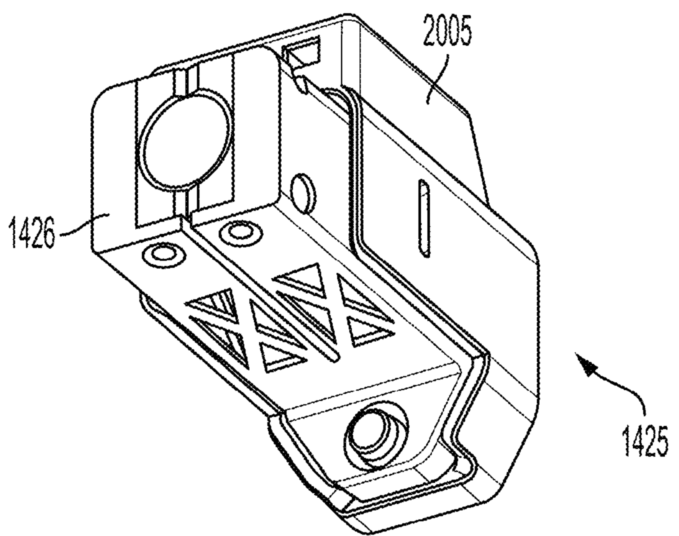
FIG. 21 depicts a perspective view of an example magnet holder and an example magnetic assembly.
Figure 22:
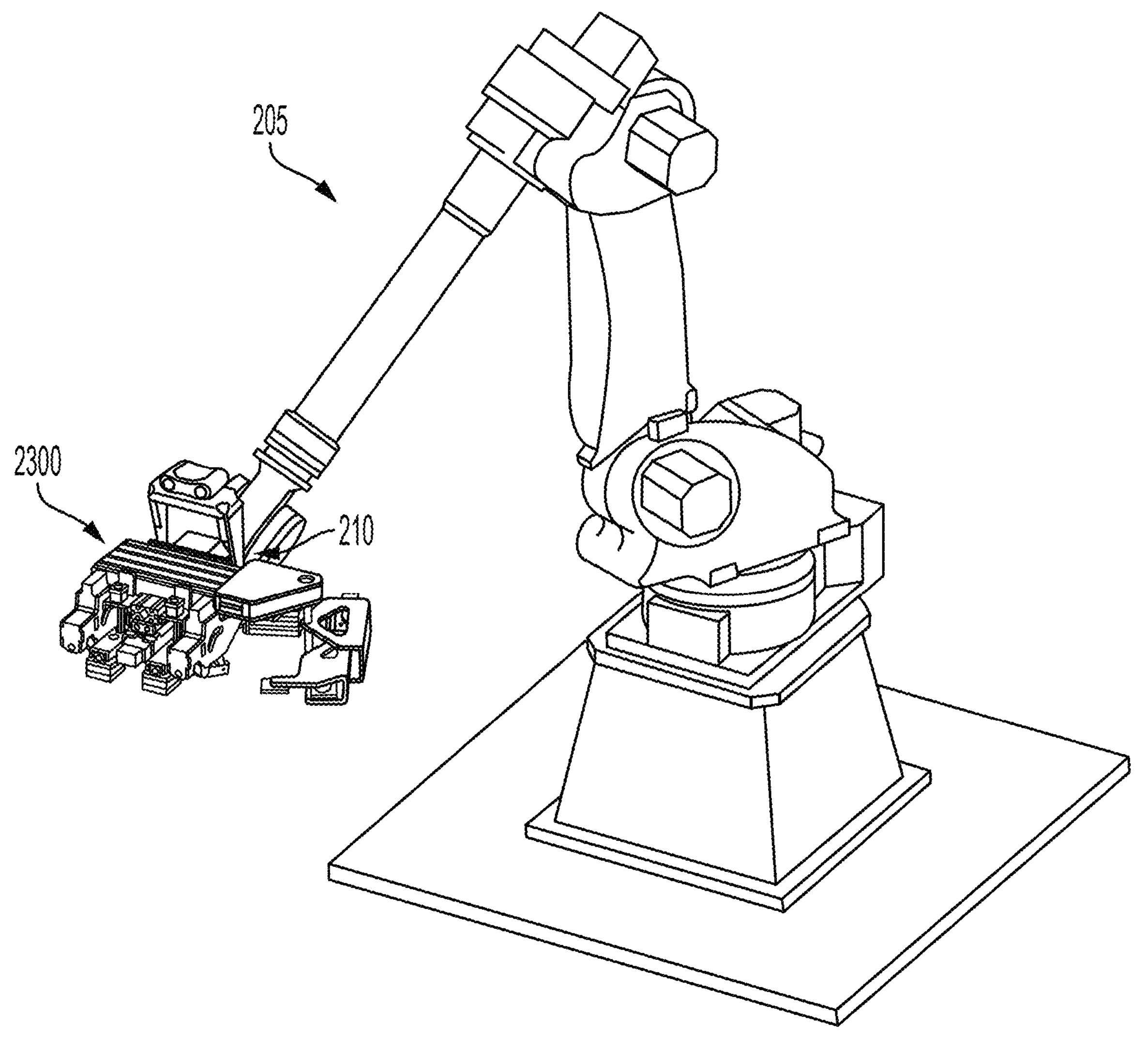
FIG. 22 depicts a perspective view of an example robotic arm with an example arm tool.
Figure 23:
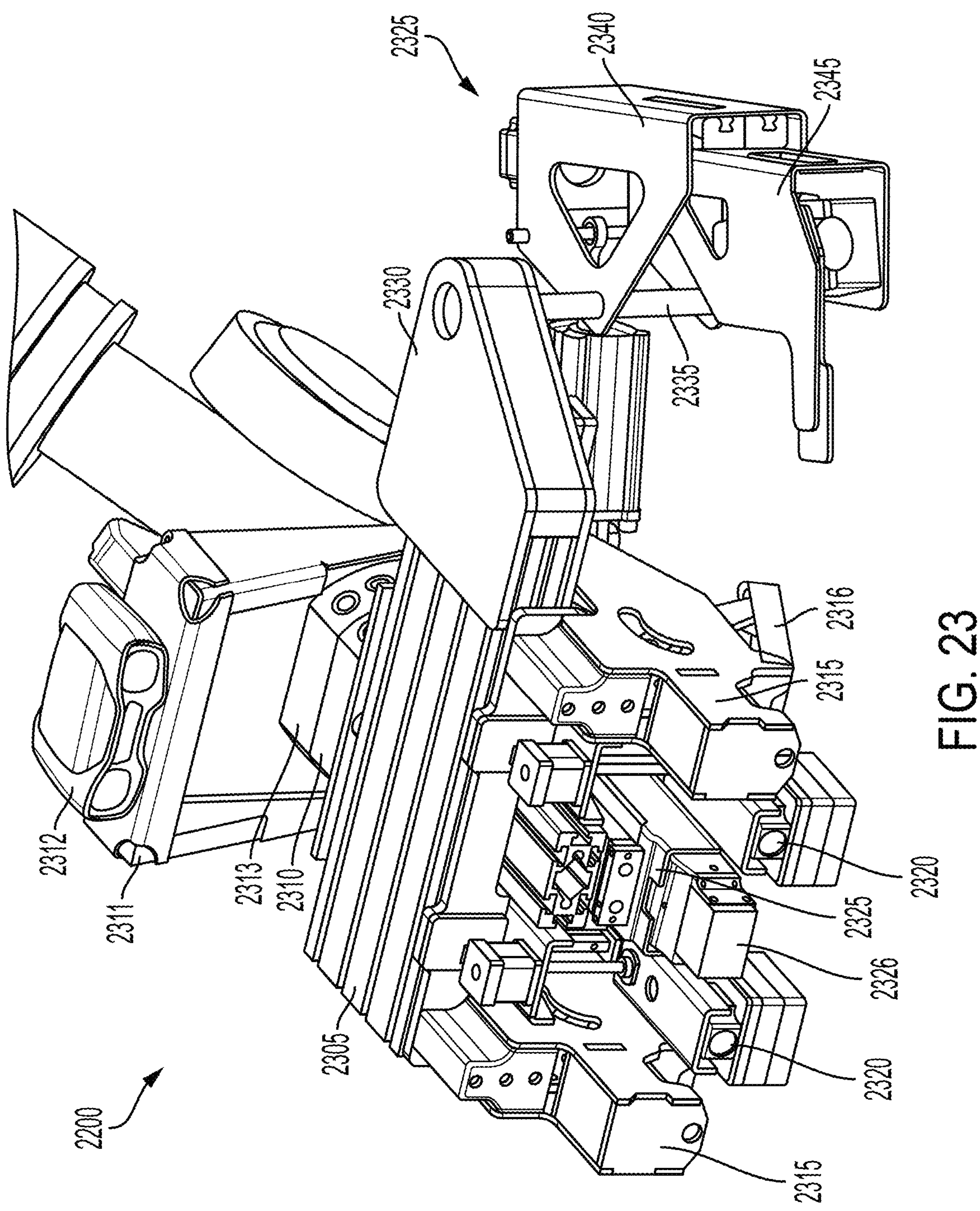
FIG. 23 depicts a front perspective view of an example arm tool.
Figure 24:
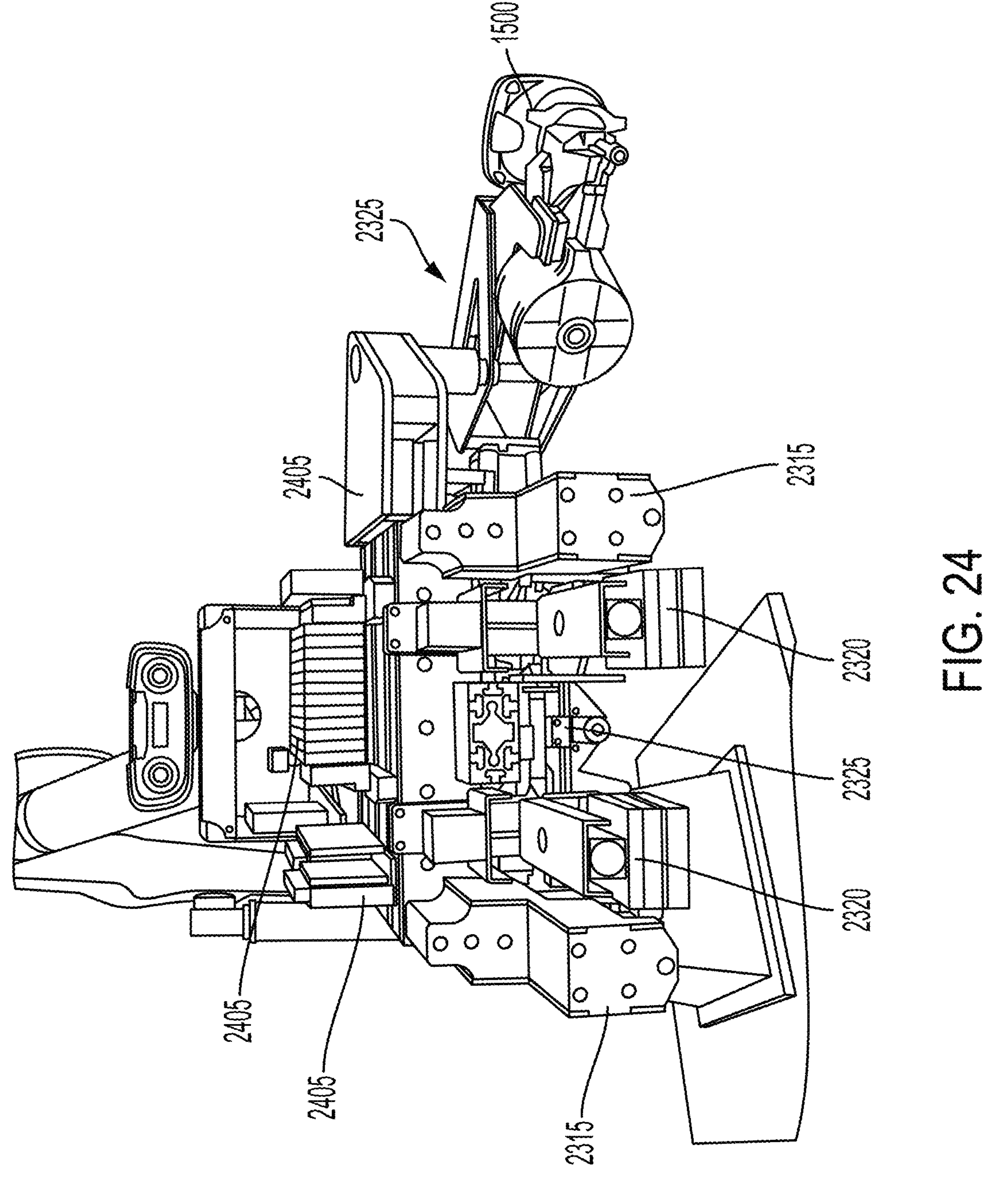
FIG. 24 depicts a front view of an example arm tool.
Figure 25:
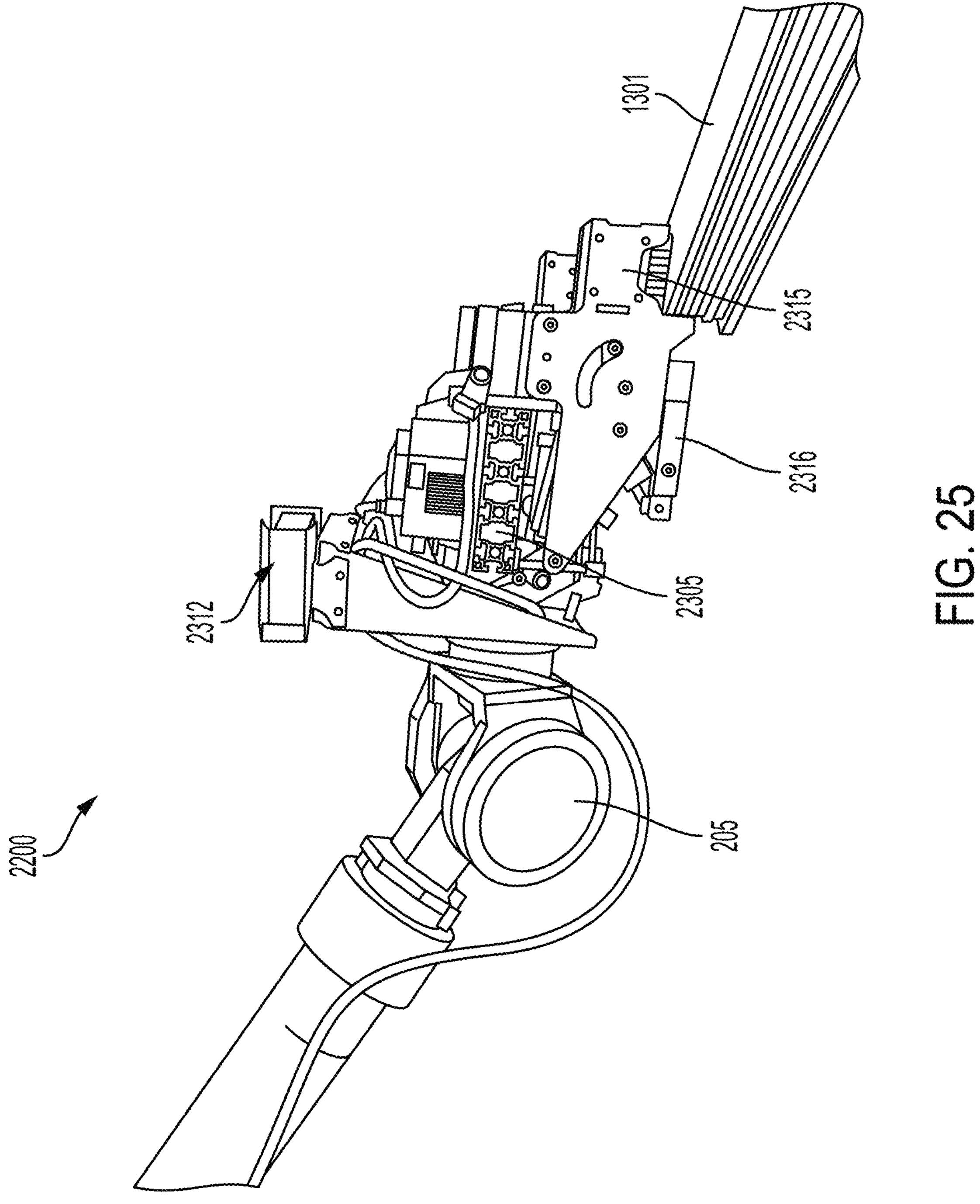
FIG. 25 depicts a side view of an example arm tool.

FIG. 20 depicts an example magnet holder 1425. FIG. 21 depicts an example magnetic assembly 1426 coupled with an example magnet holder 1425. The magnet holder 1425 can include at least one housing 2005. The magnet holder 1425 can include at least one actuator 2010. The actuator 2010 can be, for example, a pneumatic rotary actuator 2010. The actuator 2010 can be disposed in the housing 2005. The actuator 2010, when actuated, can cause the magnetic assembly 1426 to switch from the first state to the second state and simultaneously engage or disengage the magnetic assembly 1426 with the magnet holder 1425. For example, the magnetic assembly 1426 can be at least partially disposed in the housing 2005 and engaged with the magnet holder 1425. The actuator 2010 can cause the magnetic assembly 1426 to detach from the magnet holder 1425 and cause the magnetic assembly 1426 to become magnetic at the same time. For example, a first movement of the actuator 2010 can turn the magnetic assembly 1426 on (e.g., magnetic) and disengage the magnetic assembly 1426 from the magnet holder 1425. A second movement of the actuator 2010 can turn the magnetic assembly 1426 off (e.g., non-magnetic) and engage the magnetic assembly 1426 with the magnet holder 1425.

The magnetic assembly 1426 can couple with the work surface 215 and apply a pressure to a component to hold the component against the work surface 215. The magnetic assembly 1426 can be re-coupled with the magnet holder 1425 and be removed from the work surface 215 to release the component from the work surface 215.

The arm tool 1310 can include a plurality of magnet holders 1425. For example, the arm tool 1310 can include a first magnet holder 1425 and a second magnet holder 1425. The first magnet holder 1425 can be disposed between a first gripper 1415 and a first end of the suction device 1420. The second magnet holder 1425 can be disposed between a second gripper and a second end of the suction device 1420. The plurality of magnet holders can be controlled individually or together.

The arm tool 1310 can include at least one plate 1430. The plate 1430 can provide support to other components of the arm tool 1310 and couple components to the arm tool 1310. The plate 1430 can be coupled with the main body 1405. For example, a portion of the plate 1430 can be coupled with a top of the main body 1405. The plate 1430 can extend from the main body 1405 in a direction opposite the tool interface 1410. For example, the plate 1430 can have over an edge of the main body 1405. The suction device 1420 can be coupled with the plate 1430. For example, the arm tool 1310 can include at least one connector 1435. The 1435 can extend between the suction device 1420 and the plate 1430 to couple the suction device 1420 with the plate 1430. The suction device 1420 can couple with at least one of the plate 1430 or the main body 1405.

The arm tool 1310 can include at least one camera 1440. The camera 1440 can be disposed centrally on the arm tool 1310. The camera 1440 can be disposed on a side of the arm tool 1310 opposite the tool interface 1410. The camera 1440 can be coupled with the plate 1430. The camera 1440 can be communicably coupled with at least one of the robotic arm 205 or the data processing system 175 to facilitate selection of proper materials and tools, proper placement of materials, and accurate execution of tasks. For example, positioning of the robotic arm 205 can be based on images or video captured or detected by the camera 1440.

The arm tool 1310 can include any combination of components. For example, the arm tool 1310 can have any number and any arrangement of main bodies 1405, tool interfaces 1410, grippers 1415, suction devices 1420, or magnet holders 1425. The arm tool 1310 can include other components. For example, the arm tool 1310 can include a coupling mechanism (e.g., a nailer), a sheet vacuum gripper, an automatic screw gun tool, an insulation applicator, a paint applicator, a tape applicator, a sanding tool, a lumber cutting tool, a sheets good routing tool, or a lift assist device, among others.

FIGS. 15-18 depict an example coupling mechanism, shown as nailer 1500. The nailer 1500 can couple (e.g., via a nail) a first component with a second component to form a panel 112 for a modular construction product 110. The arm tool 1310 can include at least one nailer 1500. For example, the nailer 1500 can be coupled with at least one of the main body 1405 or the plate 1430. The arm tool 1310 can include at least one position adjuster 1505. The position adjuster 1505 can be coupled with the main body 1405. The nailer 1500 can be coupled with the main body 1405 via the position adjuster 1505. The position adjuster 1505 can facilitate adjustment of a position of the nailer 1500 relative to the main body 1405 to accommodate different nailing tasks.

The nailer 1500 can be coupled with the robotic arm 205 without the arm tool 1310. For example, the nailer 1500 can be a separate arm tool. The nailer 1500 can include at least one nailer interface 1510. The nailer 1500 can be coupled with the robotic arm 205 via engagement between the nailer interface 1510 and the interface 210 of the robotic arm 205. The nailer interface 1510 can be a part of the nailer 1500 or the position adjuster 1505.

The nailer 1500 can provide accurate and consistent nail placements to a level beyond manual construction. The nailer 1500 can be coupled with a nail framing coil for long-term operations. A plurality of nailers 1500 can be used with a single robotic arm 205 to maintain machine operation in the event of an empty magazine, jamming, or other malfunction. The nailer 1500 can detect an empty magazine, a misfire or other malfunctions. The arm tool 1310 and the nailer 1500 can be combined into a single arm tool to reduce tool changes and increase machine cycle time.

FIGS. 22-25 depict an example arm tool 2200. The robotic arm 205 can utilize arm tool 2200 to assemble the modular construction product 110. For example, the robotic arm 205 can use an arm tool 2200 to assemble a panel 112 of the modular construction product 110. The arm tool 2200 can couple with the robotic arm 205 via the interface 210. The arm tool 2200 can be any type of tool. The arm tool 2200 can be interchangeable. For example, the robotic arm 205 can use arm tool 2200 for a first task and arm tool 1310 for a second task.

The arm tool 2200 can include at least one modular chassis, shown as main body 2305. The main body 2305 can provide support for the other components of the arm tool 2200. The arm tool 2200 can include at least one tool interface 2310. The tool interface 2310 can be coupled with the main body 2305. The tool interface 2310 can couple the arm tool 2200 with the robotic arm 205. For example, the tool interface 2310 can couple with the interface 210 of the robotic arm 205. An intermediate component can be disposed between the interface 210 of the robotic arm 205 and the tool interface 2310. For example, the arm tool 2200 can have or be coupled with at least one camera support structure 2311. The camera support structure 2311 can support at least one camera 2312. The camera 2312 can allow the robotic arm 205 to see components, parts, markings, and instructions, among others. The camera support structure 2311 can couple with the robotic arm 205 via the interface 210. The arm tool 2200 can have at least one structure interface 2313. The structure interface 2313 can interface with the tool interface 2310 to couple the arm tool 2200 with the robotic arm 205.

The arm tool 2200 can include at least one retention mechanism, shown as gripper 2315. The gripper 2315 can hold a component (e.g., a member 1301 for a panel 112) in place relative to the arm tool 2200. For example, the gripper 2315 can temporarily couple the component with the arm tool 2200. The gripper 2315 can be coupled with the main body 2305. The gripper 2315 can include at least one moveable member, shown as finger 2316. The finger 2316 can move between a first (e.g., open) position and a second (e.g., closed) position to selectively engage at least a portion of the component. For example, the finger 2316 can at least partially wrap around the component to secure the component to the arm tool 2200. The arm tool 2200 can include a plurality of grippers 2315. For example, a first gripper 2315 can be disposed at or proximate to a first end of the main body 2305 and a second gripper 2315 can be disposed at or proximate to a second end of the main body 2305. The plurality of grippers 2315 can be controlled individually or together.

The arm tool 2200 can include at least one retention mechanism, shown as suction device 2320. The suction device 2320 can hold a component in place relative to the arm tool 2200. For example, the suction device 2320 can temporarily couple the component with the arm tool 2200 via suction. The suction device 2320 can be coupled with the main body 2305. The suction device 2320 can be disposed between the grippers 2315. The arm tool 2200 can include a plurality of suction devices 2320. For example, the arm tool 2200 can include a first suction device 2320 and a second suction device 2320. The first suction device 2320 can be between a first and second gripper 2315, adjacent the first gripper 2315. The second suction device 2320 can be between the first and second gripper 2315, adjacent the second gripper 2315.

The arm tool 2200 can include at least one retention mechanism, shown as magnet holder 2325. The magnet holder 2325 can selectively engage a magnetic assembly 2326. For example, the robotic arm 205 can position the arm tool 2200 such that the magnetic assembly 2326 is disposed in the magnet holder 2325. The magnet holder 2325 can move relative to the main body 2305. For example, the magnet holder 2325 can move forward (e.g., away from the main body 2305) and backward (e.g., toward the main body 2305). The movement of the magnet holder 2325 can facilitate selective engagement of the magnetic assembly 2326.

The magnet holder 2325 can actuate to temporarily couple with the magnetic assembly 2326. The actuation can also deactivate the magnetic assembly 2326 (e.g., turn off the magnetic force) such that the magnetic assembly 2326 decouples from a surface to which the magnetic assembly was previously magnetically coupled with. The magnet holder 2325 can be coupled with the main body 2305. The magnet holder 2325 can be disposed between two suction devices 2320. The magnet holder 2325 can be disposed between two grippers 2315.

The magnetic assembly 2326 can be removably coupled with the magnet holder 2325. For example, the magnetic assembly 2326 can detach from the magnet holder 2325 to couple with the work surface 215. The magnetic assembly 2326 can magnetically couple with the work surface 215 and hold a component at a desired position and orientation against the work surface 215. For example, the magnetic assembly 2326 can switch between a first and second state (e.g., on/off, magnetic/non-magnetic). In the magnetic state, the magnetic assembly 2326 can couple with the work surface 215 and hold a component against the work surface 215. The actuation of the magnet holder 2325 can cause the magnetic assembly 2326 to switch between the first and second state.

The arm tool 2200 can include at least one tool holder, shown as nailer holder 2325. The nailer holder 2325 can receive any type of nailer (e.g., electric, hydraulic) capable of coupling members 1301 together to form a panel 112. The nailer holder 2325 can include at least one first structural component, shown as extension body 2330 (e.g., a position adjuster). The extension body 2330 can couple with the main body 2305. The extension body 2330 can adjust the position of the nailer holder 2325 relative to the main body 2305.

The nailer holder 2325 can include at least one post 2335. The post 2335 can extend from the extension body 2330. The post 2335 can provide a degree of freedom for the nailer holder 2325.

The nailer holder 2325 can include at least one second structural component, shown as outer frame 2340. The outer frame 2340 can be coupled with the extension body 2330 via the post 2335. The outer frame 2340 can pivot around the post 2335.

The nailer holder 2325 can include at least one third structural component, shown as inner frame 2345. The inner frame 2345 can be coupled with the outer frame 2340. A nailer (e.g., nailer 1500) can be at least partially disposed in the inner frame 2345. The nailer can be coupled with the nailer holder 2325 via the inner frame 2345. The inner frame 2345 can move relative to the outer frame 2340. For example, the inner frame 2345 can move linearly in and out of the outer frame 2340. The linear motion can allow the nailer to dispense consecutive nails into a member 1301 in a linear arrangement.

The arm tool 2200 can include at least one controller 2405. The controller 2405 can be, for example, the local data processing system 310. The arm tool 205 can have a plurality of controllers 2405. For example, the arm tool 2405 can have a first, second, and third controller 2405.

Figure 26A:
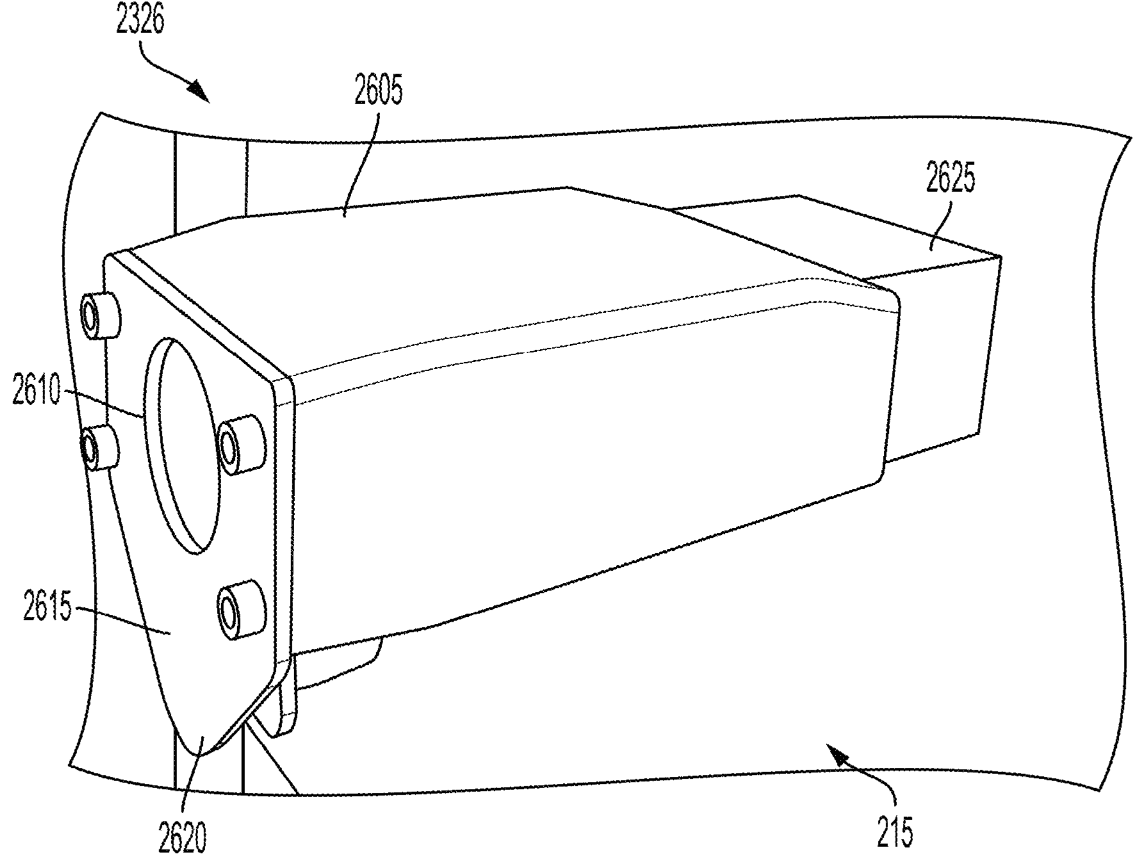
FIG. 26A depicts an example magnetic assembly.

FIG. 26A depicts an example magnetic assembly 2326 coupled with an example work surface 215. The magnetic assembly 2326 can include a body 2605. A first end of the body 2605 can define an aperture 2610. The aperture 2610 can receive an actuator of the magnet holder 2325 (e.g., similar to actuator 2010). The magnetic assembly 2326 can have an assembly plate 2615 disposed at the first end of the body 2605. The assembly plate 2615 can define the aperture 2610. The assembly plate 2615 can include at least one flange 2620. The flange 2620 can extend beyond an edge of the body 2605. The flange 2620 can interface with a member 1301 to hold the member 1301 against a work surface 215.

Figure 26B:
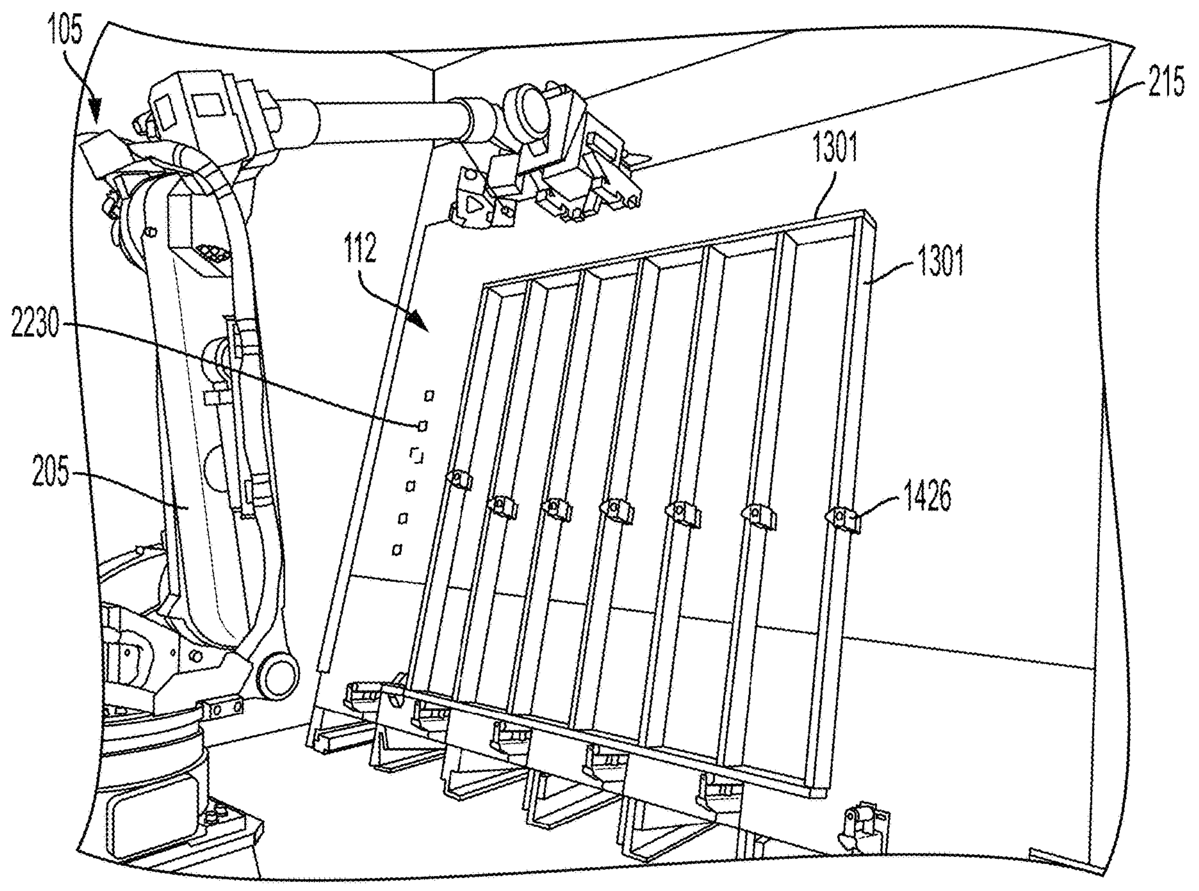
FIG. 26B depicts an example work cell with a plurality of example magnetic assemblies.

FIG. 26B depicts an example work cell 105. As an illustrative example of the use of a magnetic assembly 1426, a magnetic assembly 1426 can be coupled with a work surface 215 at any location, shown as staging zone 2230. The magnetic assembly 1426 can be coupled in a staging zone 2230 when not being used to form a subassembly (e.g., a panel 112). When the robotic arm 205 needs a magnetic assembly 1426 to position a member 1301, the robotic arm 205 can couple with a magnetic assembly 1426. The robotic arm 205 can deactivate the magnetic assembly 1426. The robotic arm 205 can remove the magnetic assembly 1426 from the work surface 215. The robotic arm 205 can retrieve a member 1301 via another portion of the arm tool 1310 (e.g., suction device 1420) and hold the member 1301 against the magnetic assembly 1426. The robotic arm 205 can orient the member 1301 against the work surface 215. For example, the member 1301 can be disposed between the work surface 215 and the flange 2220 of the magnetic assembly 1426. The robotic arm 205 can engage the magnetic assembly 1426 to magnetically couple the magnetic assembly 1426 with the work surface 215. The robotic arm 205 can decouple from the magnetic assembly 1426, leaving the magnetic assembly 1426 and the member 1301 on the work surface 215. The robotic arm 205 can use a plurality of magnetic assemblies 1426 to position a plurality of members 1301 on a work surface 215 to form a panel 112.

The magnetic assembly 2326 can include at least one magnetic portion 2625. The magnetic portion 2625 can be disposed at a second end of the body 2605. For example, the magnetic portion 2625 can be disposed opposite the aperture 2610. The magnetic portion 2625 can couple the magnetic assembly 2326 to a magnetic work surface 215. For example, with the magnetic portion 2625 engaged or activated by a switch, the magnetic assembly 2326 can magnetically hold a member 1301 against a work surface 215.

FIGS. 27A-30 depict example markings 2700. The markings 2700 can be put on (e.g., written, printed, lasered, etched, etc.) various materials or parts being used to create a modular construction product 110. For example, the markings 2600 can be put on members 1301 or a back surface 2805 used in forming a panel 112. The markings 2700 can be put on the materials and parts manually or automatically (e.g., via a CNC machine). The materials and parts can have a plurality of markings 2700. The markings 2700 can provide information to a robotic arm 205. For example, the information can include the type of material or part, target location and orientation for the material or part, when to use the material or part, or where to place other materials or parts, among others. The markings 2700 can be in any form. For example, the markings 2700 can be plain text, images, QR codes, bar codes, component outlines, diagrams, or color coded, among others.

Figure 27A:
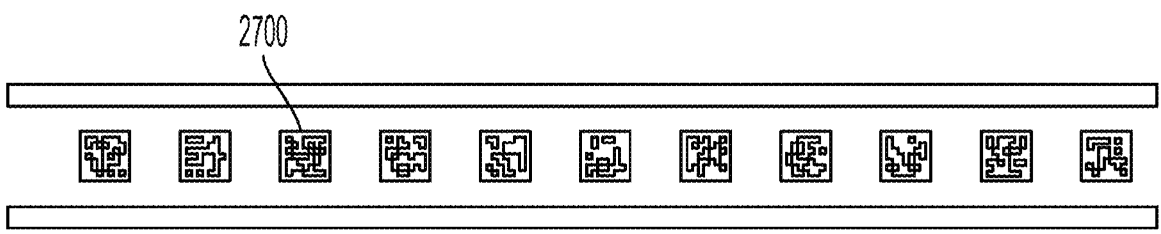
FIG. 27A depicts a plurality of example markings.
Figure 27B:
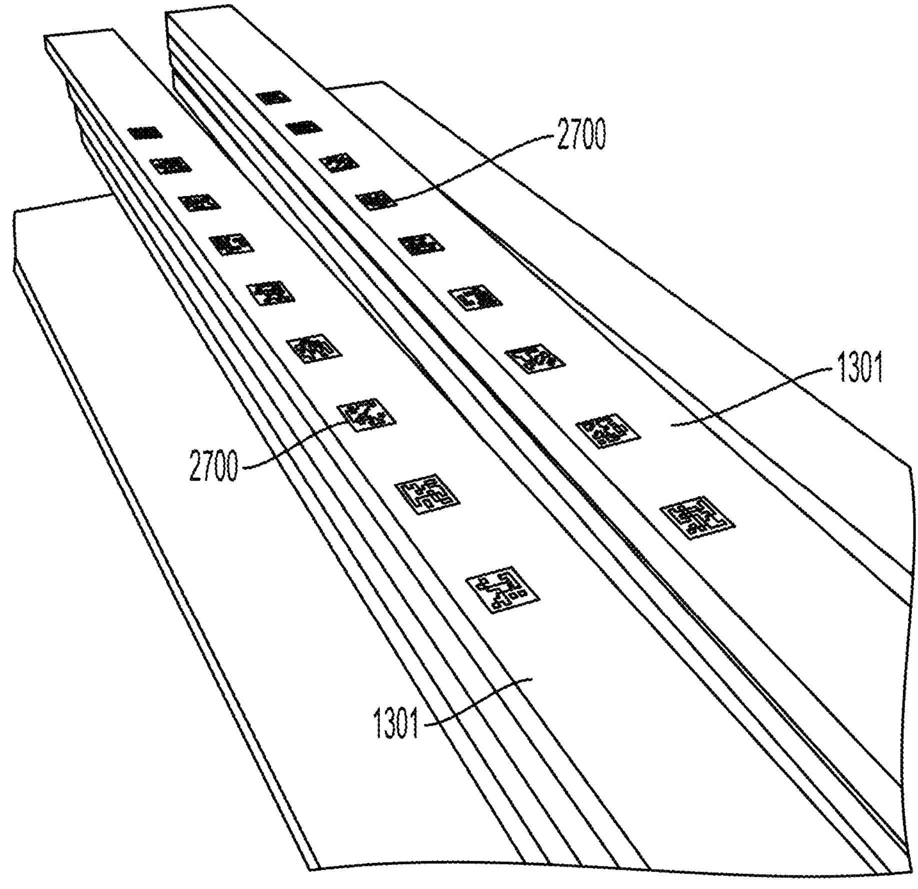
FIG. 27B depicts a perspective view of a plurality of example members with example markings.
Figure 28:
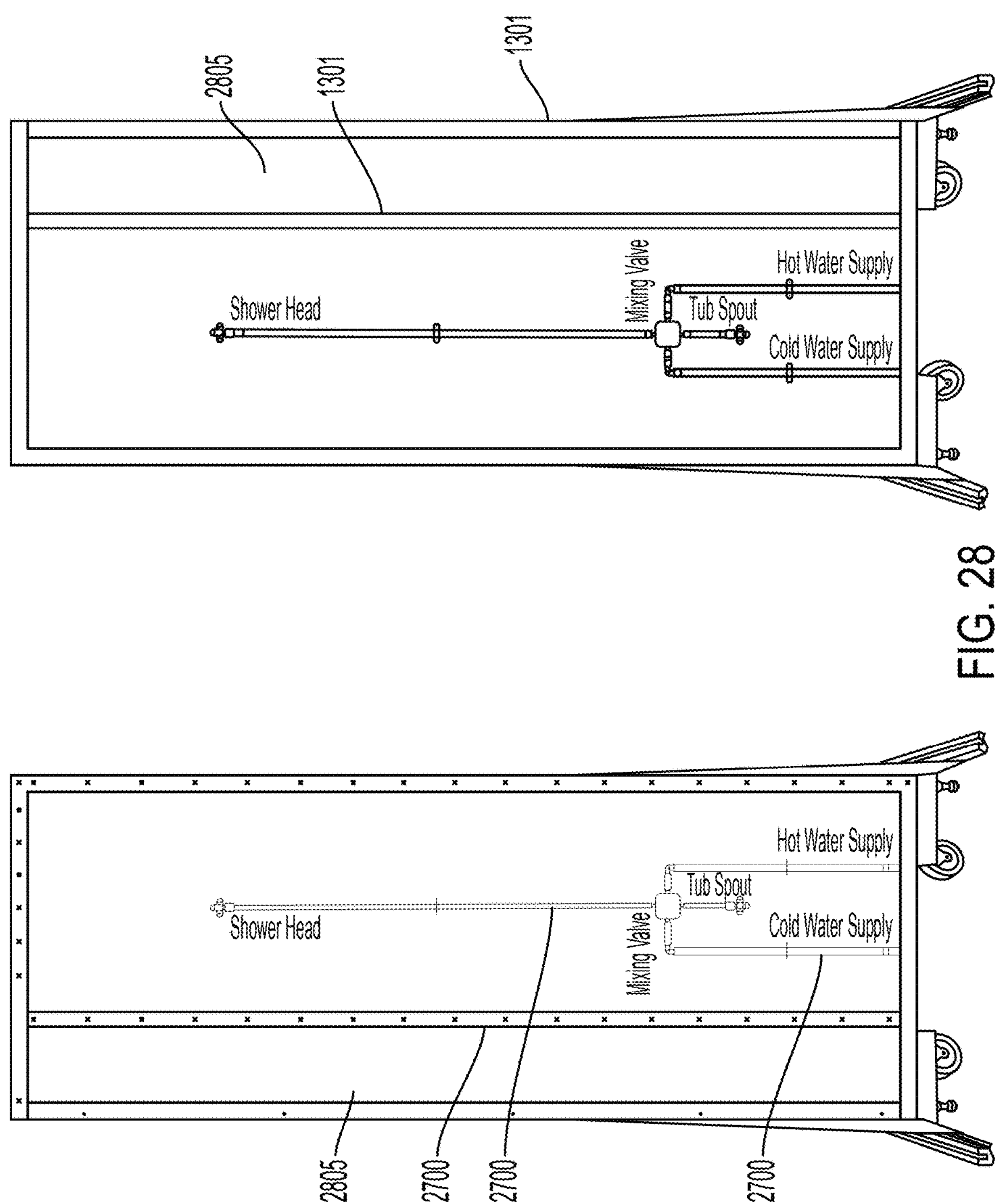
FIG. 28 depicts example markings and corresponding subassembly.
Figure 29:
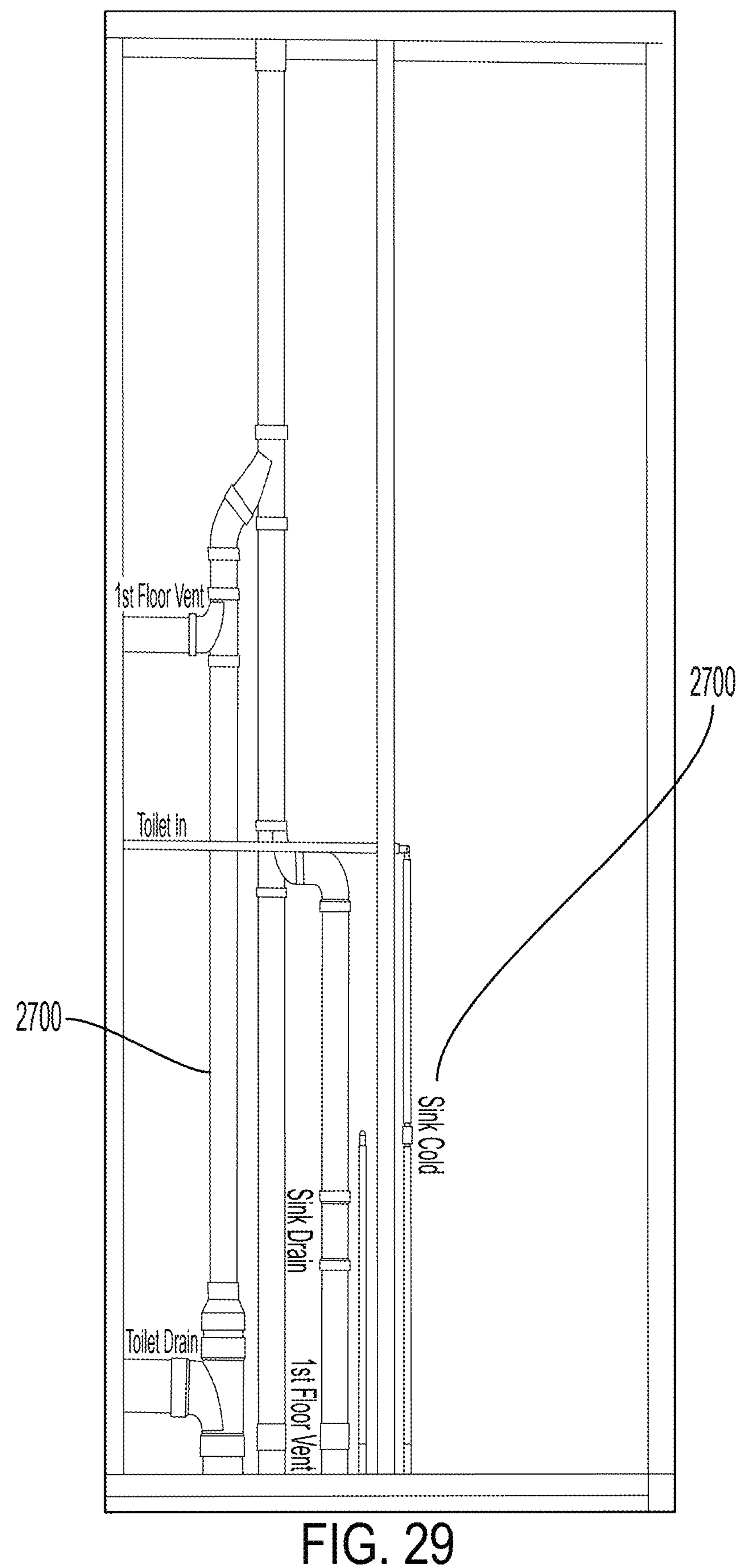
FIG. 29 depicts example markings.
Figure 30:
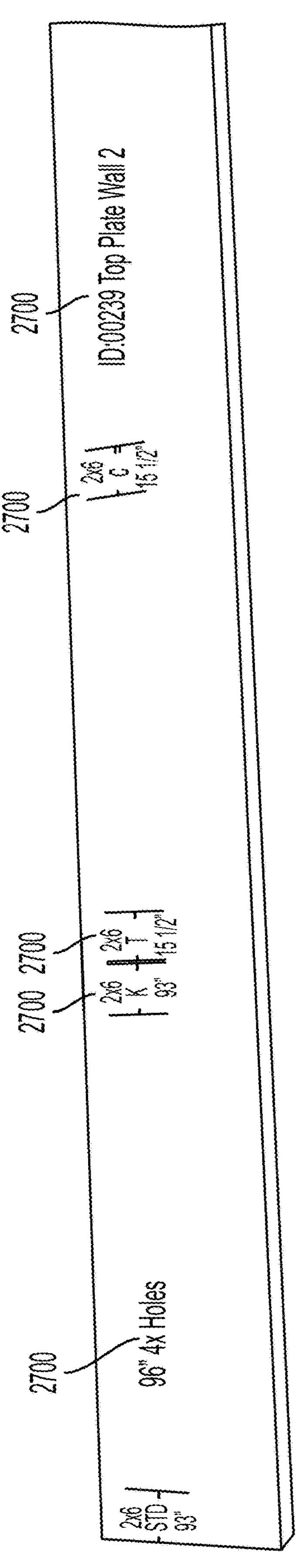
FIG. 30 depicts an example member with example markings.
Figure 31:
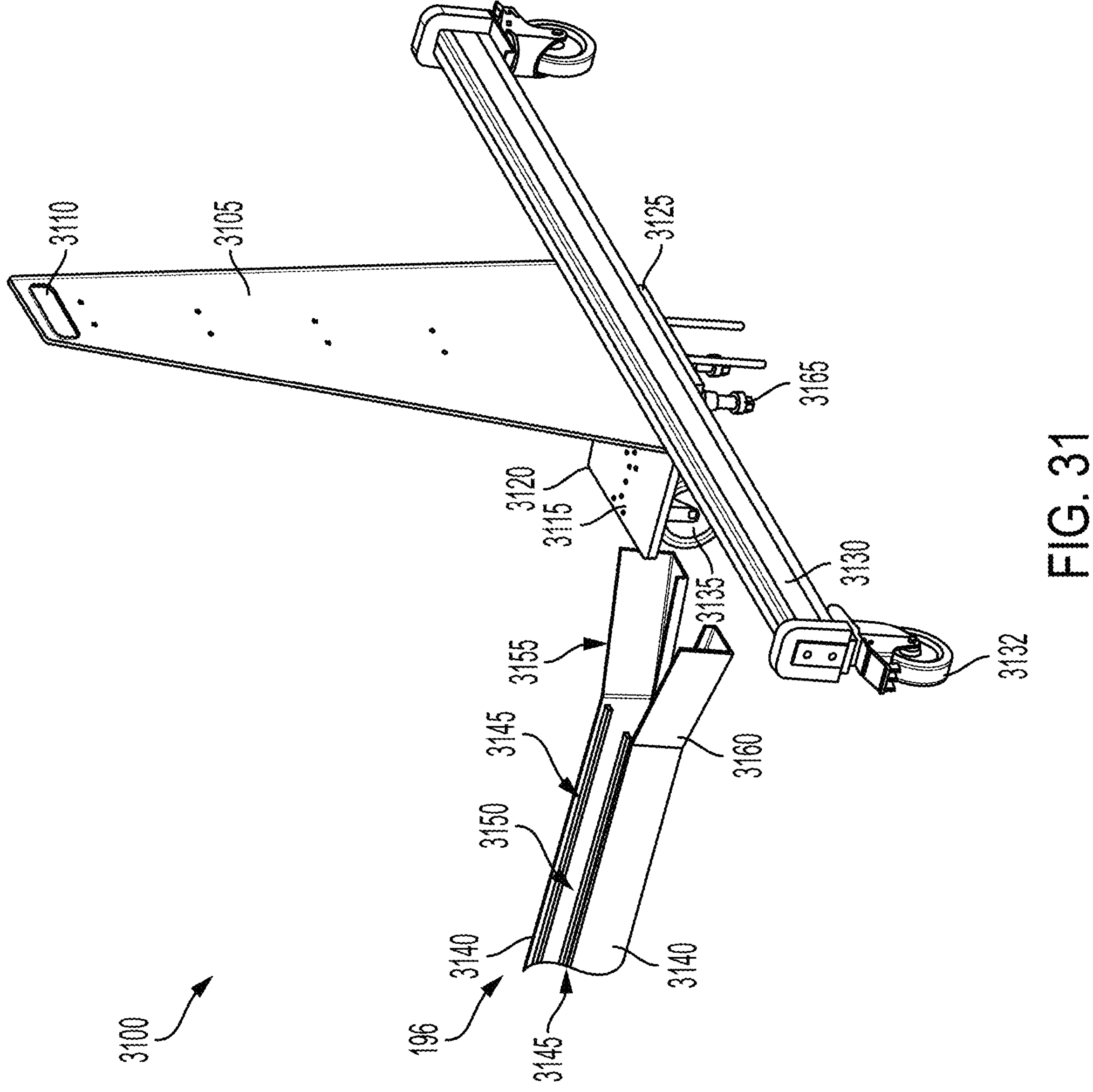
FIG. 31 depicts a rear perspective view of an example panel transport device.
Figure 32:
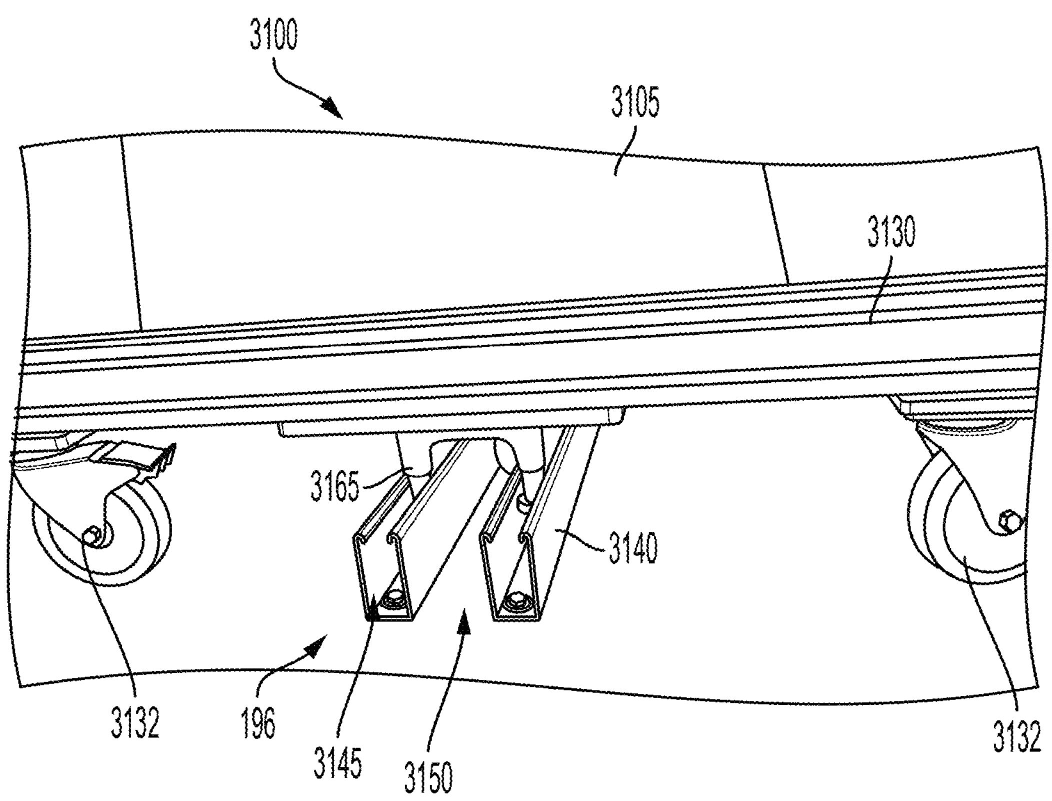
FIG. 32 depicts a rear perspective view of an example panel transport device.
Figure 33:
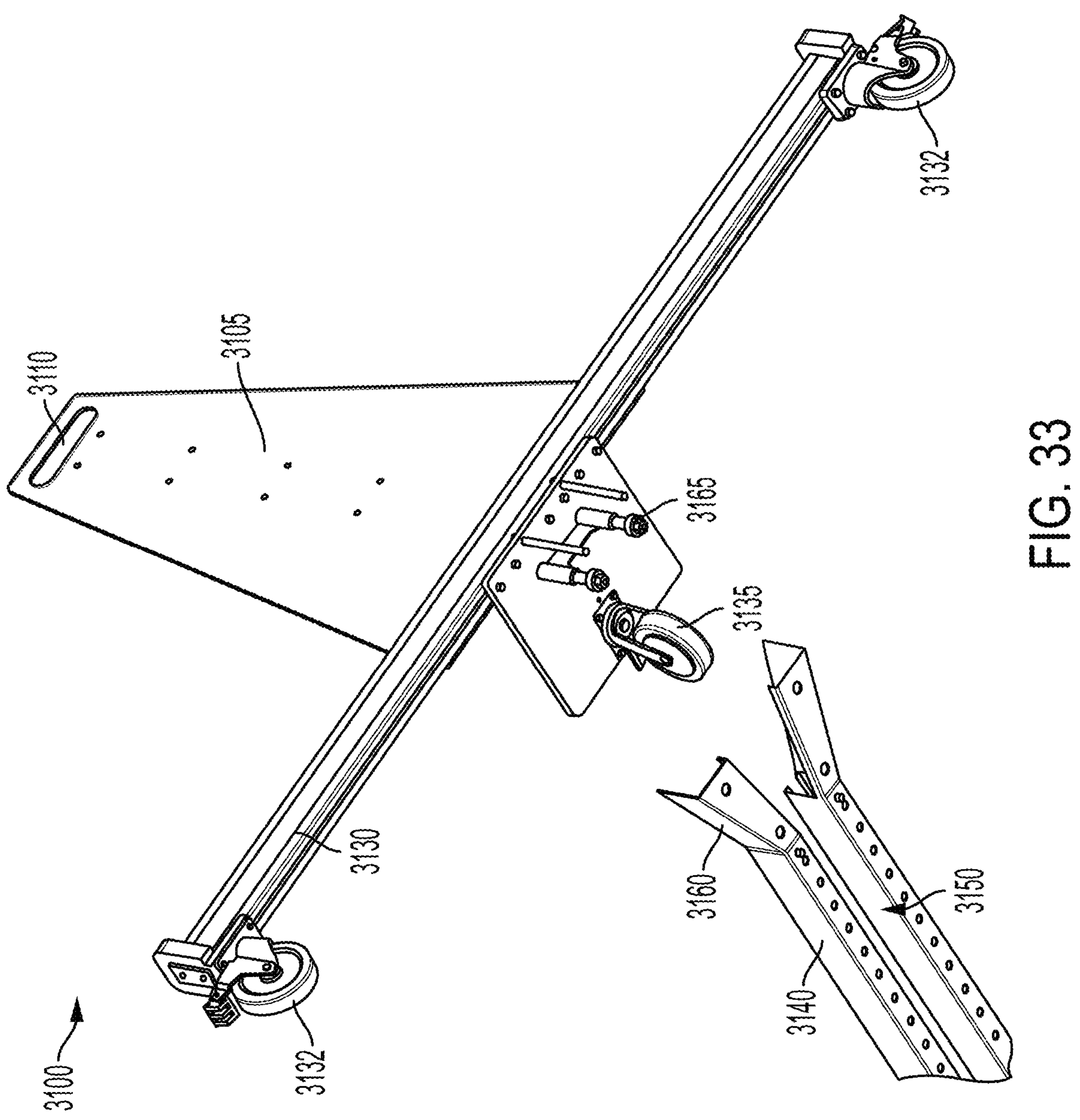
FIG. 33 depicts a bottom, rear perspective view of an example panel transport device.
Figure 34:
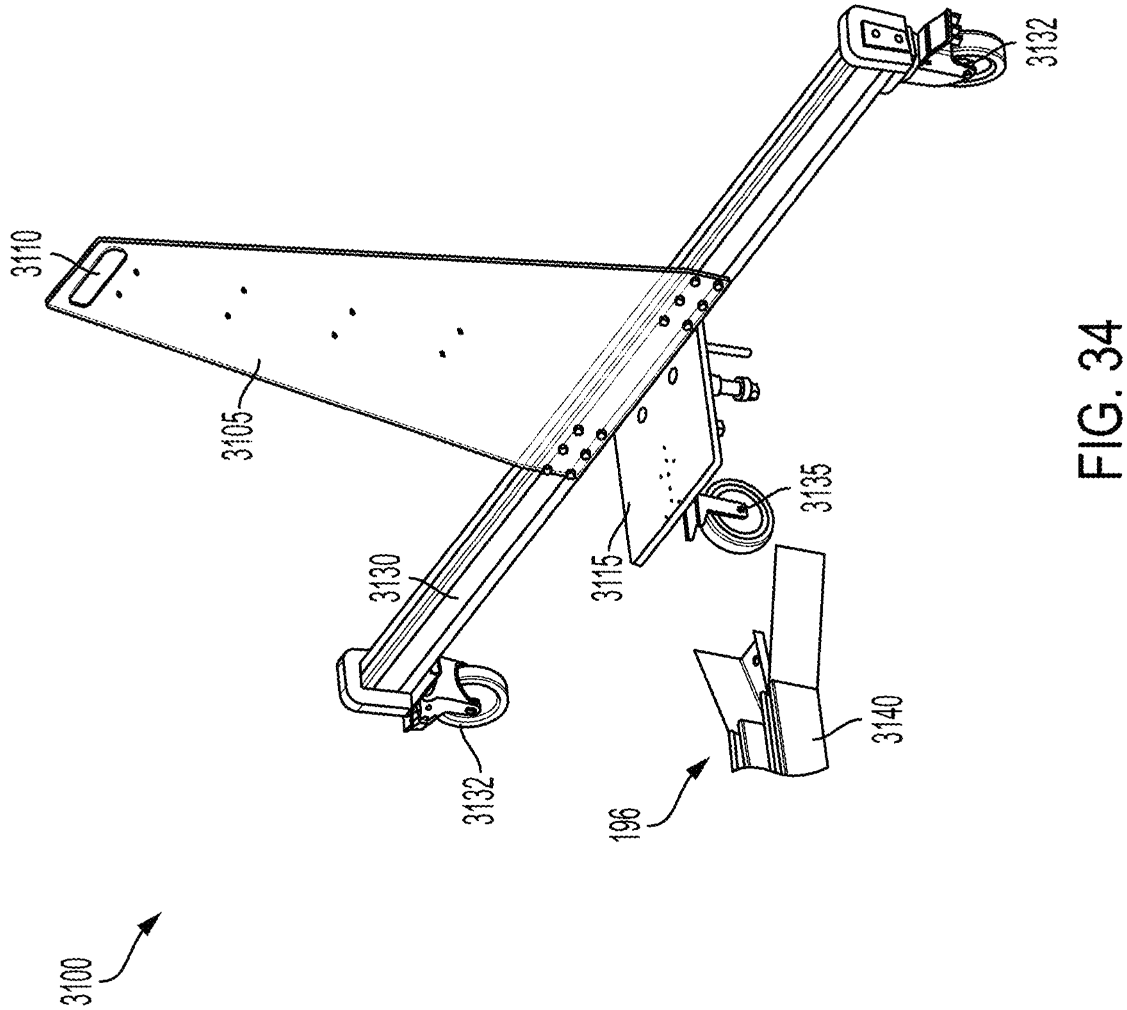
FIG. 34 depicts a top, front perspective view of an example panel transport device.

FIG. 27 depicts example markings 2700 as QR codes. FIG. 27 depicts members 1301 with a plurality of QR code markings 2700. FIGS. 28-29 depict example markings 2700 as component outlines with plain text. For example, the markings 2700 show where a member 1301 can be placed and where certain plumbing fixtures and pipes can be placed. FIG. 30 depicts a member 1301 with a variety of plain text markings 2700. For example, the markings 2700 can indicate what the member 1301 is to be used for (e.g., "top plate wall"), how many holes are to be formed in the member 1301, and where other members 1301 are to couple with the member 1301, among others. Any combination of markings 2700 can be used on any material or part.

FIGS. 31-34 depict an example panel transport device 3100. Panel transport device 3100 can be used instead of panel transport device 170. For example, the transportation system 155 of the manufacturing matrix 100 can include panel transport device 3100. The panel transport device 3100 can transport a panel 112. The panel transport device 3100 can engage with the tracks 196 on the floor in the manufacturing matrix 100.

The panel transport device 3100 can include at least one side member 3105. The side member 3105 can interface with a side of a panel 112 when transporting the panel 112. The side member 3105 can extend vertically. The side member 3105 can have a truncated triangular shape. For example, the side member 3105 can have a wider base and narrower top. The side member 3105 can have at least one handle 3110. The handle 3110 can provide a location for a user to grip the panel transport device 3100 to guide the panel transport device 3100. The handle 3110 can be anywhere on the side member 3105. For example, the handle 3110 can be positioned at or proximate to a top of the side member 3105 (e.g., at the narrower portion of the side member 3105).

The panel transport device 3100 can include at least one base 3115. The base 3115 can couple with the side member 3105. The base 3115 can be integral with the side member 3105. The base 3115 can have a front edge 3120 and a rear edge 3125. The side member 3105 can be coupled with the base 3115 closer to the rear edge 3125 than the front edge 3120. The base 3115 can support a panel 112. For example, a portion of a bottom of a panel 112 can sit on top of the base 3115.

The panel transport device 3100 can include at least one support member 3130. The support member 3130 can support and provide stability to the panel transport device 3100. The support member 3130 can have an elongated shape. For example, the support member 3130 can have a long (e.g., wide), thin shape. The support member 3130 can be wider than the base 3115. For example, the ends of the support member 3130 can extend beyond the ends of the base 3115. The support member 3130 can couple with the side member 3105. For example, the support member 3130 can couple with a side of the side member 3105. The side member 3105 can be centered on the support member 3130. The support member 3130 can couple with the base 3115. For example, the support member 3130 can couple with a top of the base 3115. The support member 3130 can be coupled at or proximate to the rear edge 3125 of the base 3115. For example, the support member 3130 can be positioned between the side member 3105 and the rear edge 3125 of the base 3115.

The panel transport device 3100 can include at least one traction element. The traction element can facilitate movement of the panel transport device 3100. For example, the panel transport device 3100 can include at least one first traction element, shown as support wheel 3132. The support wheel 3132 can be coupled with the support member 3130. The support wheel 3132 can be coupled at or proximate to an end of the support member 3130.

The panel transport device 3100 can have a plurality of support wheels 3132. For example, the panel transport device 3100 can have a first support wheel 3132 and a second support wheel 3132. The first support wheel 3132 can be coupled at or proximate to a first end of the support member 3130. The second support wheel 3132 can be coupled at or proximate to a second end (e.g., opposite the first end) of the support member 3130.

The panel transport device 3100 can include at least one second traction element, shown as guide wheel 3135. The guide wheel 3135 can interact with a track 196 of the manufacturing matrix 100. For example, the track 196 can include at least one rail 3140. The rail 3140 can define a rail channel 3145. The rail 3140 can be coupled with a ground surface (e.g., floor of manufacturing matrix 100).

The track 196 can include a plurality of rails 3140. For example, the track 196 can include a first rail 3140 and a second rail 3140. The first rail 3140 can be parallel with the second rail 3140 (e.g., +/−10%). The first rail 3140 can be spaced apart from the second rail 3140. For example, the first rail 3140 and the second rail 3140 can define a guide channel 3150. The guide channel 3150 can be the space between the first rail 3140 and the second rail 3140. The guide channel 3150 can receive the guide wheel 3135. For example, the guide wheel 3135 can roll between the first rail 3140 and the second rail 3140. The guide channel 3150 can guide the panel transport device 3100 via the guide channel 3150. For example, the panel transport device 3100 can follow the path of the guide channel 3150 with the guide wheel 3135 in the guide channel 3150.

The track 196 can include a funnel section 3155. The funnel section 3155 can help adjust a position of the panel transport device 3100 to guide the guide wheel 3135 into the guide channel 3150. For example, each rail 3140 can have a flared portion 3160. A first flared portion 3160 of the first rail 3140 can angle outward, away from the second rail 3140. A second flared portion 3160 of the second rail 3140 can angle outward, away from the first rail 3140. The first flared portion 3160 and the second flared portion 3160 can form the funnel section 3155.

The track 196 can be a single, solid track 196 where the only entrance or exit for a panel transport device 3100 is at the beginning of the track 196 and at the end of the track 196. The track can be manipulable. For example, portions or segments of the track 196 can open (e.g., segments can rotate to an angle that is not parallel with the rest of the track 196 to allow a panel transport device 3100 to exit the track 196 without having to travel the full distance of the track 196. For example, with three panel transport devices 3100 on the track 196, a segment of the track 196 can rotate to let the middle panel transport device exit the track 196.

The panel transport device 3100 can include at least one guide element 3165. The guide element 3165 can help position the panel transport device 3100 such that the guide wheel 3135 can roll through the guide channel 3150. For example, the guide element 3165 can be a projection that extends downward from a bottom of the base 3115 (e.g., extend from the base toward the ground). The guide element 3165 can interact with (e.g., slide into and through) a rail channel 3145 as the guide wheel 3135 interacts with (e.g., travels through) the guide channel 3150.

The panel transport device 3100 can have a plurality of guide elements 3165. For example, the panel transport device 3100 can have a first guide element 3165 and a second guide element 3165. The first guide element 3165 can travel through a first rail channel 3145 of a first rail 3140. The second guide element 3165 can travel through a second rail channel 3145 of a second rail 3140.

Figure 35:
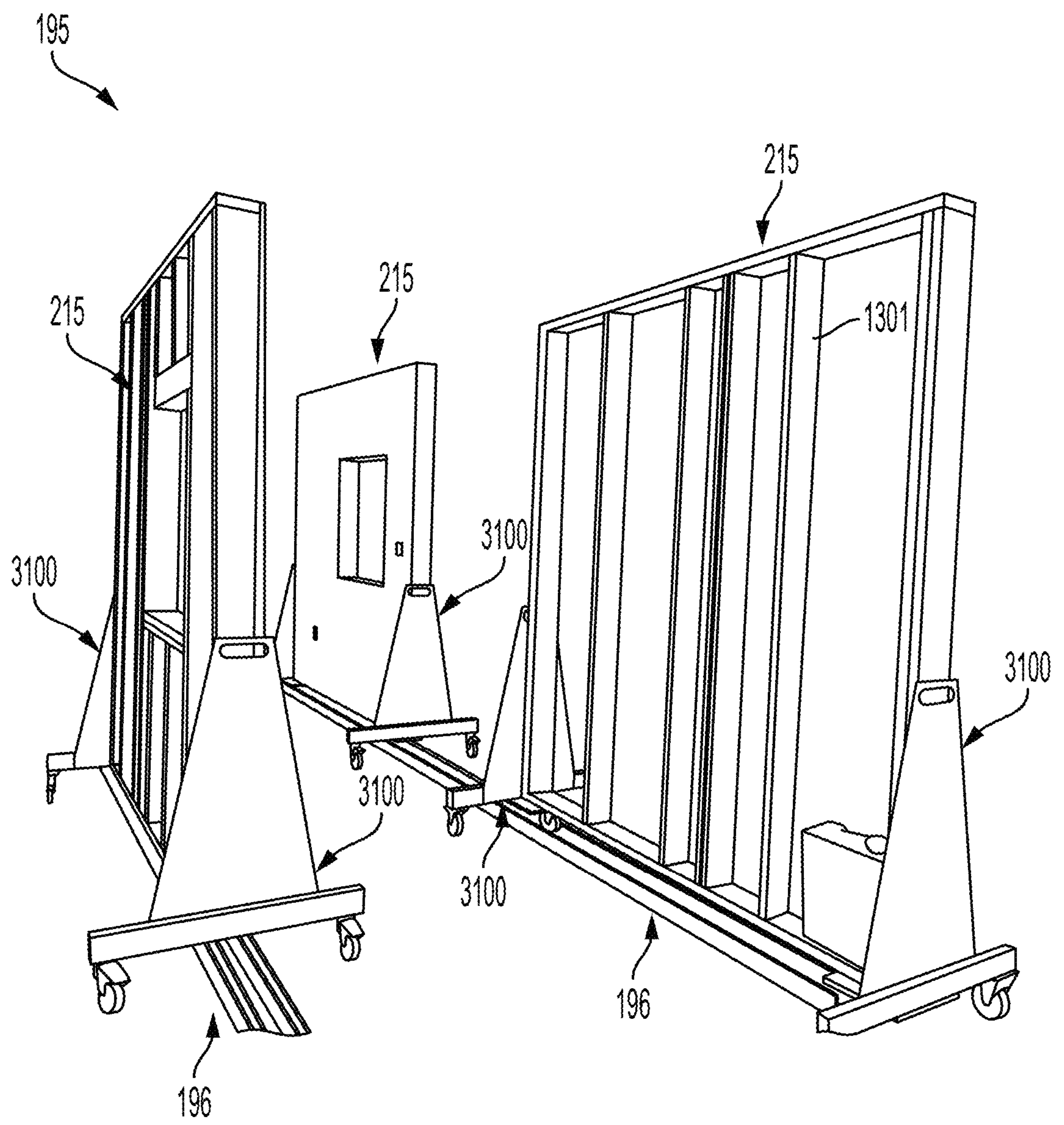
FIG. 35 depicts an example panel matrix.

FIG. 35 depicts an example panel matrix 195. The panel matrix 195 can include at least one track 196. The track 196 can receive or interact with at least one panel transport device 3100. A single track 196 can interact with a plurality of panel transport devices 3100. For example, a panel 112 can be supported by a pair of panel transport devices 3100 (e.g., a first panel transport device 3100 and a second panel transport device 3100). The first panel transport device 3100 can support a first end of the panel 112. The second panel transport device 3100 can support a second, opposite end of the panel 112. The guide wheel 3135 of each panel transport device 3100 can be disposed in the guide channel 3150 of the track 196. Accordingly, the panel 112 can be positioned above the track 196.

A plurality of pairs of panel transport devices 3100 can interact with the track 196 simultaneously. For example, a first set of panel transport devices 3100 can support a first panel 112. A second set of panel transport devices 3100 can support a second panel 112. The first set and the second set of panel transport devices 3100 can be on the same track 196 at the same time.

The panel matrix 195 can include a plurality of tracks 196. For example, a first track 196 can run parallel with a second track 196. The first track 196 can be spaced apart from the second track 196. For example, a distance between the first track 196 and the second track 196 can be enough such that a person can get between the two panels 112 to work on either panel 112.

Figure 36:
FIG. 36 depicts a flow diagram of an example method of assembling an example panel.
Figure 36:
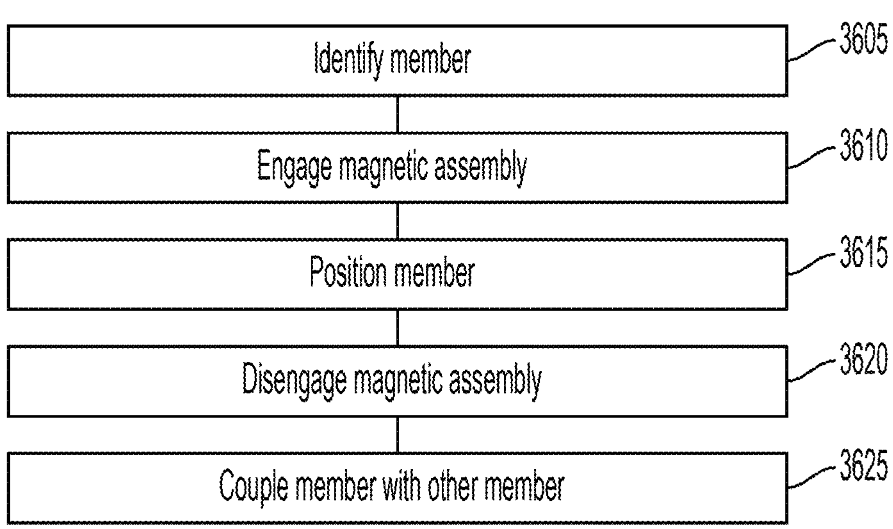

FIG. 36 depicts a flow diagram of an example method 3600 of assembling a panel 112. Method 2300 can include identifying, by a robotic arm 205, a member 1301 for the panel 112 (Act 3605). For example, the robotic arm 205 can receive instructions to assemble a panel 112. The instructions can indicate specific components (e.g., members 1301), parts (e.g., flange, piping, fixture), or tools (e.g., nailer 1500) that are needed for the panel 112. The robotic arm 205 can determine that a specific member 1301 is needed for the panel 112 from the instructions.

The robotic arm 205 can identify the member 1301 for the panel 112. For example, the robotic arm 205 can include at least one camera 2312. The robotic arm 205 can identify the member 1301 based on a marking 2600 on the member 1301 via the camera 2312.

Method 3600 can include engaging, by the robotic arm 205, a magnetic assembly 2326 (Act 3610). For example, the robotic arm 205 can have an arm tool 2200. The arm tool 2200 can have at least one magnet holder 2325. At least one magnetic assembly 2326 can be magnetically coupled with a work surface 215. The robotic arm 205 can move the arm tool 2200 to a position such that the magnet holder 2325 can receive a magnetic assembly 2326. With the magnetic assembly 2326 in the magnet holder 2325, the robotic arm 205 can actuate a switch (e.g., actuator 2010) engage the magnetic assembly 2326 (e.g., couple the magnetic assembly 2326 with the magnet holder 2325). Actuation of the switch can deactivate the magnetic assembly 2326 (e.g., demagnetize the magnetic assembly 2326) such that the magnetic assembly 2326 can decouple from the work surface 215.

Method 3600 can include positioning, by the robotic arm 205, the member 1301 at a desired position against a work surface 215 (Act 3615). For example, the robotic arm 205 can move the arm tool 2200 to a position over the member 1301 to be used as part of the panel 112. The robotic arm 205 can first grip the member 1301 via the suction device 2320. The robotic arm 205 can live the member 1301 with the suction device 2320. The robotic arm 205 can grip the member 1301 further with the gripper 2315 once there is room for the fingers 2316 to wrap around the member 1301. With the member 1301 coupled with the arm tool via the gripper 2315, the robotic arm 205 can move the member 1301 to a desired position against the work surface 215.

Method 3600 can include disengaging from, by the robotic arm 205, the magnetic assembly (Act 3620). For example, with the member 1301 in the target position, the magnet holder 2325 can release the magnetic assembly 2326. Disengaging from the magnetic assembly 2326 can cause the magnetic force of the magnetic assembly 2326 to activate such that the magnetic assembly 2326 can magnetically couple with the work surface 215. The member 1301 can be between a portion of the magnetic assembly 2326 and the work surface such that the member 1301 can be held against the work surface via the magnetic assembly 2326 once the robotic arm 205 pulls the arm tool 2200 away from the work surface. The finger 2316 of the gripper 2315 can open such that the member 1301 can remain with the magnetic assembly 2326.

Method 3600 can include coupling, by the robotic arm 205, the member 1301 with another member 1301 of the panel 112 (Act 3625). For example, the panel 112 can include a first member 1301 and a second member 1301. The robotic arm 205 can couple the first member 1301 with the second member 1301. The robotic arm 205 can couple the first member 1301 with the second member 1301 via any coupling mechanism. For example, the arm tool 2200 can include at least one nailer 1500. The robotic arm 205 can use the nailer to couple the first member 1301 with the second member 1301.

To couple the members 1301 together, the arm tool 2200 can hold at least one of the members 1301 via the gripper 2315. Holding a member 1301 with the gripper 2315 can facilitate proper alignment between the members 1301. With the member 1301 held in place, the robotic arm 205 can position the nailer 1500 in an activation position. The activation position can facilitate proper alignment of the nailer 1500 with the members 1301 for proper coupling. The nailer 1500 can couple the members 1301 together with at least one nail. For example, the nailer 1500 can couple the members 1301 together with a plurality of nails. For example, the nailer 1500 can start at a first position relative to the outer frame 2340. The nailer 1500 can insert a first nail into the members 1301 at the first position. The nailer 1500 can move to a second position relative to the outer frame 2340. The nailer 1500 can insert a second nail into the members 1301 at the second position. The nailer 1500 can move to a third position relative to the outer frame 2340. The nailer 1500 can insert a third nail into the members 1301 at the second position. The nailer 1500 can insert any number of nails in a line as the nailer 1500 moves along the outer frame 2340.

As an illustrative example, to form a panel 112, the robotic arm 205 can engage a first magnetic assembly 2326, grab a first member 1301 with the suction device 2320 and the gripper 2315, position the first member 1301 against a work surface 215, and release both the first member 1301 and the first magnetic assembly 2326 such that the first magnetic assembly 2326 magnetically couples with the work surface 215 and holds the first member 1301 in the position. The robotic arm 205 can engage a second magnetic assembly 2326, grab a second member 1301 with the suction device 2320 and the gripper 2315, position the second member 1301 against a work surface 215, and release both the first member 1301 and the first magnetic assembly 2326 such that the second magnetic assembly 2326 magnetically couples with the work surface 215 and holds the second member 1301 in the position. The robotic arm 205 can repeat this process any number of times.

With the members 1301 in position, still being held by the magnetic assemblies 2326, the robotic arm 205 can hold on to a first member 1301 to keep the first member 1301 in the target position while coupling the first member 1301 to a second member 1301. Once coupled together, the robotic arm 205 can release the first member 1301 and hold another member 1301. The robotic arm 205 can hold a member 1301 when coupling the member 1301 to another member 1301.

FIG. 19 depicts a block diagram of an example computing system 1900. The computer system or computing system 1900 can include or be used to implement portions of the data processing system 175, the user device 410, transportation system 155, or robotic arm 205 described in connection with FIG. 4, among others. The computing system 1900 can include at least one bus 1905 or other communication component for communicating information and at least one processor 1910 or processing circuit coupled to the bus 1905 for processing information. The computing system 1900 can include one or more processors 1910 or processing circuits coupled to the bus 1905 for processing information. The computing system 1900 can include at least one main memory 1915, such as a RAM or other dynamic storage device, coupled to the bus 1905 for storing information, and instructions to be executed by the processor 1910. The computing system 1900 can include at least one ROM 1920 or other static storage device coupled to the bus 1905 for storing static information and instructions for the processor 1910. A storage device 1925, such as a solid-state device, magnetic disk, or optical disk, can be coupled to the bus 1905 to persistently store information and instructions.

The computing system 1900 can be coupled via the bus 1905 to a display 1935, such as a liquid crystal display, or active matrix display, for displaying information to a user such as an administrator of the data processing system 175. An input device 1930, such as a keyboard or voice interface can be coupled to the bus 1905 for communicating information and commands to the processor 1910. The input device 1930 can include a touch screen display 1935. The input device 1930 can include a cursor control, such as a mouse, a trackball, or cursor direction keys, for communicating direction information and command selections to the processor 1910 and for controlling cursor movement on the display 1935. The display 1935 can be part of, or communicatively coupled to, the user device 410, the transportation system 155, or the robotic arm 205, or other components described in FIG. 4, among others.

The processes, systems, and methods described herein can be implemented by the computing system 1900 in response to the processor 1910 executing an arrangement of instructions contained in main memory 1915. Such instructions can be read into main memory 1915 from another computer-readable medium, such as the storage device 1925. Execution of the arrangement of instructions contained in main memory 1915 causes the computing system 1900 to perform the illustrative processes described herein. One or more processors in a multi-processing arrangement can be employed to execute the instructions contained in main memory 1915. Hard-wired circuitry can be used in place of or in combination with software instructions together with the systems and methods described herein. Systems and methods described herein are not limited to any specific combination of hardware circuitry and software.

Although an example computing system has been described in FIG. 19, the subject matter including the operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them.

Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "user device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 175 can include clients and servers. For example, the data processing system 175 can include one or more servers in one or more data centers or server farms. A client and server can be remote from each other and can interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any disclosure or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 175 could be a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for monitoring a vital sign, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A robotic work cell for construction, the robotic work cell comprising:

a robotic arm, the robotic arm including an interface, the robotic arm to assemble a subassembly for a construction product, the subassembly including a plurality of components;

a tool coupled with the robotic arm via the interface, the tool including a suction device or a gripper;

a work surface including an angled orientation relative to a horizontal surface, the robotic arm to position, with at least one of the suction device or the gripper, the plurality of components to lean against the work surface during assembly of the subassembly;

a plurality of projections that extend beyond the work surface positioned at a bottom of the work surface;

a first assembly coupled with the work surface disposed above the plurality of projections relative to a ground surface and protruding perpendicularly from the work surface, the first assembly to position a first component of the plurality of components against the work surface during assembly of the subassembly, the first component including a first marking indicating information corresponding to the first component; and a second assembly coupled with the work surface disposed above the plurality of projections relative to the ground surface and protruding perpendicularly from the work surface, the second assembly to position a second component of the plurality of components parallel with the first component against the work surface during assembly of the subassembly, the second component including a second marking indicating information corresponding to the second component;

a third assembly coupled with the work surface disposed above the plurality of projections relative to the ground surface and protruding perpendicularly from the work surface, the third assembly to position a third component of the plurality of components against the work surface during assembly of the subassembly, the third component including a third marking indicating information corresponding to the third component; and a fourth assembly coupled with the work surface disposed above the plurality of projections relative to the ground surface and protruding perpendicularly from the work surface, the fourth assembly to position a fourth component of the plurality of components parallel with the third component against the work surface during assembly of the subassembly with the third component and the fourth component perpendicular to the first component and the second component, the fourth component including a fourth marking indicating information corresponding to the fourth component;

wherein the first, second, third, and fourth markings include a machine-readable optical image to be read by a sensor of the robotic arm to cause the robotic arm to take an action.

2. The robotic work cell of claim 1, comprising:

the robotic arm communicably coupled with a remote data processing system;

the robotic work cell to:

receive a first instruction from the remote data processing system, the first instruction indicative of a first task for the robotic arm to perform to facilitate assembly of the subassembly; and receive a second instruction from the remote data processing system, the second instruction indicative of a second task for the robotic arm to perform to facilitate assembly of the subassembly.

3. The robotic work cell of claim 1, comprising:
the robotic arm to move the plurality of components and couple the plurality of components together to form the subassembly, each of the plurality of components including a marking to provide information corresponding to each respective component of the plurality of components.

4. The robotic work cell of claim 1, comprising:
the first component includes a first marking that indicates information that corresponds to the first component;
the second component includes a second marking that indicates information that corresponds to the second component;
the third component includes a third marking that indicates information that corresponds to the third component;
the fourth component includes a fourth marking that indicates information that corresponds to the fourth component;
the information corresponding to the first, second, third, and fourth components includes at least one of a type of material of the respective component, a target location or orientation of the respective component, when to use the respective component, or where to place the respective component relative to another component.

5. The robotic work cell of claim 1, comprising:
a component of the plurality of components including a marking that indicates information corresponding to the component; and
the robotic arm comprising:
a vision sensor to identify the information corresponding to the component; and
a data processing system to:
receive the information from the vision sensor;
determine a characteristic of the component based on the information;
compare the characteristic with a designated task of the robotic arm; and
generate a control command based on the comparison of the characteristic and the designated task, the control command to control a movement of the robotic arm, the movement to align with the designated task of the robotic arm.

6. The robotic work cell of claim 1, wherein the construction product is a residential building, the robotic work cell comprising:
the interface of the robotic arm to couple with a plurality of tools based on a designated task, the designated task including at least one of electrical work, framing, painting, insulating, sheathing, or routing; and
the robotic arm to automatically change the tool coupled with the interface based on the designated task.

7. The robotic work cell of claim 1, comprising:
the gripper to move between an open position and a closed position to engage at least a portion of a component of the plurality of components to move the component from a first location to a second location.

8. The robotic work cell of claim 1, comprising:
the suction device to couple a component of the plurality of components with the tool via suction.

9. The robotic work cell of claim 1, comprising:
the tool coupled with the robotic arm via the interface, the tool comprising:
a main body;
a position adjuster coupled with the main body; and
a nailer coupled with the main body via the position adjuster, the position adjuster to facilitate adjustment of a position of the nailer relative to the main body to accommodate different nailing tasks.

10. A method of assembling a subassembly, the method comprising:
coupling, via an interface of a robotic arm, a tool with the robotic arm, the tool including a suction device or a gripper;
coupling a plurality of assemblies with a work surface, the work surface including an angled orientation relative to a horizontal surface, the plurality of assemblies including a first assembly, a second assembly, a third assembly, and a fourth assembly, the plurality of assemblies protruding perpendicularly from the work surface;
positioning, by the robotic arm with at least one of the suction device or the gripper, a plurality of components to lean against the work surface,
the first assembly to position a first component of the plurality of components against the work surface during assembly of the subassembly, the first component including a first marking indicating information corresponding to the first component;
the second assembly to position a second component of the plurality of components parallel with the first component against the work surface, the second component including a second marking indicating information corresponding to the second component;
the third assembly to position a third component of the plurality of components against the work surface, the third component including a third marking indicating information corresponding to the third component; and
the fourth assembly to position a fourth component of the plurality of components parallel with the third component against the work surface with the third component and the fourth component perpendicular to the first component and the second component, the fourth component including a fourth marking indicating information corresponding to the fourth component;
wherein the first, second, third, and fourth markings include a machine-readable optical image to be read by a sensor of the robotic arm to cause the robotic arm to facilitate assembly of the subassembly.

11. The method of claim 10, comprising:
identifying the first component for the subassembly from the plurality of components;
engaging, by the robotic arm, the first component;
positioning, by the robotic arm, the first component against the work surface;
disengaging from, by the robotic arm, the first component with the first component held in position via the first assembly; and
coupling, by the robotic arm, the first component with another component of the plurality of components.

12. The method of claim 10, comprising:
identifying the first component for the subassembly based on the first marking; and
positioning the first component against the work surface based on the first marking.

13. The method of claim 10, comprising:
holding, by the gripper of the tool, the first component in a position;
positioning, by the robotic arm, a nailer in an activation position; and
actuating, by the robotic arm, the nailer to couple the first component with a second component of the plurality of components.

14. The method of claim 10, comprising:
positioning, by the robotic arm, a nailer in a first activation position;
actuating, by the robotic arm, the nailer to couple the first component with a second component of the plurality of components with a first nail;
moving, by the robotic arm, the nailer via a position adjuster to a second activation position; and
actuating, by the robotic arm, the nailer to couple the first component with the second component with a second nail.

15. The method of claim 10, comprising:
receiving instructions to assemble the subassembly;
identifying, via a vision sensor, the first component from the plurality of components based on a first marking on the first component; and
holding, by the robotic arm via the gripper, the first component to move the first component from a stored position to a desired position against the work surface.

16. The method of claim 10, wherein the tool is a first tool, the method comprising:
performing, by the robotic arm, a first task with the first tool;
decoupling, by the robotic arm, the first tool from the robotic arm;
coupling, via the interface of the robotic arm, a second tool with the robotic arm; and
performing, by the robotic arm, a second task with the second tool.

17. A system for assembly of a subassembly for a building, the system comprising:
a robotic arm; and
a tool coupled with the robotic arm, the tool comprising:
a main body;
a tool interface coupled with the main body, the tool interface to couple the tool with the robotic arm; and
at least one of:
a gripper coupled with the main body, the gripper to move between an open and closed position to wrap around at least a portion of a component for the subassembly; or
a suction device coupled with the main body, the suction device to couple the component with the tool via suction;
the robotic arm to position, with the at least one of the suction device or the gripper of the tool, a plurality of components to lean against a work surface during assembly of the subassembly, the work surface having an angled orientation relative to a horizontal surface, the robotic arm to:
position a first component of the plurality of components against the work surface during assembly of the subassembly, a first assembly coupled with the work surface to position the first component against the work surface, the first component including a first marking indicating information corresponding to the first component;
position a second component of the plurality of components parallel with the first component against the work surface during assembly of the subassembly, a second assembly coupled with the work surface to position the second component against the work surface, the second component including a second marking indicating information corresponding to the second component;
position a third component of the plurality of components against the work surface during assembly of the subassembly, a third assembly coupled with the work surface to position the third component against the work surface, the third component including a third marking indicating information corresponding to the third component; and
position a fourth component of the plurality of components parallel with the third component against the work surface during assembly of the subassembly with the third component and the fourth component perpendicular to the first component and the second component, a fourth assembly coupled with the work surface to position the fourth component against the work surface, the fourth component including a fourth marking indicating information corresponding to the fourth component;
wherein the first, second, third, and fourth markings include a machine-readable optical image to be read by a sensor of the robotic arm to cause the robotic arm to assemble the subassembly.

18. The system of claim 17, comprising:
the tool comprising:
a position adjuster coupled with the main body; and
a nailer coupled with the main body via the position adjuster, the position adjuster to facilitate adjustment of a position of the nailer relative to the main body to accommodate different nailing tasks.

19. The system of claim 17, comprising:
a camera coupled with at least one of the robotic arm or the tool, the camera to identify the first component for the subassembly from a plurality of components based on the first marking on the first component.

20. The system of claim 17, wherein the tool is a first tool, the system comprising:
a second tool that is interchangeable with the first tool;
the robotic arm to couple with the first tool to perform a first task; and
the robotic arm to couple with the second tool to perform a second task.

21. The robotic work cell of claim 1, comprising:
the plurality of projections extend perpendicular to the work surface.

22. The method of claim 10, comprising:
the information corresponding to the first, second, third, and fourth components includes at least one of a type of material of the respective component, a target location for the respective component, when to use the respective component, or where to place the respective component relative to another component.

23. The system of claim 17, comprising:
the information corresponding to the first, second, third, and fourth components includes at least one of a type of material of the respective component, a target location for the respective component, when to use the respective component, or where to place the respective component relative to another component.

* * * * *